(12) United States Patent
Osada

(10) Patent No.: US 6,754,157 B2
(45) Date of Patent: Jun. 22, 2004

(54) RECORDING AND/OR REPRODUCING APPARATUS AND RECORDING AND/OR REPRODUCING METHOD CAPABLE OF DETECTING A LAND PRE-PIT ON DISC SECURELY AT A HIGH PRECISION

(75) Inventor: Yutaka Osada, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 535 days.

(21) Appl. No.: 09/918,560

(22) Filed: Aug. 1, 2001

(65) Prior Publication Data
US 2002/0036967 A1 Mar. 28, 2002

(30) Foreign Application Priority Data
Aug. 7, 2000 (JP) ...................................... P2000-239002
Oct. 5, 2000 (JP) ...................................... P2000-306200

(51) Int. Cl.[7] ................................................ G11B 3/90
(52) U.S. Cl. .............................. 369/53.28; 369/44.32; 369/44.41
(58) Field of Search ........................... 369/44.25, 44.27, 369/44.28, 44.29, 44.32, 44.35, 44.41, 53.28, 124.12

(56) References Cited

U.S. PATENT DOCUMENTS 5,487,056 A * 1/1996 Wachi ...................... 369/44.34
6,134,198 A * 10/2000 Yamamoto et al. ....... 369/44.35
6,700,842 B1 * 3/2004 Nishi ....................... 369/44.41

FOREIGN PATENT DOCUMENTS

JP  10-293926  11/1998

* cited by examiner

Primary Examiner—Paul W. Huber
(74) Attorney, Agent, or Firm—Nath & Associates PLLC; Gary M. Nath

(57) ABSTRACT

Of (A+B) signal and (C+D) signal for detecting a radial push-pull signal, the (A+B) signal is multiplied with a predetermined coefficient k. The predetermined coefficient k is changed appropriately depending on an error rate upon decoding a land pre-pit, a lens shift amount of an objective lens of an optical pickup, and the levels of a land pre-pit signal and a wobbling signal relative to the level of (A+B+C+D) signal. Consequently, the land pre-pit on an optical disc can be detected securely at a high precision at any time of recording time and reproduction time.

16 Claims, 27 Drawing Sheets

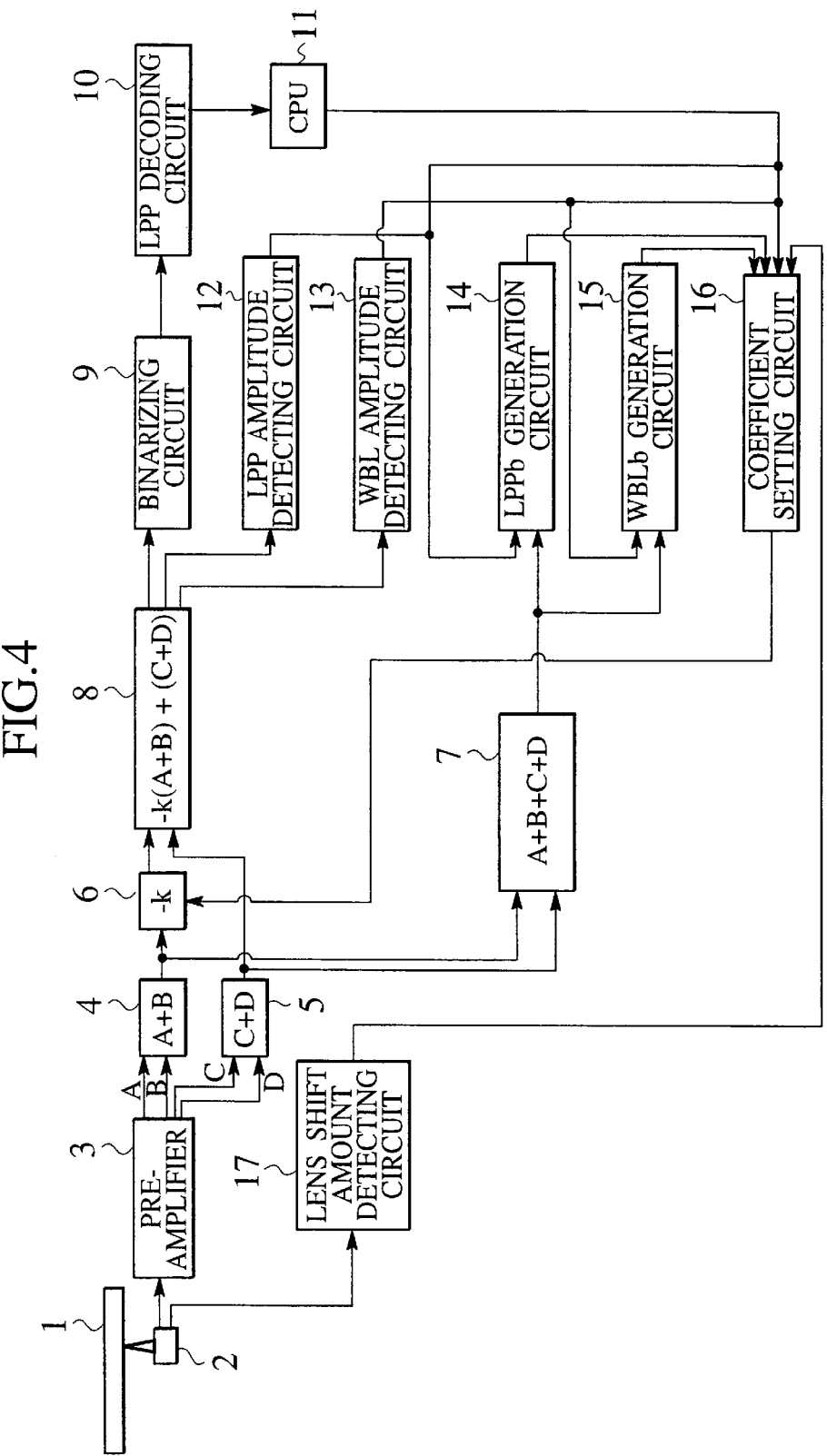

OUTPUT OF PHOTO DETECTOR

UPON GENERATION OF RADIAL PUSH-PULL SIGNAL

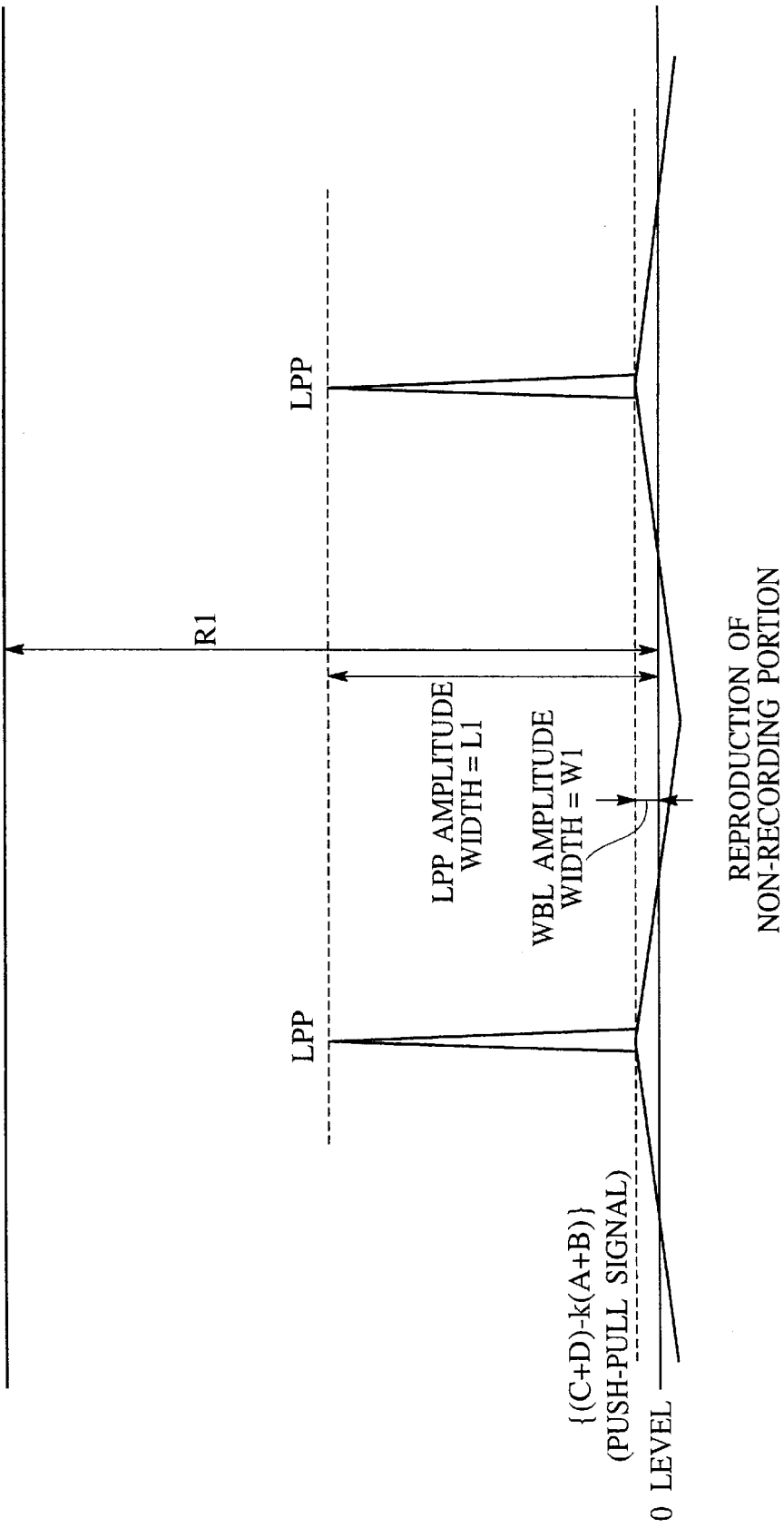

OUTPUT OF PHOTO DETECTOR

UPON GENERATION OF RADIAL PUSH-PULL SIGNAL

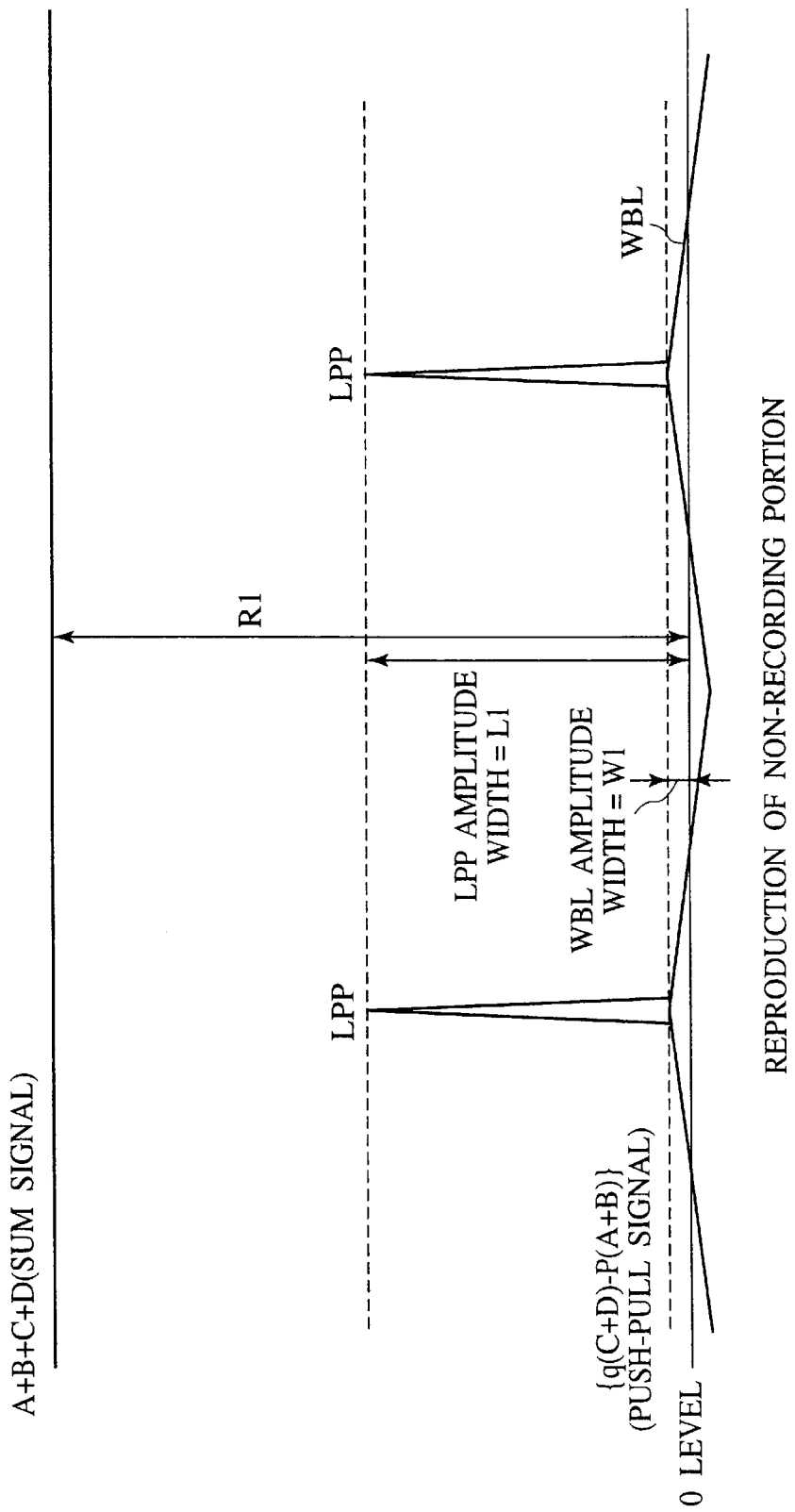

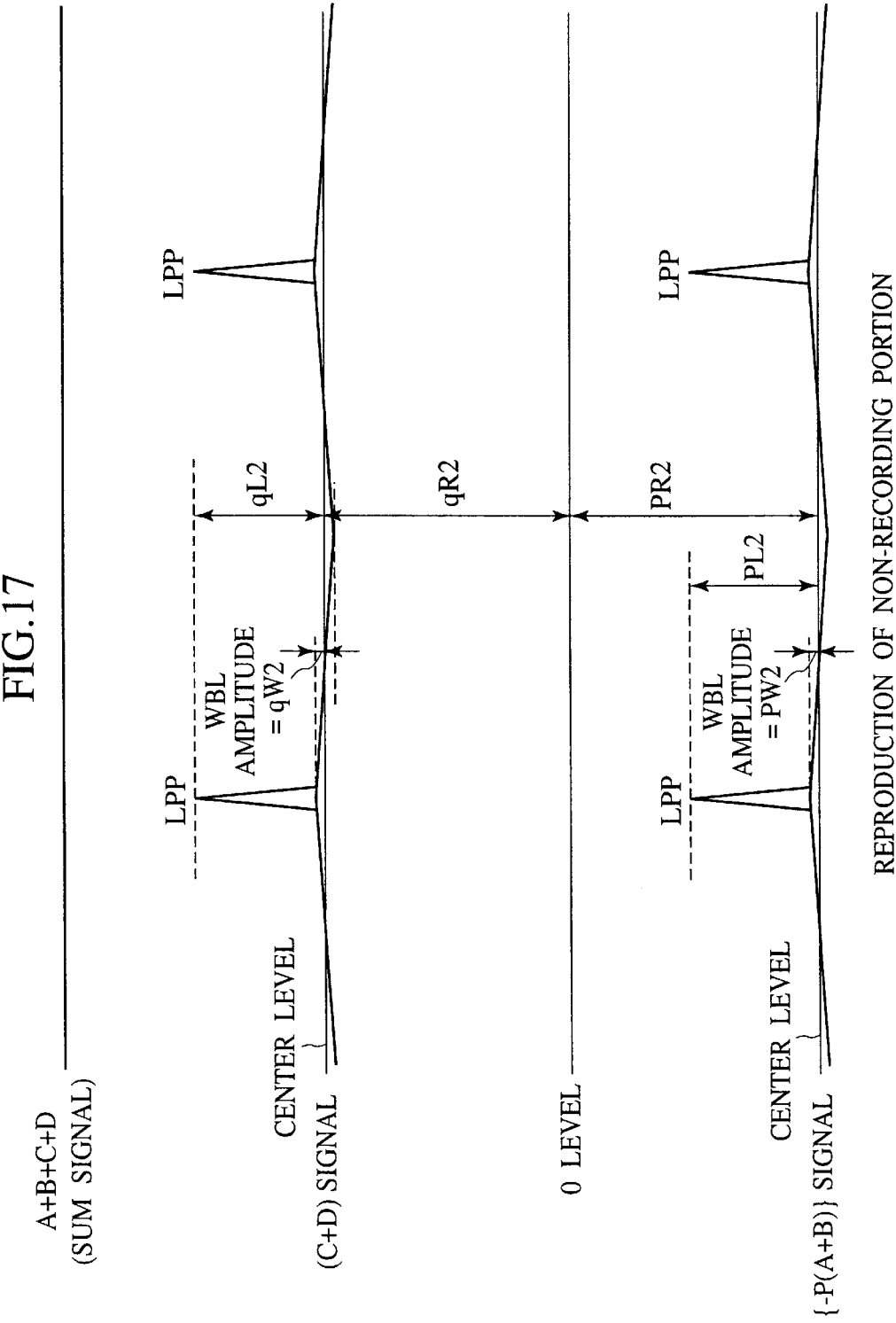

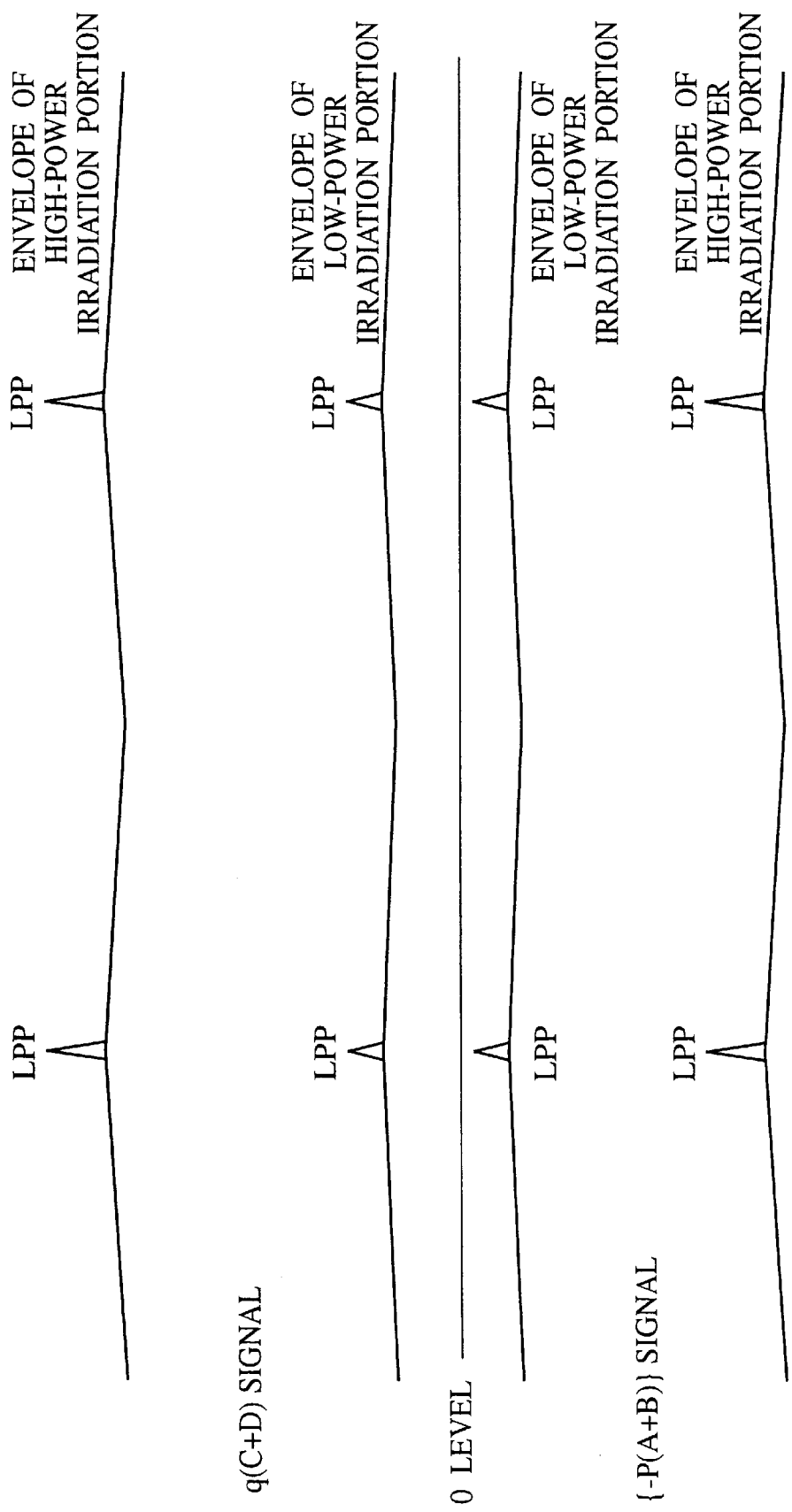

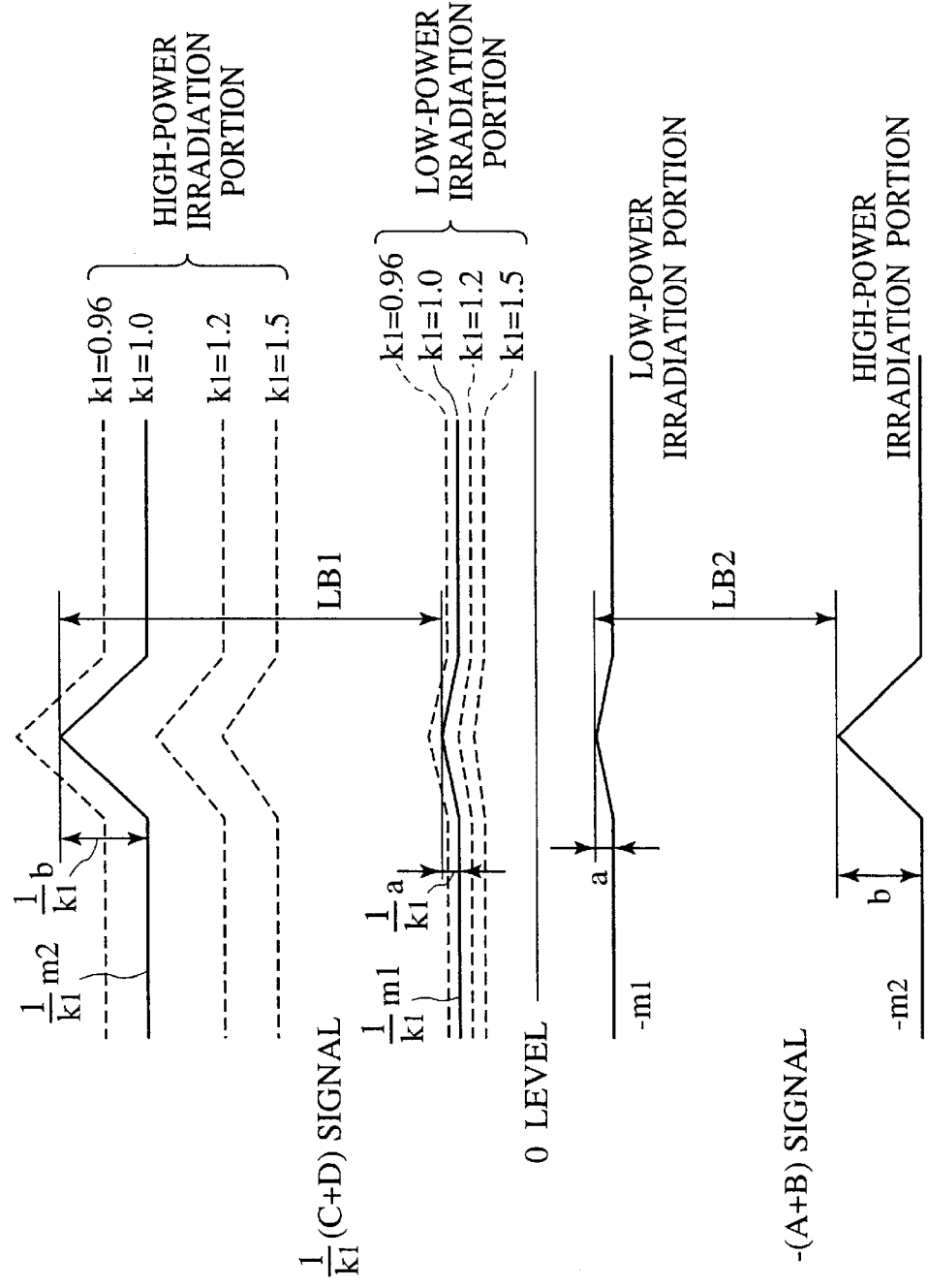

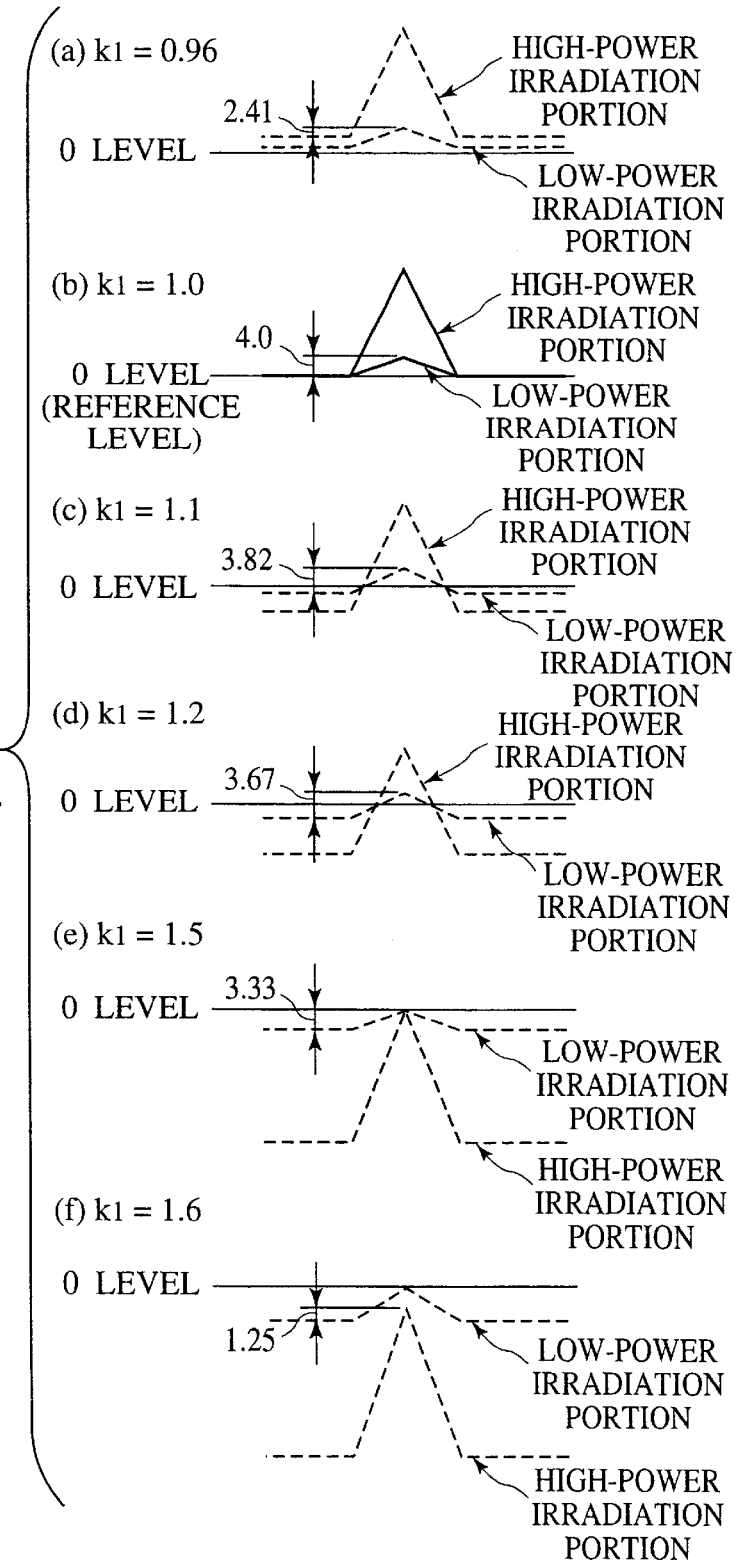

FIG.23
(a) k1 = 1.0
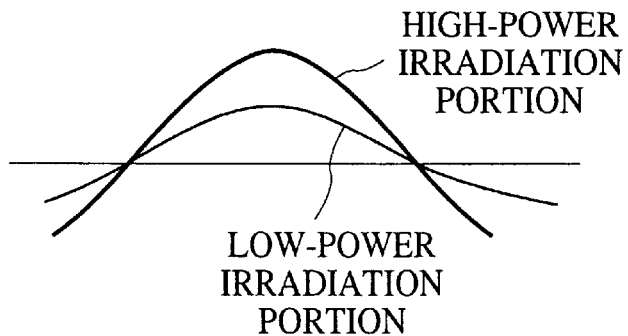
(b) k1 = 1.1
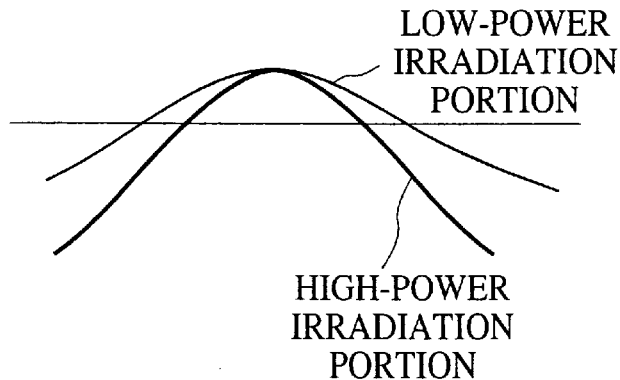
(c) k1 = 1.2
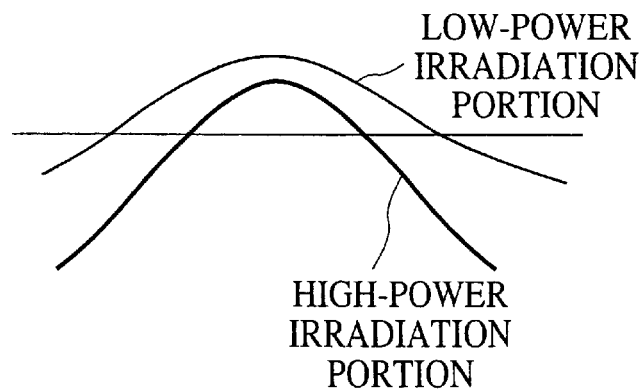

FIG.28
(a) k2 = 1.0
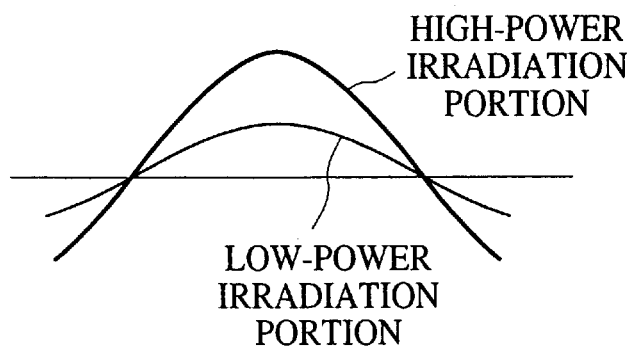
(b) k2 = 1.1
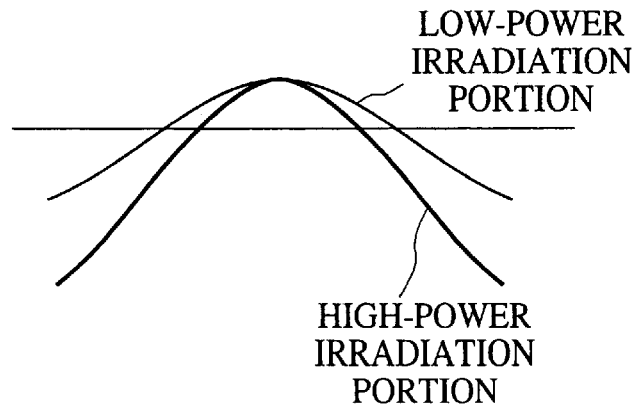
(c) k2 = 1.2
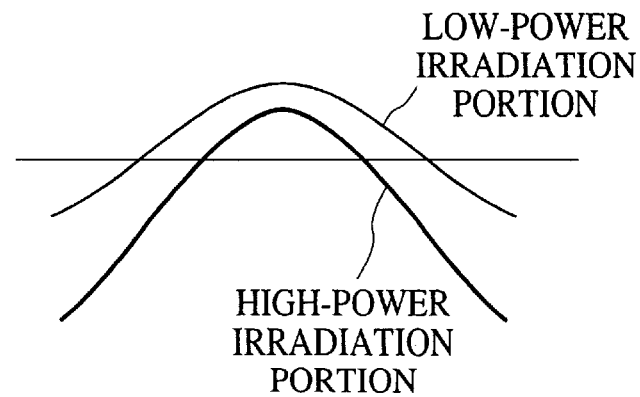

RECORDING AND/OR REPRODUCING APPARATUS AND RECORDING AND/OR REPRODUCING METHOD CAPABLE OF DETECTING A LAND PRE-PIT ON DISC SECURELY AT A HIGH PRECISION

BACKGROUND OF THE INVENTION

1. Field of the Invention

The present invention relates to a recording and/or reproducing apparatus and a recording and/or reproducing method, which can be applied preferably to a DVD reproducing apparatus, a DVD recording apparatus and a DVD recording and/or reproducing apparatus and the like for recording and/or reproducing in/from an optical disc such as DVD-R and DVD-RW.

2. Description of the Related Art

Generally, address information and the like is preliminarily recorded in a recordable optical recording medium so as to enable recording of desired information, and a recording track wobbled under a predetermined frequency is provided to generate a clock signal for use in recording and/or reproducing operation.

As such an optical recording medium, for examples digital versatile disc-recordable (DVD-R) capable of recording the amount of information about 7 times that of the compact disc (CD)has been currently available. In this DVD-R, information such as video data and audio data is recorded in concave pre-grooves in the form of a recording pit, while address information and the like are preliminarily recorded in convex land located between these pre-grooves in the form of land pre-pit (LPP).

The land pre-pits (LPP) on the land are recorded such that a LPP do not overlap with an adjacent land pre-pit (LPP) located beyond a pre-groove on a straight line perpendicular to a tangent line of the pre-groove. The pre-groove is employed for rotation control of the DVD-R and provided so as to be wobbled slightly in a radius direction at a predetermined frequency based on the reference clock.

Upon the rotation control of the DVD-R, the wobbling frequency is detected from a reproduction output of the wobbled pre-groove (hereinafter referred to as wobbling groove) and then feedback control is carried out so that this detected wobbling frequency coincides with the frequency of the reference clock.

For the land pre-pit (LPP), a reflection light of light beam (laser beam) irradiated to the wobbling groove from a semiconductor laser is received by a photo detector divided to at least two sections with optically parallel lines in the tangent line direction of the wobbling groove and then, a differential signal in a direction perpendicular to the wobbling groove between the output signals sent from respective regions (individual divided regions) of this photo detector is obtained. Then, by comparing this differential signal with a predetermined threshold value and then binarizing, its binary signal is detected.

In the case of the disc-like recording medium, the dividing regions are formed on the photo detector in the radius direction of the optical disc with the aforementioned dividing lines and the differential signal is called radial push-pull signal.

The reason why the land pre-pit (LPP) can be detected with such binarized binary signal by comparing the radial push-pull signal (differential signal) with the predetermined threshold value is that as described above, the land pre-pits (LPP) are formed such that there are no two adjacent land pre-pits beyond a wobbling groove on a straight line perpendicular to the tangent line of the wobbling groove.

That is, when the light beam is irradiated to a wobbling groove, the reflection light from the lands on both sides do not contain the land pre-pit (LPP) reflection components at the same time (only the reflection light from either land contains the LPP component). Thus, by computation of the differential, only the reflection light component of the land pre-pit (LPP) is extracted.

Usually, the binary signal obtained by comparing only one of the both polarity components (for example, positive polarity component) obtained by the above computation of the differential with the predetermined threshold value is employed as the land pre-pit signal (LPP signal).

Meanwhile, in the optical disc such as the DVD-R and DVD-RW, the land pre-pit (LPP) is detected by comparing the radial push-pull signal (differential signal) with the predetermined threshold and then binarizing its result. Although conventionally, two input signals are adjusted so as to be equal in terms of the amplitude ratio for computation of the radial push-pull signal (differential signal), laser power modulation component during recording turns to noise in the land pre-pit (LPP) according to this method. Further, when the reproduction mode is selected, the land pre-pit (LPP) is detected erroneously due to an influence of the recording pit. Further, if a lens shift of an objective lens occurs when the recording/reproduction mode of the optical disc is selected, the balance of the radial push-pull signal is destroyed, so that the radial push-pull signal may be detected erroneously either.

SUMMARY OF THE INVENTION

Accordingly, the present invention has been achieved in views of the above-described problem and therefore, an object of the invention is to provide a recording and/or reproducing apparatus and a recording and/or reproducing method for extracting the radial pre-pit signal (LPP signal) at a high precision with a simple structure.

To achieve the above object, there is provided a recording and/or reproducing apparatus for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing apparatus comprising: coefficient multiplying means for when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient k; push-pull signal generation means for outputting a differential as a radial push-pull signal, the differential being produced by subtracting the multiplication processing result outputted from the coefficient multiplying means from the other of the respective light reception outputs of the first and second light receiving regions; land pre-pit signal amplitude detecting means for extracting a land pre-pit signal corresponding to a land pre-pit on the lands from the radial push-pull signal so as to detect and output an amplitude of the land pre-pit signal; wobbling signal amplitude detecting means for extracting a wobbling signal in the wobbling grooves from the radial push-pull signal so as to detect and output an amplitude of the wobbling signal; and coefficient setting means for setting a value of the predetermined coefficient k to be larger than 1.0 and in a range capable of detecting the land pre-pit signal based on the amplitude of the land pre-pit signal, or the amplitude of the land pre-pit signal and the amplitude of the wobbling signal.

Further, to achieve the above object, there is provided a recording and/or reproducing apparatus for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing apparatus comprising: coefficient multiplying means for when light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient k; push-pull signal generation means for outputting a differential as a radial push-pull signal, the differential being produced by subtracting the multiplication processing result outputted from said coefficient multiplying means from the other of the respective light reception outputs of said first and second light receiving regions; land pre-pit signal amplitude detecting means for extracting a land pre-pit signal corresponding to a land pre-pit on the lands from the radial push-pull signal so as to detect and output an amplitude of the land pre-pit signal; wobbling signal amplitude detecting means for extracting a wobbling signal in the wobbling grooves from the radial push-pull signal so as to detect and output an amplitude of the wobbling signal; sum signal generation means for summing up the respective light reception outputs of the first and second light receiving regions and outputting a sum signal; normalized land pre-pit signal amplitude generation means for outputting an amplitude of a normalized land pre-pit signal by dividing the amplitude of the land pre-pit signal by the sum signal; normalized wobbling signal amplitude generation means for outputting an amplitude of a normalized wobbling signal by dividing the amplitude of the wobbling signal with the sum signal; and coefficient setting means for setting a value of the predetermined coefficient k to be larger than 1.0 and in a range capable of detecting the land pre-pit signal based on the amplitude of the normalized land pre-pit signal, or the amplitude of the normalized land pre-pit signal and the amplitude of the normalized wobbling signal.

To achieve the above object, there is provided a recording and/or reproducing apparatus for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing apparatus comprising: coefficient multiplying means for when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient k; push-pull signal generation means for outputting a differential as a radial push-pull signal, the differential being produced by subtracting the multiplication processing result outputted from the coefficient multiplying means from the other of the respective light reception outputs of the first and second light receiving regions; error rate computing means for computing and outputting an error rate at the time of detecting a land pre-pit signal contained in the radial push-pull signal; and coefficient setting means for setting a value of the predetermined coefficient k to be larger than 1.0 and in a range capable of detecting said land pre-pit signal according to said error rate.

To achieve the above object, there is provided a recording and/or reproducing apparatus for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing apparatus comprising: coefficient multiplying means for when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient k; push-pull signal generation means for outputting a differential as a radial push-pull signal, the differential being produced by subtracting the multiplication processing result outputted from the coefficient multiplying means from the other of the respective light reception outputs of the first and second light receiving regions; lens shift amount detecting means for detecting the amount of lens shift in a radial direction from a center of an optical axis of an objective lens of an optical pickup which irradiates the disk-like recording medium with the light beam and outputting the lens shift amount; and coefficient setting means for setting a value of the predetermined coefficient k to be larger than 1.0 and in a range capable of detecting the land pre-pit signal according to the lens shift amount.

To achieve the above object, there is provided a recording and/or reproducing apparatus for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing apparatus comprising: coefficient multiplying means for when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient 1/k1; push-pull signal generation means for outputting a differential as a radial push-pull signal, the differential being produced by subtracting the other of the respective light reception outputs of the first and second light receiving regions from the multiplication processing result outputted from the coefficient multiplying means; land pre-pit signal amplitude detecting means for extracting a land pre-pit signal corresponding to a land pre-pit on the lands from the radial push-pull signal so as to detect and output an amplitude of the land pre-pit signal; wobbling signal amplitude detecting means for extracting a wobbling signal in the wobbling grooves from the radial push-pull signal so as to detect and output an amplitude of the wobbling signal; coefficient setting means for setting a value of the predetermined coefficient k1 to be larger than 1.0 and in a range capable of detecting the land pre-pit signal based on the amplitude of the land pre-pit signal, or the amplitude of the land pre-pit signal and the amplitude of the wobbling signal.

To achieve the above object, there is provided a recording and/or reproducing apparatus for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing apparatus comprising: coefficient multiplying means for when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient 1/k1; push-pull signal generation means for outputting a differential as a radial push-pull signal, the differential being produced by subtracting the other of the respective light reception outputs of the first and second light receiving regions from the multiplication processing result outputted from the coefficient multiplying means; land pre-pit signal amplitude detecting means for extracting a land pre-pit signal corresponding to a land pre-pit on the lands from the radial push-pull signal so as to detect and output an amplitude of the land pre-pit signal; wobbling signal amplitude detecting means for extracting a wobbling signal in the wobbling grooves from the radial push-pull signal so as to detect and output an amplitude of the wobbling signal; sum signal generation means for summing up the respective light reception outputs of the first and second light receiving regions and outputting a sum signal; normalized land pre-pit signal amplitude generation means for outputting an amplitude of a normalized land pre-pit signal by dividing the amplitude of the land pre-pit signal by the sum signal; normalized wobbling signal amplitude generation means for outputting an amplitude of a normalized wobbling signal by dividing the amplitude of the wobbling signal with the sum signal; an coefficient setting means for setting a value of the predetermined coefficient k1 to be larger than 1.0 and in a range capable of detecting the land pre-pit signal based on the amplitude of the normalized land pre-pit signal, or the amplitude of the normalized land pre-pit signal and the amplitude of the normalized wobbling signal.

To achieve the above object, there is provided a recording and/or reproducing apparatus for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing apparatus comprising: first coefficient multiplying means for when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient 1/k3; second coefficient multiplying means for multiplying the other of the respective light reception outputs of said first and second light receiving regions with a predetermined coefficient k3; push-pull signal generation means for outputting a differential as a radial push-pull signal, the differential being produced by subtracting the multiplication processing result outputted from said coefficient multiplying means from the other of the respective light reception outputs of said first and second light receiving regions; land pre-pit signal amplitude detecting means for extracting a land pre-pit signal corresponding to a land pre-pit on the lands from the radial push-pull signal so as to detect and output an amplitude of the land pre-pit signal; wobbling signal amplitude detecting means for extracting a wobbling signal in the wobbling grooves from the radial push-pull signal so as to detect and output an amplitude of the wobbling signal; and coefficient setting means for setting a value of the predetermined coefficient k3 to be larger than 1.0 and in a range capable of detecting the land pre-pit signal based on the amplitude of the land pre-pit signal, or the amplitude of the land pre-pit signal and the amplitude of the wobbling signal.

To achieve the above object, there is provided a recording and/or reproducing apparatus for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing apparatus comprising: first coefficient multiplying means for when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient 1/k3; second coefficient multiplying means for multiplying the other of the respective light reception outputs of the first and second light receiving regions with a predetermined coefficient k3; push-pull signal generation means for outputting a differential as a radial push-pull signal, the differential being obtained by subtracting the multiplication processing result outputted from said second coefficient multiplying means from the multiplication processing result outputted from said first coefficient multiplying means; land pre-pit signal amplitude detecting means for extracting a land pre-pit signal corresponding to a land pre-pit on the lands from the radial push-pull signal so as to detect and output an amplitude of the land pre-pit signal; wobbling signal amplitude detecting means for extracting a wobbling signal in the wobbling grooves from the radial push-pull signal so as to detect and output an amplitude of the wobbling signal; sum signal generation means for summing up the respective light reception outputs of the first and second light receiving regions and outputting a sum signal; normalized land pre-pit signal amplitude generation means for outputting an amplitude of a normalized land pre-pit signal by dividing the amplitude of the land pre-pit signal by the sum signal; normalized wobbling signal amplitude generation means for outputting an amplitude of a normalized wobbling signal by dividing the amplitude of the wobbling signal with the sum signal; and coefficient setting means for setting a value of the predetermined coefficient k3 to be larger than 1.0 and in a range capable of detecting the land pre-pit signal based on the amplitude of the normalized land pre-pit signal, or the amplitude of the normalized land pre-pit signal and the amplitude of the normalized wobbling signal.

Further, to achieve the above object, there is provided a recording and/or reproducing method for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing method comprising the steps of: when a light beam is irradiated to the disk-like recording medium, receiving reflection light from the disk-like recording medium with first and second light receiving regions, divided equally along the recording track of the disk-like recording medium and multiplying one of respective light reception outputs of said first and second light receiving regions with a predetermined coefficient k; outputting a differential as a radial push-pull signal, the differential being produced by subtracting the multiplication processing result outputted at the coefficient multiplying step from the other of the respective light reception outputs of the first and second light receiving regions; extracting a land pre-pit signal corresponding to a land pre-pit on the lands from the radial push-pull signal so as to detect and output an amplitude of the land pre-pit signal; extracting a wobbling signal in the wobbling grooves from the radial push-pull signal so as to detect and output an amplitude of the wobbling signal; and setting a value of the predetermined coefficient k to be larger than 1.0 and in a range capable of detecting the land pre-pit signal based on the amplitude of the land pre-pit signal, or the amplitude of the land pre-pit signal and the amplitude of said wobbling signal.

Further, to achieve the above object, there is provided a recording and/or reproducing method for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing method comprising the steps of: when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient k; outputting a differential as a radial push-pull signal, the differential being produced by subtracting the multiplication processing result outputted at the coefficient multiplying step from the other of the respective light reception outputs of the first and second light receiving regions; extracting a land pre-pit signal corresponding to a land pre-pit on the lands from the radial push-pull signal so as to detect and output an amplitude of the land pre-pit signal; extracting a wobbling signal in the wobbling grooves from the radial push-pull signal so as to detect and output an amplitude of the wobbling signal; summing up the respective light reception outputs of the first and second light receiving regions and outputting a sum signal; outputting an amplitude of a normalized land pre-pit signal by dividing the amplitude of the land pre-pit signal by the sum signal; outputting an amplitude of a normalized wobbling signal by dividing the amplitude of the wobbling signal with the sum signal; and setting a value of the predetermined coefficient k to be larger than 1.0 and in a range capable of detecting the land pre-pit signal based on the amplitude of the normalized land pre-pit signal, or the amplitude of the normalized land pre-pit signal and the amplitude of the normalized wobbling signal.

Further, to achieve the above object, there is provided a recording and/or reproducing method for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing method comprising the steps of: when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient k; outputting a differential as a radial push-pull signal, the differential being produced by subtracting the multiplication processing result outputted at the coefficient multiplying step from the other of the respective light reception outputs of the first and second light receiving regions; computing and outputting an error rate at the time of detecting a land pre-pit signal contained in the radial push-pull signal; and setting a value of the predetermined coefficient k to be larger than 1.0 and in a range capable of detecting the land pre-pit signal according to the error rate.

Further, to achieve the above object, there is provided a recording and/or reproducing method for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing method comprising the steps of: when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient k; outputting a differential as a radial push-pull signal, the differential being produced by subtracting the multiplication processing result outputted at the coefficient multiplying step from the other of the respective light reception outputs of the first and second light receiving regions; detecting the amount of lens shift in a radial direction from a center of an optical axis of an objective lens of an optical pickup which irradiates the disk-like recording medium with the light beam and outputting the lens shift amount; and setting a value of the predetermined coefficient k to be larger than 1.0 and in a range capable of detecting the land pre-pit signal according to said lens shift amount.

Further, to achieve the above object, there is provided a recording and/or reproducing method for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing method comprising the steps of: when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient 1/k1; outputting a differential as a radial push-pull signal, the differential being produced by subtracting the other of the respective light reception outputs of the first and second light receiving regions from the multiplication processing result outputted at the coefficient multiplying step; extracting a land pre-pit signal corresponding to a land pre-pit on the lands from the radial push-pull signal so as to detect and output an amplitude of the land pre-pit signal; extracting a wobbling signal in the wobbling grooves from the radial push-pull signal so as to detect and output an amplitude of the wobbling signal; and setting a value of the predetermined coefficient k1 to be larger than 1.0 and in a range capable of detecting the land pre-pit signal based on the amplitude of the land pre-pit signal, or the amplitude of the land pre-pit signal and the amplitude of the wobbling signal.

Further, to achieve the above object, there is provided a recording and/or reproducing method for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing method comprising the steps of: when a light beam is irradiated to the disk-like recording medium, receiving reflection light from said disk-like recording medium with first and second light receiving regions, divided equally along the recording track of the disk-like recording medium and multiplying one of respective light reception outputs of the first and second light receiving regions with a predetermined coefficient 1/k1; outputting a differential as a radial push-pull signal, the differential being produced by subtracting the other of the respective light reception outputs of the first and second light receiving regions from the multiplication processing result outputted at the coefficient multiplying step; extracting a land pre-pit signal corresponding to a land pre-pit on the lands from the radial push-pull signal so as to detect and output an amplitude of the land pre-pit signal; extracting a wobbling signal in the wobbling grooves from the radial push-pull signal so as to detect and output an amplitude of the wobbling signal; summing up the respective light reception outputs of the first and second light receiving regions and outputting a sum signal; outputting an amplitude of a normalized land pre-pit signal by dividing the amplitude of the land pre-pit signal by said sum signal; outputting an amplitude of a normalized wobbling signal by dividing the amplitude of the wobbling signal with the sum signal; and setting a value of the predetermined coefficient k1 to be larger than 1.0 and in a range capable of detecting the land pre-pit signal based on the amplitude of said normalized land pre-pit signal, or the amplitude of the normalized land pre-pit signal and the amplitude of the normalized wobbling signal.

Further, to achieve the above object, there is provided a recording and/or reproducing method for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, said wobbling grooves and said lands being formed alternately spirally or coaxially, the recording and/or reproducing method comprising: when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient 1/k3; multiplying the other of the respective light reception outputs of the first and second light receiving regions with a predetermined coefficient k3; outputting a differential as a radial push-pull signal, the differential being obtained by subtracting a result of the multiplication processing with the predetermined coefficient k3 from a result of the multiplication processing with the predetermined coefficient 1/k3; extracting a land pre-pit signal corresponding to a land pre-pit on the lands from the radial push-pull signal so as to detect and output an amplitude of the land pre-pit signal; extracting a wobbling signal in the wobbling grooves from the radial push-pull signal so as to detect and output an amplitude of the wobbling signal; and setting a value of the predetermined coefficient k3 to be larger than 1.0 and in a range capable of detecting the land pre-pit signal based on the amplitude of the land pre-pit signal, or the amplitude of the land pre-pit signal and the amplitude of the wobbling signal.

Further, to achieve the above object, there is provided a recording and/or reproducing method for recording and/or reproducing information signal into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, the recording and/or reproducing method comprising the steps of: when a light beam is irradiated to the disk-like recording medium, receiving reflection light from the disk-like recording medium with first and second light receiving regions, divided equally along the recording track of the disk-like recording medium and multiplying one of respective light reception outputs of the first and second light receiving regions with a predetermined coefficient 1/k3; multiplying the other of the respective light reception outputs of the first and second light receiving regions with a predetermined coefficient k3; outputting a differential as a radial push-pull signal, the differential being obtained by subtracting a result of the multiplication processing with the predetermined coefficient k3 from a result of the multiplication processing with the predetermined coefficient 1/k3; extracting a land pre-pit signal corresponding to a land pre-pit on the lands from the radial push-pull signal so as to detect and output an amplitude of the land pre-pit signal; extracting a wobbling signal in the wobbling grooves from the radial push-pull signal so as to detect and output an amplitude of the wobbling signal; summing up the respective light reception outputs of the first and second light receiving regions and outputting a sum signal; outputting an amplitude of a normalized land pre-pit signal by dividing the amplitude of the land pre-pit signal by the sum signal; outputting an amplitude of a normalized wobbling signal by dividing the amplitude of the wobbling signal with the sum signal; and setting a value of the predetermined coefficient k3 to be larger than 1.0 and in a range capable of detecting said land pre-pit signal based on the amplitude of the normalized land pre-pit signal, or the amplitude of the normalized land pre-pit signal and the amplitude of the normalized wobbling signal.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a block diagram of the disc recording and/or reproducing apparatus of the first embodiment;

FIG. 6 is a diagram of waveforms of a wobbling signal and a land pre-pit signal which form a radial push-pull signal;

FIG. 16 is a diagram of waveforms of a wobbling signal and a land pre-pit signal, which form a radial push-pull signal;

FIG. 17 is a diagram of a wobbling signal and a land pre-pit signal which form q(C+D) signal and $\{-p(A+B)\}$ signal for detecting the radial push-pull signal;

FIG. 18 is a diagram of the waveforms of a high power irradiation portion and a low power irradiation portion of the q(C+D) signal and $\{-p(A+B)\}$ signal;

FIG. 19 is a diagram showing the waveforms of the high power irradiation portion and the lowpower irradiation portion of the $\{(1/k1)(C+D)\}$ signal, which changes depending on the value of a predetermined coefficient k1 to be multiplied by paying attention to the land pre-pit signal;

FIG. 20 is a diagram showing the waveforms of the high-power irradiation portion and the low-power irradiation portion of the radial push-pull signal which changes depending on the value of a predetermined coefficient k1 to be multiplied by paying attention to the land pre-pit signal, if the relation of a/m1=b/m2=L shown in FIG. 19 is established;

FIG. 23 is a diagram showing the waveforms of the high-power irradiation portion and the low-power irradiation portion of the radial push-pull signal which changes depending on the value of a predetermined coefficient k1 to be multiplied by paying attention to the wobbling signal, if the relation of c/m1=d/m2=W shown in FIG. 22 is established;

FIG. 28 is a diagram showing the waveforms of the high-power irradiation portion and the low-power irradiation portion of the radial push-pull signal which changes depending on the value of a predetermined coefficient k3 (k3=SQRT(k2)) to be multiplied by paying attention to the wobbling signal, if the relation of c/m1=d/m2=W shown in FIG. 27 is established.

DESCRIPTION OF THE PREFERRED EMBODIMENTS

The recording and/or reproducing apparatus and the recording and/or reproducing method of the present invention can be applied to a disc recording and/or reproducing apparatus, which records in/reproduces from a DVD-R, DVD-RW (hereinafter referred to as DVD).

<First Embodiment>
[Structure]

Figure 1:
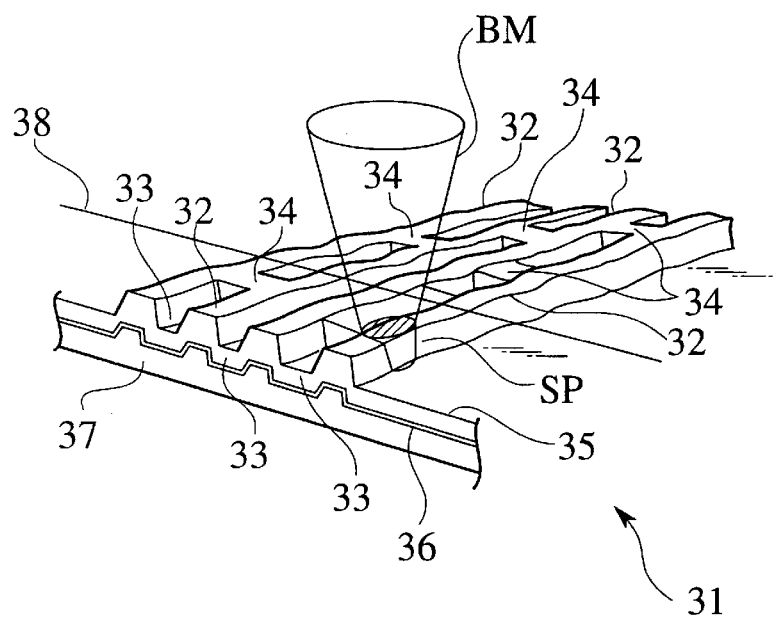
FIG. 1 is a diagram for explaining the structure of a DVD, in which recording and/or reproducing is carried out by a disc recording and/or reproducing apparatus of an embodiment to which the recording and/or reproducing apparatus and the recording and/or reproducing method of the present invention are applied.

In a DVD 31 for use in a disc recording and/or reproducing apparatus of the first embodiment, as shown in FIG. 1, concave wobbling grooves 32 and convex lands 33 are formed in a surface of a disc-like transparent substrate K alternately in a spiral or concentric form by injection molding. Pigment film 35 is formed on the wobbling groove 32 and the land 33 as a data-recording layer. Recording light beam BM modulated corresponding to data, which should be recorded in the pigment film 35, (hereinafter referred to as recording data) is irradiated from the side of the other face so that pit string corresponding to the recording data is formed irreversibly. Thus, the optical disk is a write-once one.

This DVD 31 has a wobbling groove 32, which is wobbled corresponding to the wobbling signal containing predetermined frequency components and this wobbling groove 32 serves as a data recording track for recording the aforementioned recording data.

In this DVD 31, the land pre-pits 34, in which for example, address information (absolute position information) or the like on an optical disc face is recorded at a predetermined wobbling cycle interval, are preliminarily formed in the land 33 between the adjacent wobbling grooves 32.

Gold deposited film 36 is formed on the pigment film 35. In the DVD 31, when reproducing the recording data recorded in the data-recording track, reproduction light beam BM irradiated to the data recording track is reflected by this gold deposited film 36 at a high reflectance. Further, protective film 37 is formed on the gold deposited film 36.

When recording the recording data or reproducing the recording data in/from the DVD 31, wobbling frequency of the wobbling groove 32 provided as the data recording track is detected, so that the DVD 31 is driven based on this wobbling frequency. Further, the address information and the like are detected from the land pre-pit 34 and a recording position is detected based on this address information so as to achieve recording or reproduction of the recording data in/from the wobbling groove 32.

When recording the recording data, recording light beam BM modulated corresponding to recording data is irradiated such that the center of a light spot coincides with the center of the wobbling groove 32. Consequently, a pit string corresponding to the recording data is formed on a data-recording track on the wobbling groove 32 so as to record the recording data. The size of a light spot SP of the recording light beam BM is set up so that part thereof is irradiated on not only the wobbling groove 32 but also on the land 33 between the adjacent wobbling grooves 32.

Then, part of reflected light of the light spot SP irradiated on this land 33 is received by a photo detector, which is divided by dividing lines optically parallel to a tangent line of the wobbling groove 32 or a rotation direction of the DVD 31. Based on an output of this photo detector, for example, a push-pull signal is formed so as to apply tracking servo. Further, a wobbling signal of the wobbling groove 32 is extracted from a photo detector and then, based on a wobbling pulse generated by binarizing this wobbling signal, a recording clock synchronous with a rotation of the DVD 31 is formed.

Next, a recording format of the address information recorded preliminarily in the DVD 31 will be described with reference to FIG. 2.

Figure 2:
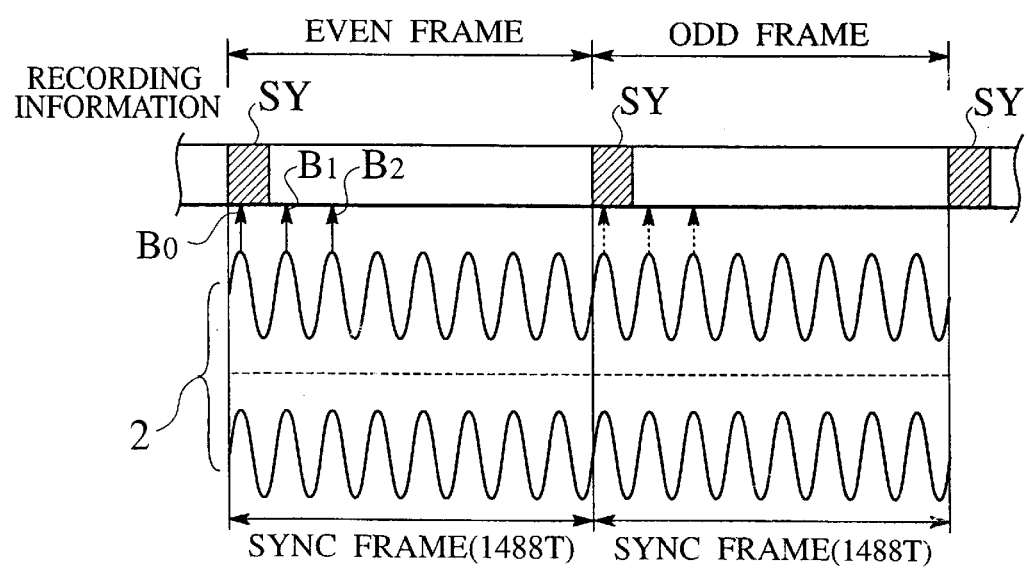
FIG. 2 is a diagram for explaining a format of the DVD.

In FIG. 2, its upper portion indicates a recording format for the recording data while the waveform of its lower portion indicates wobbling state (meandering state recognized when the wobbling groove 32 is viewed along the normal line with respect to a substrate face) of the wobbling groove 32, which intends to record the recording data. Upward arrows between the upper portion indicating the recording format for the recording data and the lower portion indicating the wobbling state of the wobbling groove 32 shows schematically positions in which the land pre-pits 34 are to be formed.

The wobbling state of the wobbling groove 32 in FIG. 2 is expressed with an amplitude larger than an actual amplitude to facilitate understanding. Actually, the recording data is recorded on the centerline of the wobbling groove 32 as described above.

As shown in FIG. 2, the recording data, which is to be recorded in the DVD 31, is preliminary divided for each synch frame as an information unit. A single recording sector is comprised of 26 synch frames. Further, a single error correcting code (ECC) is comprised of 16 recording sectors.

A synch frame has a length of 1488 times (1488 T) the unit length T corresponding to a pit interval specified by the recording format upon recording the recording data. Synchronous information SY for obtaining synchronism of each synch frame is recorded in a portion corresponding to the length of 14 T at the head of a synch frame.

On the other hand, the address information (land pre-pit 34) to be recorded in the DVD 31 is recorded preliminarily in each synch frame of the recording data upon manufacturing of an optical disc. In case where the address information is recorded in the DVD 31 by the land pre-pit 34, a land pre-pit 34 (land pre-pit B0) indicated with an arrow B0 in the same Figure is formed on the land 33 adjacent to a region in which the synchronous information SY of each synch frame of the recording data is recorded in order to indicate the synchronous information of the address information, and both or one of land pre-pits 34 (land pre-pit B1, land pre-pit B2) indicated with arrows B1, B2 in FIG. 2 is formed on the land 33 adjacent to a front half portion excluding the region in which the synchronous information SY in the synch frame is recorded, in order to indicate the content of the address information to be recorded.

In the front half portion excluding the region in which the synchronous information SY in the synch frame is to be recorded, the land pre-pit B1 or the land pre-pit B2 may not be formed depending on the content of the address information to be recorded.

At this time, the land pre-pit 34 is formed in every other synch frame in a recording sector to record the address information and the like. In a recording sector, EVEN frame and ODD frame are repeated alternately. When the land pre-pits 34 are formed in the EVEN frame as indicated by the upward arrows of solid line in FIG. 2, no land pre-pit 34 is formed in the ODD frame.

On the other hand, when the land pre-pits 34 are formed in the ODD frame as indicated with upward arrows of dotted line in FIG. 2, no land pre-pit 34 is formed in the EVEN frame.

In case where the land pre-pit 34 is formed in the EVEN frame, all the land pre-pits including the land pre-pit B0, land pre-pit B1 and land pre-pit B2 are formed in a synch frame at the head of the recording sector. If the address information to be recorded in the synch frame is "1" in a synch frame other than the head of the recording sector, only the land pre-pit B0 and land pre-pit B2 are formed. If the address information is "0", only the land pre-pit B0 and the land pre-pit B1 are formed.

In case where the land pre-pit 34 is formed in the ODD frame, only the land pre-pit B0 and the land pre-pit B1 are formed in a synch frame at the head of the recording sector while the portion other than the head of the recording sector is the same as the aforementioned EVEN frame.

Meanwhile, which the land pre-pit 34 should be formed in the EVEN frame or the ODD frame is determined depending on the position of the land pre-pit 34 formed on the adjacent land 33 ahead.

That is, usually, the land pre-pit 34 is formed in the EVEN frame. If the land pre-pit 34 to be formed in the EVEN frame overlaps the land pre-pit 34 on the adjacent land 33 precedingly generated in the diameter direction, this land pre-pit 34 is formed in the ODD frame.

Figure 3:
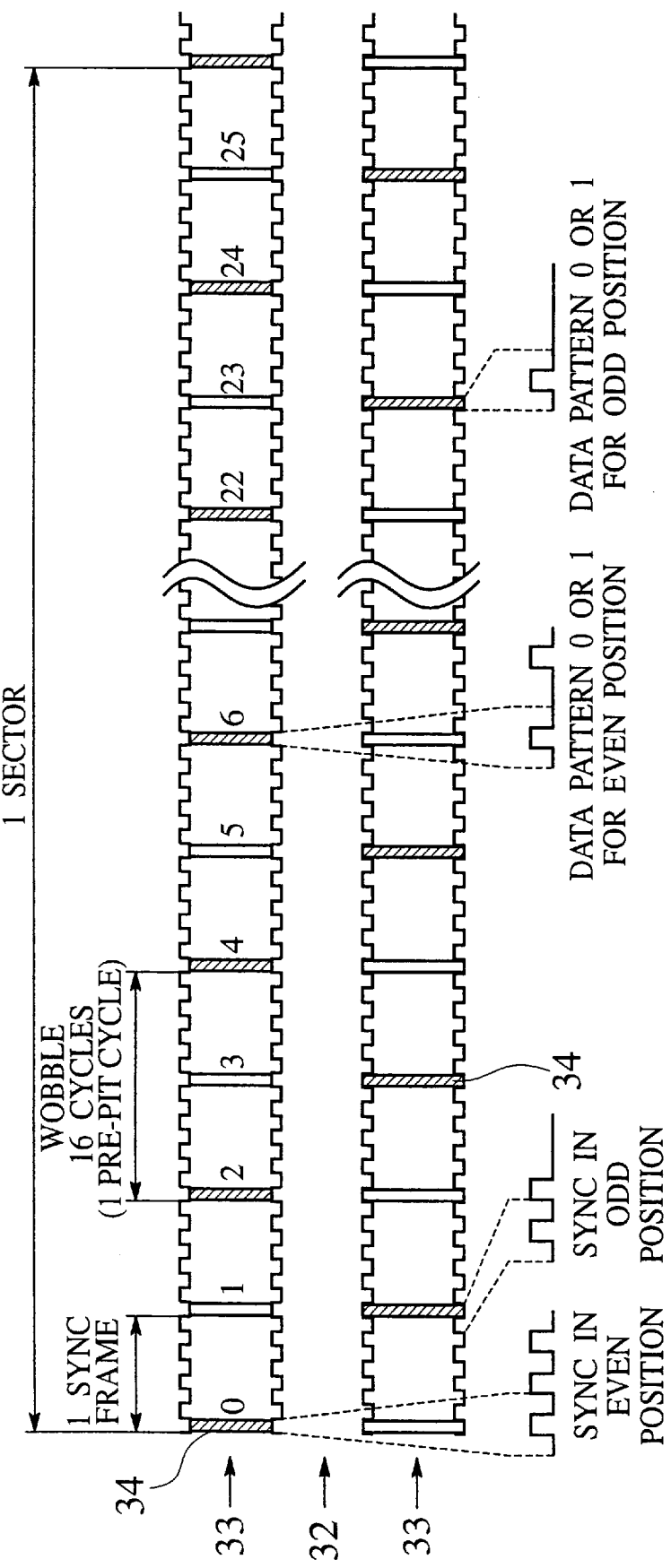
FIG. 3 is a diagram for explaining a recording position in the land pre-pit recorded in a land of the DVD.

In other words, a land pre-pit 34 is formed such that it does not overlap with another on the adjacent land 33 in the diameter direction of the DVD 31 as shown in FIG. 3. If the land pre-pit 34 is formed in this manner, it does not comes that a land pre-pit 34 on a land 33 and a land pre-pit 34 on the adjacent land 33 are overlapped with each other in the diameter direction of the DVD 31. Consequently, upon detecting the land pre-pit 34, an influence by land pre-pit cross talk on an adjacent land can be reduced.

In FIG. 3, a synch frame whose head is expressed with a black belt on the land 33 is a synch frame in which the land pre-pit 34 is formed, while a synch frame whose head is expressed with a blank belt is a synch frame in which the land pre-pit 34 is not formed.

On the other hand, the wobbling grooves 32 are wobbled at a constant wobbling frequency f0 (frequency allowing wobbling signals of wobble eight cycles to be contained in a synch frame) over the entire synch frames. At this time, by extracting the wobbling frequency f0 of the wobbling signal, a signal for controlling a rotation of the DVD 31 is detected and a recording clock is generated.

To keep constant the relation in phase between the land pre-pit 34 and the wobbling signal, the land pre-pits B0 to B2 are formed preliminarily upon manufacturing an optical disc, so that the land pre-pits B1 and the land pre-pit B2 are formed preliminarily apart by 186 T (1488 T/8) each from the land pre-pit B0.

The land pre-pit 34 is formed on the land 33 of every other synch frame as described above, such that it does not overlap, in the diameter direction of the DVD 31, with another on the adjacent land 33. Therefore, the land pre-pit 34 appears at every 16 wobble cycles of the wobbling groove 32 in two lands 33 adjacent a wobbling groove 32 and further, the land pre-pit 34 appears alternately on both sides of the wobbling groove 32.

Next, FIG. 4 is a block diagram of a disc recording and/or reproducing apparatus of the first embodiment. As shown in FIG. 4, the disc recording and/or reproducing apparatus of the first embodiment comprises an optical pickup 2 for recording and/or reproducing data by irradiating light beam from a semiconductor laser (not shown) to the DVD 31 through an objective lens (not shown) and a preamplifier 3, which amplifies a reproduction output from the optical pickup 2 and outputs it.

Figure 5A:
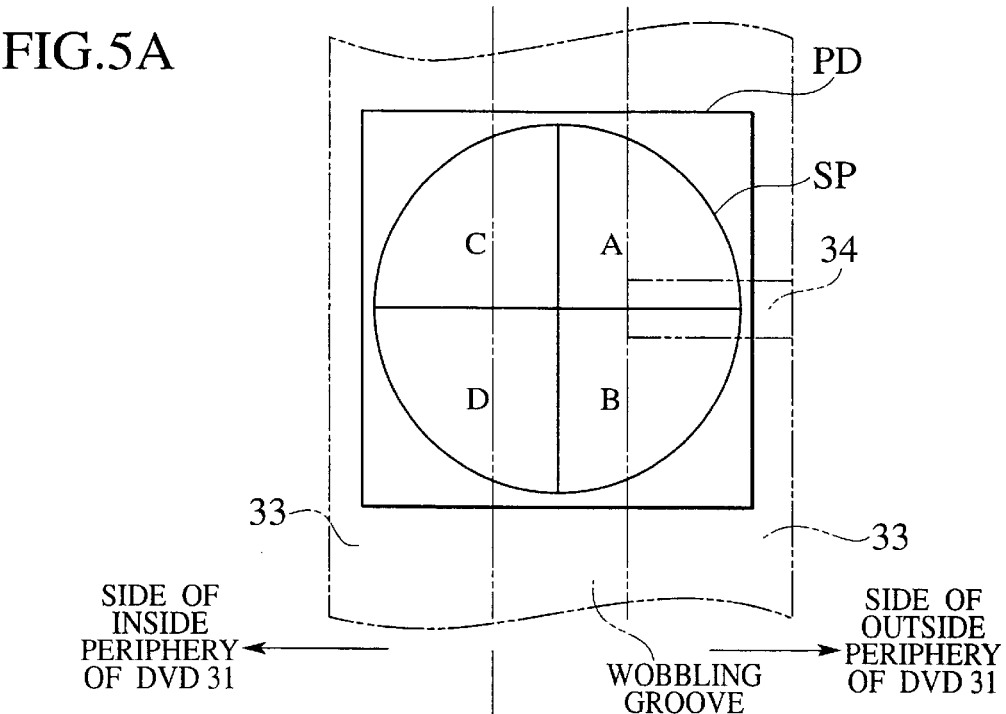
FIGS. 5A to 5C are diagrams for explaining a divided light receiving region of a photo detector provided on an optical pickup of the disc recording and/or reproducing apparatus of the first embodiment and for showing an output waveform of the photo detector.

FIG. 5A is a schematic diagram showing a state in which the photo detector (PD) in the optical pickup 2 is located in the center of the wobbling groove 32 and the land pre-pit 34 on the land 33 on the right of the same Figure is being detected by this photo detector (PD).

The aforementioned photo detector PD is formed in a substantially rectangular form and its entire light-receiving region is divided equally to four sections with a straight line along the diameter direction of the DVD 31 and a line along the track direction. The light spot SP focused on this photo detector PD is comprised of two pairs, which are a combination of a light receiving region A and a light receiving region B located on the outer side with respect to the DVD 31 and a combination of a light receiving region C and a light receiving region D located on the inner side, so that it is divided to two sections with respect to a straight line along the direction of the recording track of the DVD 31.

Figure 5B:
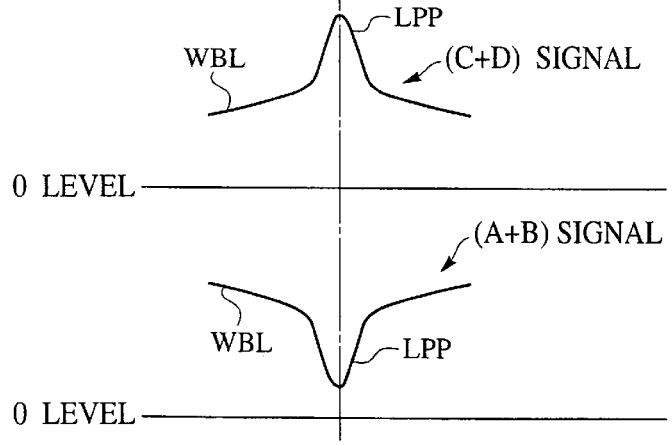

When light reception output is outputted from the photo detector PD, as shown in FIG. 5B, (A+B) signal obtained by summing up light reception signals from the two light receiving regions A and B on the outer side of the DVD 31 and (C+D) signal obtained by summing up light reception signals from the two light receiving regions C and D on the inner side of the DVD 31 are outputted. At this time, brightnesses on the outer side and inner side of the DVD 31 are unbalanced due to an influence by refraction of the light beam BM to the land pre-pit 34 on the photo detector PD. Thus, the (A+B) signal and the (C+D) signal are outputted as one is a turned-over type of the other on the side above 0 level.

At this time, it is absolutely necessary that the output amplitude of the (A+B) signal and the output amplitude of the (C+D) signal be substantially of the same level. If both the signals are not substantially the same level due to adjustment condition of the optical pickup or the like, the (A+B) adding circuit 4 and the (C+D) adding circuit 5 only have to be adjusted with an appropriate adjusting circuit, so that output amplitudes of both are substantially of the same level, before a differential signal is produced with a RPP generation circuit 8, which will be described later.

Figure 5C:
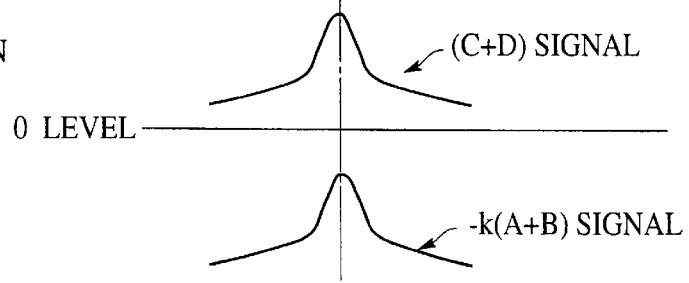

After that, if a radial push-pull signal is generated from the (A+B) signal and the (C+D) signal outputted from the photo detector PD, the (C+D) signal and the $\{-k(A+B)\}$ signal obtained by multiplying a predetermined coefficient k with minus sign(−) to invert polarity of the (A+B) signal are obtained above and below the 0 level as shown in FIG. 5C. Therefore, a differential signal $\{(C+D)-k(A+B)\}$, which is a differential between these respective signals, is generated as the radial push-pull signal.

In this case, in FIG. 5B, a multiplication processing of multiplying a predetermined coefficient k with minus sign has to be carried out only on the signal (A+B) including the land pre-pit signal (LPP signal) directed to 0 level (directed downward) with respect to the wobbling signal (WBL signal). If the (C+D) includes the land pre-pit signal (LPP signal) directed downward, different from shown here, the (C+D) may be subjected to multiplication processing. However, this determination of which signal is subjected to the multiplication processing does not have to be carried out within the apparatus and further, which should be subjected to the multiplication processing can be set up preliminarily. Thus, it is permissible to connect a coefficient multiplying circuit 6 to the (A+B) adding circuit 4 side as indicated in this embodiment.

For the reason, the disc recording and/or reproducing apparatus comprises the (A+B) adding circuit 4 for detecting the (A+B) signal obtained by summing the light reception signals from the two light receiving regions A and B on the outer side of the DVD 31 and a (C+D) adding circuit 5 for detecting the (C+D) signal obtained by summing the reception signals from the two light receiving regions C and D on the inner side of the DVD 31.

Further, the disc recording and/or reproducing apparatus contains a coefficient multiplying circuit 6, which inverts the polarity of the (A+B) signal from the (A+B) adding circuit 4 and multiplies with a predetermined coefficient k so as to output $\{-k(A+B)\}$.

In the disc recording and/or reproducing apparatus, by changing the predetermined coefficient k depending on a detection output of the radial push-pull signal, an error rate upon detection of the land pre-pit signal and a shift amount of an objective lens of the optical pickup 2, the detection accuracy of the land pre-pit (LPP) on the optical disc is improved.

The disc recording and/or reproducing apparatus comprises a RPP generation circuit 8 for generating the radial push-pull signal $\{(C+D)-k(A+B)\}$ based on the (C+D) signal and the $\{-k(A+B)\}$ signal, a binarizing circuit 9 for binarizing the land pre-pit signal (LPP signal) contained in the radial push-pull signal from the RPP generation circuit 8, a LPP decoding circuit 10 for decoding address information and the like of the land pre-pit signal (LPP signal) binarized by the binarizing circuit 9 and a CPU 11 which computes an error rate of the land pre-pit signal decoded by the LPP decoding circuit 10 and outputting the error rate.

The disc recording and/or reproducing apparatus comprises an RF circuit 7 for generating a sum signal {RF signal: (A+B+C+D)} by summing up the (A+B) signal from the (A+B) adding circuit 4 and the (C+D) signal from the (C+D) adding circuit 5, an LPP amplitude detecting circuit (land pre-pit signal amplitude detecting circuit) 12, which extracts a land pre-pit signal (LPP signal) from the radial push-pull signal sent from the RPP generation circuit 8, detects the amplitude of this land pre-pit signal and outputs its result to an LPPb generation circuit 14 and a coefficient setting circuit 16, and a WBL amplitude detecting circuit (wobbling signal amplitude detecting circuit) 13, which extracts a wobbling signal (WBL signal) of the recording track from the radial push-pull signals sent from the RPP generation circuit 8, detects the amplitude of this wobbling signal and outputs its result to a WBLb generation circuit 15 and the coefficient setting circuit 16.

Further, this disc recording and/or reproducing apparatus comprises the LPPb generation circuit (normalization land pre-pit signal amplitude detecting circuit) 14, which outputs the level of a land pre-pit signal (LPP signal) extracted by the LPP amplitude detecting circuit 12 as a land pre-pit signal (hereinafter referred to as LPPb signal) normalized with respect to the level of a sum signal (A+B+C+D) generated by the RF circuit 7, the WBLb generation circuit (normalized wobbling signal amplitude detecting circuit) 15, which outputs the level of a wobbling signal extracted by the WBL amplitude detecting circuit 13 as a wobbling signal (hereinafter referred to as WBLb signal) normalized with respect to the level of the sum signal (A+B+C+D) generated by the RF circuit 7 and a lens shift amount detecting circuit 17, which detects a lens shift amount in the radial direction from the center of optical axis of an objective lens in the optical pickup 2 and outputs the lens shift amount.

Further, the disc recording and/or reproducing apparatus comprises the coefficient setting circuit 16 for setting the predetermined coefficient k of the coefficient multiplying circuit 6 depending on the error rate from the CPU 11 upon detecting the land pre-pit signal, the amplitude of a land pre-pit signal from the LPP amplitude detecting circuit 12, the amplitude of a wobbling signal from the WBL amplitude detecting circuit 13, the normalized LPPb signal from the LPPb generation circuit 14, the normalized WBLb signal from the WBLb generation circuit 15 and the lens shift amount detected by the lens shift amount detecting circuit 17. Further, it is also permissible to connect only one of a combination of the amplitude of the land pre-pit signal from the LPP amplitude detecting circuit 12 and the amplitude of a wobbling signal from the WBL amplitude detecting circuit 13 and a combination of the normalized LPPb signal from the LPPb generation circuit 14 and the normalized WBLb signal from the WBLb generation circuit 15 to the coefficient setting circuit 16.

[Operation]

Next, the operation for detecting the land pre-pit (LPP), which is a major portion of the present invention in the disc recording and/or reproducing apparatus of the first embodiment having such a structure, will be described.

Figure 7:
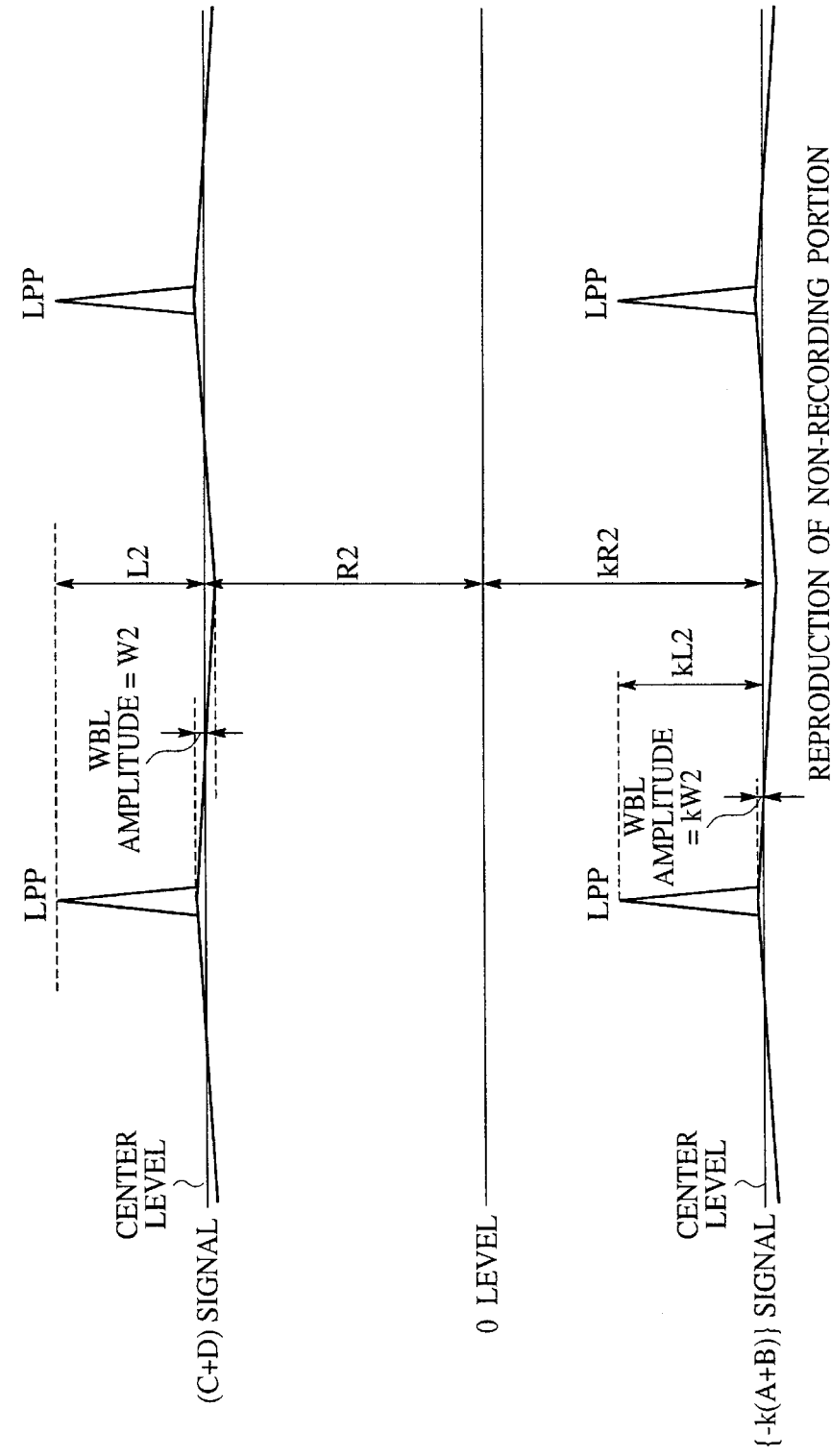
FIG. 7 is a diagram of a wobbling signal and a land pre-pit signal which form (C+D) signal and $\{-K(A+B)\}$ signal for detecting the radial push-pull signal.
Figure 8:
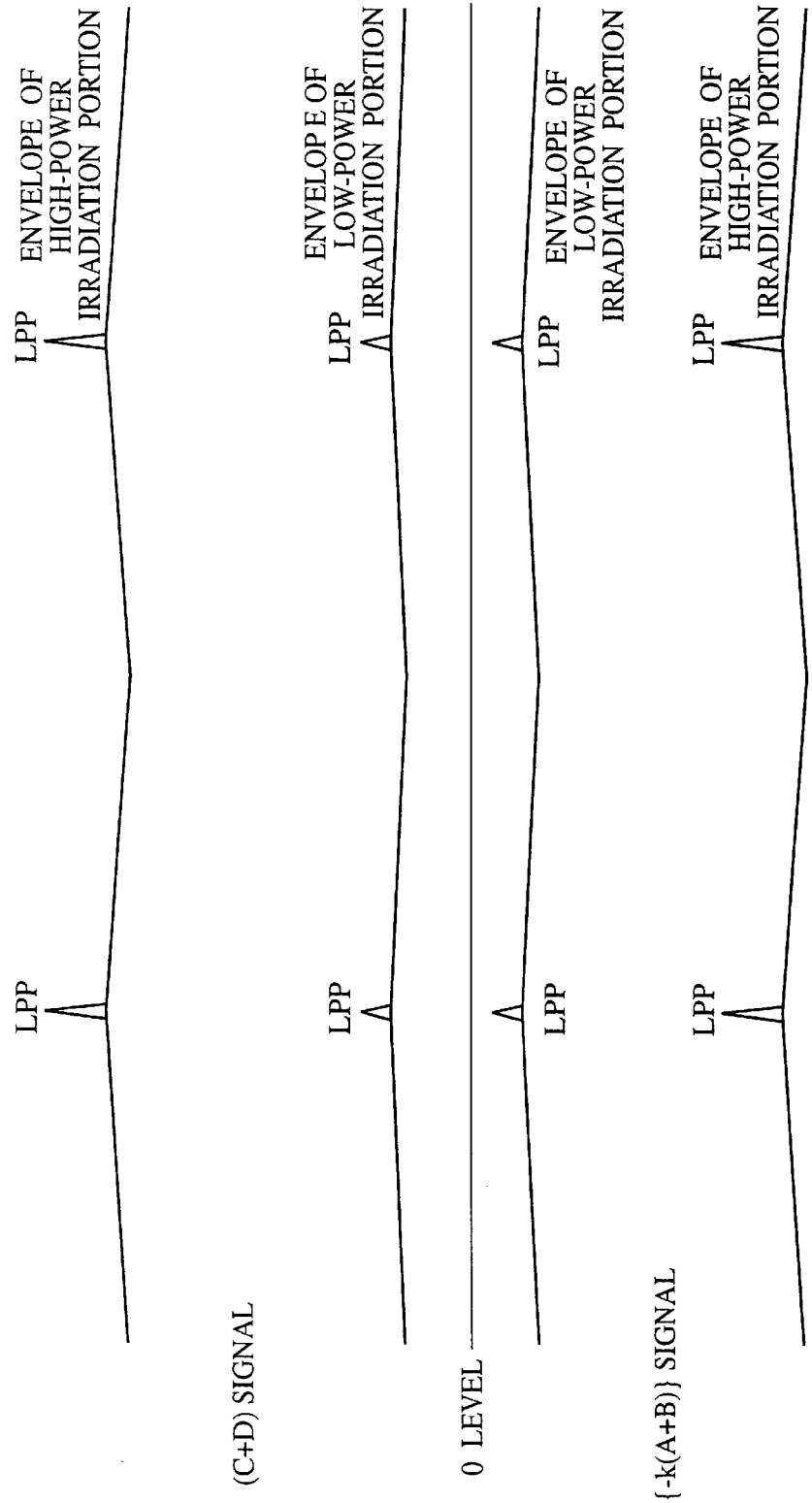
FIG. 8 is a diagram of the waveforms of a high power irradiation portion and a low power irradiation portion of the (C+D) signal and $\{-k(A+B)\}$ signal.
Figure 12:
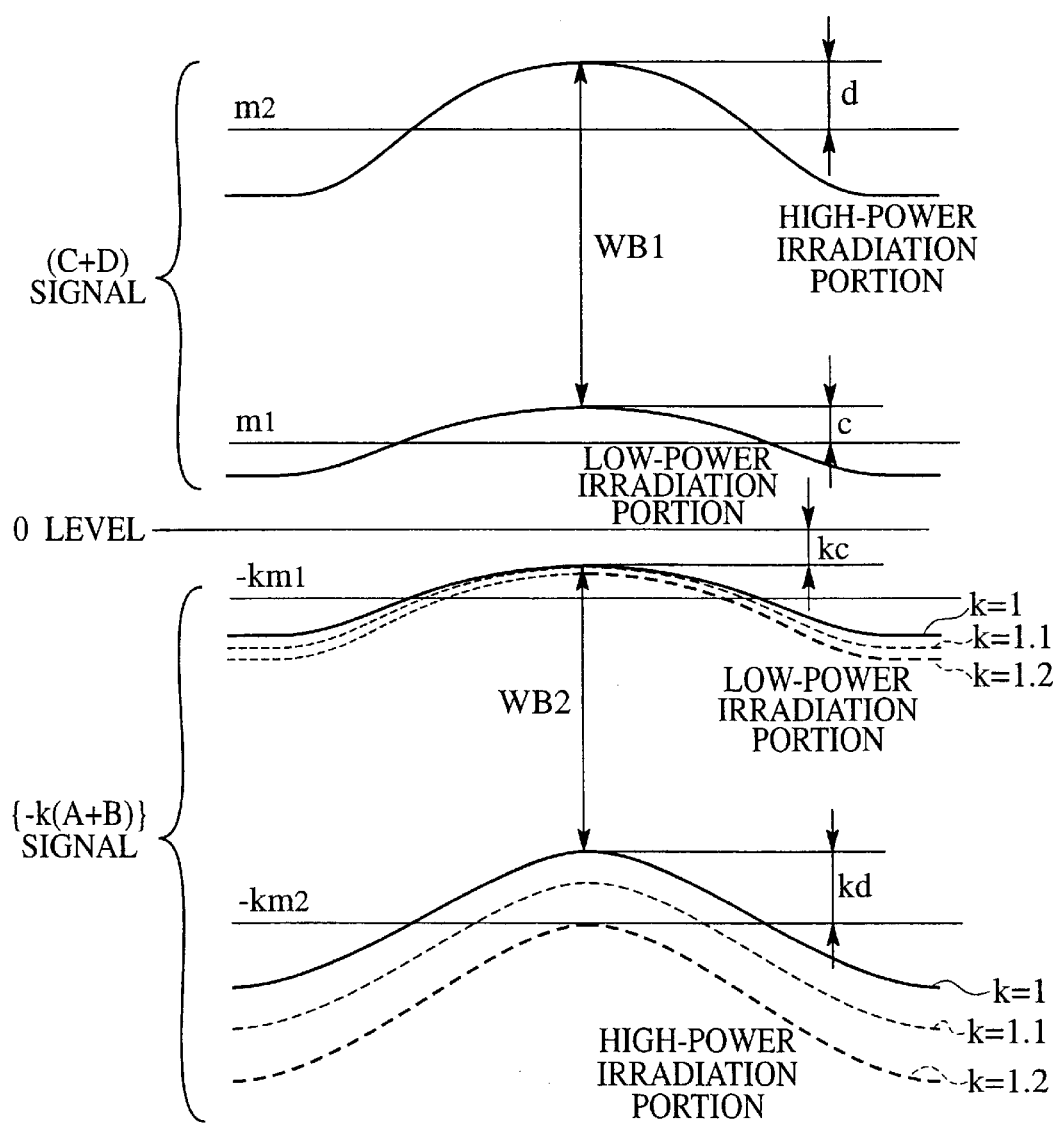
FIG. 12 is a diagram showing the waveforms of the high-power irradiation portion and the low-power irradiation portion of the $\{-k(A+B)\}$ signal which changes depending on the value of a predetermined coefficient k to be multiplied by paying attention to the wobbling signal.
Figure 13:
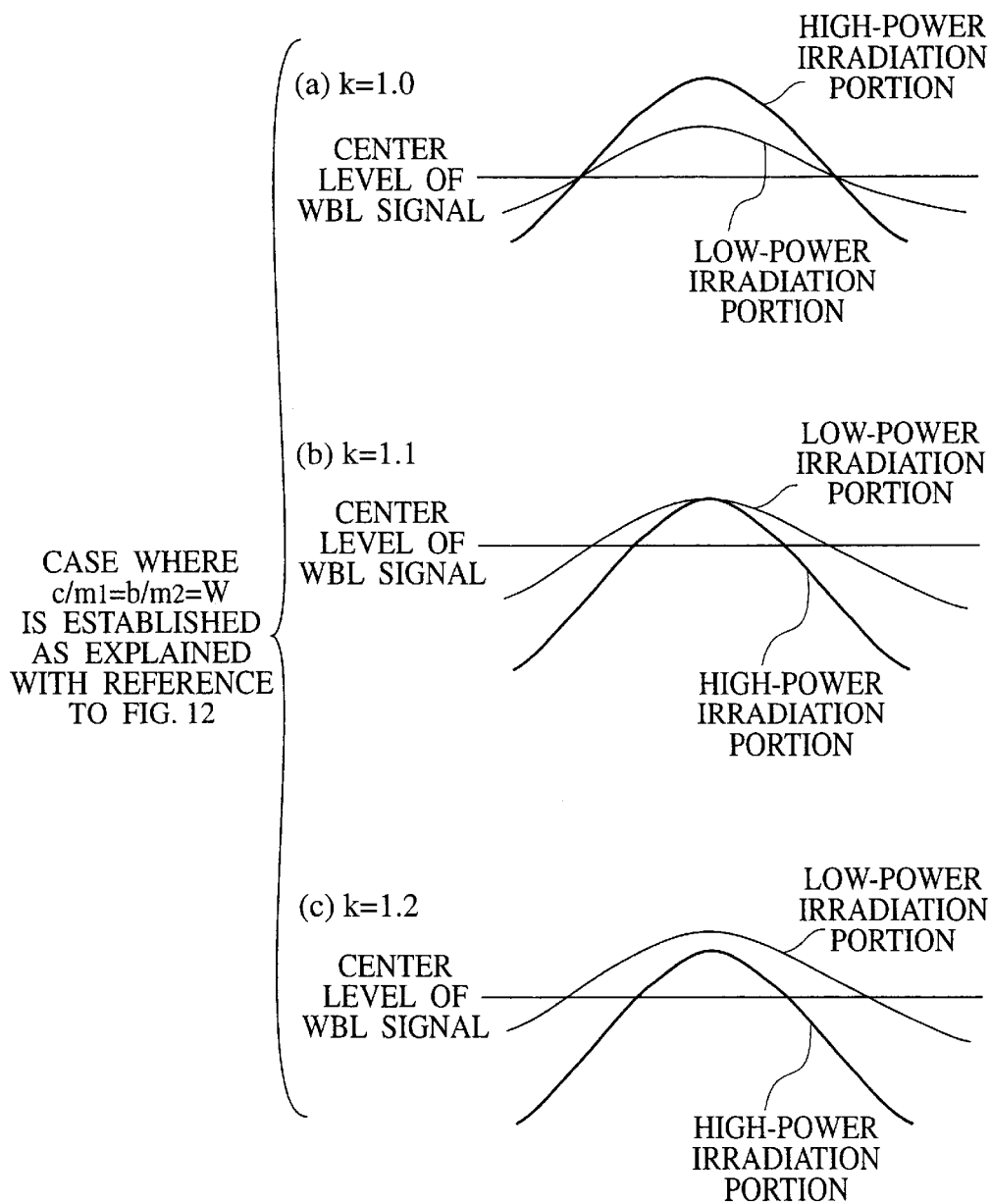
FIG. 13 is a diagram showing the waveforms of the high-power irradiation portion and the low-power irradiation portion of the $\{-k(A+B)\}$ signal which changes depending on the value of a predetermined coefficient k to be multiplied by paying attention to the wobbling signal, if the relation of c/m1=d/m2=W shown in FIG. 12 is established.

In FIGS. 6, 7, 8 and the like, the wobbling signal and LPP signal are expressed with a straight line approximately as is different from FIGS. 12, 13 because they are expressed only in a simplified way.

The present invention includes reproducing a non-recording portion and thus measuring a related basic parameter about that disc. Because in an actual recording and/or reproducing apparatus, the non-recording region on the disc can be recognized, it is possible to seek that region so as to obtain the aforementioned parameter. A read-in region on the most inside periphery of the disc and a read-out region on the most outer periphery of the disc are portions to be recorded after all user data are recorded into this disc and after this region is recorded, anymore recording is not carried out in this disc. Measurement of the related basic parameter about the disc of the present invention can be carried out from the lead-in region or the lead-out region.

FIG. 6 shows the relation between the sum signal output (A+B+C+D) from the RF circuit 7 when reproducing the non-recording portion of the DVD 31 and the radial push-pull signal {(C+D)-k(A+B)} from the RPP generation circuit 8. As evident from FIG. 6, the level of the RF signal obtained by adding each of the signals A–D is higher than the level of the radial push-pull signal, which is a differential signal obtained by subtracting {k(A+B)} from the (C+D) signal.

Further, it is evident that the land pre-pit signal (LPP signal) which appears at a timing of 90° in the phase of the wobbling signal is overlaid on the wobbling signal (WBL signal) which vibrates up and down with respect to 0 level. In this case, the amplitude R1 of the sum signal (A+B+C+D), the amplitude W1 of the wobbling signal (WBL) and the amplitude L1 of the land pre-pit signal (LPP signal) are assumed to be values from 0 level to the highest points of respective signals shown in the same Figure. As for the aforementioned land pre-pit signal (LPP signal), its signal on the normal side with respect to its track is shown here, while representation of the land pre-pit signal (LPP signal) on an opposite side to the normal side is omitted.

Next, FIG. 7 is a diagram showing the radial push-pull signal {(C+D)-k(A+B)} when the non-recording portion described in FIG. 6 is reproduced, with the (C+D) signal and the {-k(A+B)} signal having inverted polarity shown separately. As evident from this FIG. 7, the (C+D) signal appears on the side of the positive polarity with respect to 0 level, while the {-k(A+B)} signal appears on the side of the negative polarity with respect to 0 level. Further it is also evident that each of the (C+D) signal and {-k(A+B)} signal is composed of a wobbling signal and the land pre-pit signal (LPP signal) overlaid on the wobbling signal at a timing of 90° in the phase of the wobbling signal.

At this time, the amplitude R2 up to the center level of the (C+D) signal on the side of the positive polarity and the amplitude kR2 up to the center level of the {-k(A+B)} signal on the side of the negative polarity are expressed with reference to the 0 level as shown in the same Figure. Further, the amplitude W2 of the wobbling signal (WBL signal) corresponding to the (C+D) signal and the amplitude L2 of the land pre-pit signal (LPP signal) corresponding thereto are values extending from the center level of the (C+D) signal up to tops of the respective signals shown in the same Figure. Further, the amplitude kW2 of the wobbling signal (WBL) corresponding to the {-k(A+B)} signal and the amplitude kL2 of the land pre-pit signal (LPP signal) corresponding thereto are values extending from the center level of the {-k(A+B)} signal up to tops of the respective signals shown in the same Figure.

FIG. 8 shows the state when information signal is recorded in the wobbling groove 32 in the DVD 31. Assuming that when information signal is recorded with pulse-like light beam BM, a portion having a large irradiation amount of the light beam BM (portion corresponding to "information signal 1") is high-power irradiation portion and that a portion having a small irradiation amount of the light beam BM (portion corresponding to "information signal 0") is a low-power irradiation portion, envelopes of the high-power irradiation portion and the low-power irradiation portion with respect to the (C+D) signal on the side of the positive polarity and the {-k(A+B)} signal on the side of the negative polarity are indicated separately. As evident from FIG. 8, if the high-power irradiation portion and the low-power irradiation portion exist for both the (C+D) signal and the {-k(A+B)} signal, the respective levels of the (C+D) signal and the {-k(A+B)} signal are different from each other. Because such a level difference occurs between the high-power irradiation portion and the low-power irradiation portion, a detection error of the land pre-pit signal occurs at a subsequent stage.

A case for recording will be described below. A description of the case for reproduction is omitted because the portion in which the recording pit is formed in the optical disc corresponds to the low-power irradiation portion while the non-recording portion in which the recording pit is not formed corresponds to the high-power irradiation portion at the time of reproduction and under this condition, the land pre-pit signal may be detected.

Thus, in the disc recording and/or reproducing apparatus of the first embodiment, of the radial push-pull signal {(C+D)-k(A+B)}, the level of the {-k(A+B)} signal is adjusted by controlling the predetermined coefficient k in order to obtain a {-k(A+B)} signal having inverted polarity, so that the detection accuracy of the land pre-pit signal is improved in the subsequent stage. Meanwhile, as the radial push-pull signal, it is permissible to employ the {(A+B)-k(C+D)} signal. In this case, the level of the {-k(C+D)} may be adjusted. A case where the level of the {-k(A+B)} signal is adjusted will be described below.

First, upon recording (or reproduction), light beam for recording (or reproduction) is irradiated from the optical pickup 2 and this optical pickup 2 receives reflected light with the four-division photo detector PD described with reference to FIG. 5A. Light reception signals in the light receiving regions A and B are supplied to the (A+B) adding circuit 4 through a pre-amplifier 3 and light reception signals in the light receiving regions C and D are supplied to the (C+D) adding circuit 5 through the pre-amplifier 3.

The (A+B) adding circuit 4 sums up respective light reception signals from the light receiving regions A and B so as to generate the (A+B) signal and supplies this to the coefficient multiplying circuit 6 and the RF circuit 7. Further, the (C+D) adding circuit 5 sums up respective light reception signals from the light receiving regions C and D so as to generate the (C+D) signal and supplies this to the RPP generation circuit 8 and the RF circuit 7.

The RF circuit 7 sums up the (A+B) signal and the (C+D) signal so as to generate a sum signal, which is the (A+B+C+D) signal, and then supplies this to the LPPb generation circuit 14 and the WBLb generation circuit 15.

An initial value of the coefficient of the coefficient multiplying circuit 6 is set up to "1" so as to output an inputted (A+B) signal just as it is without changing the level thereof. In this case, although the (A+B) signal supplied to the coefficient multiplying circuit 6 is supplied to the RPP generation circuit 8 as it is without the level thereof changed but only the polarity therefore inverted in the initial state, the predetermined coefficient k is changed according to feedback from the coefficient setting circuit 16 in the succeeding state as described later. Therefore, the RPP generation circuit 8 will be described with the predetermined coefficient k.

The RPP generation circuit 8 computes a differential signal by subtracting the {k(A+B) signal} from the aforementioned (C+D) signal so as to generate the radial push-pull signal {(C+D)-k(A+B)} and then supplies this radial push-pull signal to the binarizing circuit 9, the LPP amplitude detecting circuit 12 and the WBL amplitude detecting circuit 13.

The binarizing circuit 9 binarizes a land pre-pit signal (LPP signal) contained in the radial push-pull signal.

The LPP amplitude detecting circuit 12 extracts a land pre-pit (LPP) component contained in the radial push-pull signal so as to detect the amplitude of the land pre-pit signal (LPP signal) and supplies this detection output to the LPPb generation circuit 14 and the coefficient setting circuit 16.

The WBL amplitude detecting circuit 13 extracts a wobble (WBL) component contained in the radial push-pull signal so as to detect the amplitude of the wobbling signal (WBL signal) and then supplies this detection output to the WBLb generation circuit 15 and the coefficient setting circuit 16.

Further, the LPPb generation circuit 14 computes a LPPb signal indicating the rate of the amplitude of the land pre-pit signal to a sum signal based on the sum signal from the RF circuit 7 and the amplitude of the LPP component contained in the radial push-pull signal detected by the LPP amplitude detecting circuit 12 and then supplies this to the coefficient setting circuit 16.

More specifically, assuming that the amplitude of the sum signal (A+B+C+D) shown in FIG. 6 is "R1", the amplitude of the land pre-pit signal is "L1", the amplitude of the (C+D) signal shown in FIG. 7 is "R2", the amplitude of the land pre-pit signal contained in the (C+D) signal is "L2", the amplitude of the {−k(A+B)} signal shown in FIG. 7 is "kR2" and the amplitude of the land pre-pit signal contained in the {−k(A+B)} signal is "kL2", the LPPb generation circuit 15 generates a LPPb signal normalized according to arithmetic operation based on the following equation (1) and then supplies this to the coefficient setting circuit 16.

$$LPPb\ \text{signal} = L1/R1 = kL2/kR2 = L2/R2 \quad (1)$$

Likewise, the WBLb generation circuit 15 computes a WBLb signal indicating the rate of the amplitude of the wobbling signal with respect to the sum signal from the RF circuit 7 based on the sum signal and a wobbling signal detected by the WBL amplitude detection circuit 13 and supplies its result to the coefficient setting circuit 16.

More specifically, assuming that the amplitude of the sum signal (A+B+C+D) shown in FIG. 6 is "R1", the amplitude of the wobbling signal is "W1", the amplitude of the (C+D) signal shown in FIG. 7 is "R2", the amplitude of the wobbling signal in the (C+D) signal is "W2", the amplitude of the {−k(A+B)} signal shown in FIG. 7 is "kR2" and the amplitude of the wobbling signal in the {−k(A+B)} signal is "kW2", the WBLb generation circuit 15 generates a WBLb signal normalized by computation based on a following equation (2) and then supplies its result to the coefficient setting circuit 16.

$$WBLb\ \text{signal} = W1/R1 = kW2/kR2 = W2/R2 \quad (2)$$

On the other hand, the binarizing circuit 9 binarizes a land pre-pit signal (LPP signal) contained in the radial push-pull signal from the RPP generation circuit 8 and supplies the binarized land pre-pit signal (LPP signal) to the LPP decoding circuit 10. The LPP decoding circuit 10 decodes address information and the like contained in this binarized land pre-pit signal (LPP signal) according to this land pre-pit signal (LPP signal).

Then, upon decoding, an error rate upon detection of the land pre-pit signal (LPP signal) is supplied to the CPU 11. The CPU 11 supplies this error rate to the coefficient setting circuit 16 and thus corrects the predetermined coefficient k by an amount taking into account the error rate when the predetermined coefficient k is setup, described later, so as to reduce the error rate in this coefficient setting circuit 16.

The lens shift amount detecting circuit 17 determines whether the center of the optical axis of the objective lens in the optical pickup 2 is shifted to the outer side in the radial direction of the DVD 31 or the inner side of the DVD 31 so as to detect a lens shift amount according to ± depending on the outer side or the inner side. A lens shift amount signal indicating this lens shift amount is supplied to the coefficient setting circuit 16, so that the predetermined coefficient k is corrected by an amount taking into account the lens shift amount to the outer side or the inner side of the DVD 31 upon setting that predetermined coefficient k.

That is, because if the lens shift occurs in FIG. 5A described previously, the position of the beam spot SP focused on the photo detector PD is shifted in the radius direction of the optical disc with respect to the center of the photo detector PD, the output levels of the (A+B) and (C+D) change. Then, this output level can be corrected by correcting the lens shift amount.

More specifically, the lens shift amount detecting circuit 17, although representation thereof is omitted, comprises a slit plate provided on a bobbin for driving the objective lens, a light source for irradiating this slit plate, and a photo detector for receiving light equally through two divided light receiving regions (light receiving regions E, F), irradiated from the light source through a slit in the slit plate. A differential (E−F) of light reception amounts received by these light-receiving regions E, F of this photo detector is detected as a lens shift amount.

In addition to such mechanical detection method for the lens shift amount, for example, it is also possible to detect an offset of the objective lens based on the radial push-pull signal and employs this as the lens shift amount.

Because in a system for detecting a tracking error according to the so-called differential push-pull method (DPP method), the DPP method itself cancels an influence of the lens shift, detection of objective lens offset based on the differential push-pull signal is disabled.

Thus, in this case, it is permissible to provide a radial push-pull signal detecting system separately from the tracking error detection system based on the DPP method and detect an offset of the objective lens based on the radial push-pull signal detected with this radial push-pull signal detecting system while applying tracking servo according to the DPP method.

Next, the predetermined coefficient k set in the coefficient multiplying circuit 6 is set up to "k=1" in the initial state of the apparatus. After that, the coefficient setting circuit 16 controls optimally the predetermined coefficient k of the coefficient setting circuit 16 as described below, according to the LPPb signal, the WBLb signal, the error rate and the lens shift amount signal, which are fed back when the predetermined coefficient k is adjusted to "1".

Conventionally, as a recording medium whose recording track is wobbled, a mini disc (MD), CD-R and the like have been well known. A recording and/or reproducing apparatus for the MD or CD-R adjusts a recording noise to be minimum at a cross point (zero cross point) between the wobbling signal shown in FIG. 6 and the 0 level. According to long term research of an applicant of this patent application, it has been found that the detection accuracy of the land pre-pit signal is improved by adjusting the recording noise to be minimum at a point slightly apart from the zero cross point.

Figure 9:
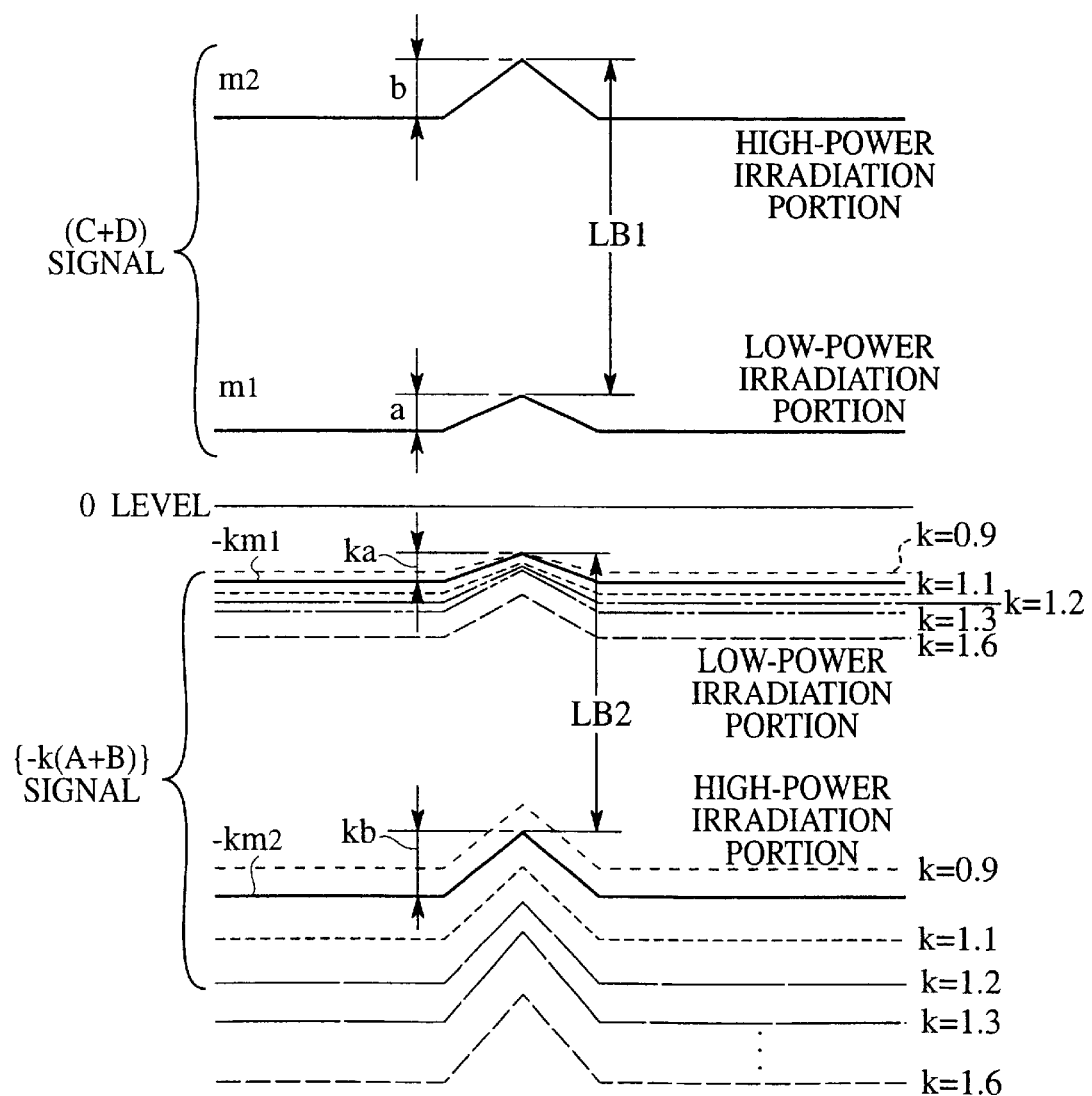
FIG. 9 is a diagram showing the waveforms of the high power irradiation portion and the low power irradiation portion of the $\{-k(A+B)\}$ signal, which changes depending on the value of a predetermined coefficient k to be multiplied by paying attention to the land pre-pit signal.

Hereinafter, this will be described in detail. First, FIG. 9 is a diagram paying attention to only the land pre-pit signal in the radial push-pull signal by removing the wobbling signal component on an assumption that the wobbling signal component in the radial push-pull signal is zero. The positive polarity side relative to 0 level indicates the land pre-pit signal in the high-power irradiation portion and the land pre-pit signal in the low-power irradiation portion of the (C+D) signal. On the other hand, the negative polarity side relative to 0 level indicates the land pre-pit signal in the high-power irradiation portion and the land pre-pit signal in the low-power irradiation portion of the $\{-k(A+B)\}$ signal.

Further, as for the $\{-k(A+B)\}$ signal, the land pre-pit signal in the low-power irradiation portion and the land pre-pit signal in the high-power irradiation portion are indicated about a case where the predetermined coefficient k for multiplication processing is changed from, for example, 5 near 0.9 to near 1.6 for simulation.

Further, as for the (C+D) signal, when it is assumed that the under level of the land pre-pit signal in the low-power irradiation portion is "m1", the under level of the land pre-pit signal in the high-power irradiation portion is "m2", a peak level relative to the under level of the land pre-pit signal in the low-power irradiation portion is "a", and the peak level relative to the under level of the land pre-pit signal in the high-power irradiation portion is "b" while a/m1=b/m2=L, the amplitude LB1, which is an amplitude from a top of a land pre-pit signal waveform in the high-power irradiation portion to a top of the land pre-pit signal waveform in the low-power irradiation portion can be computed in the following equation (3).

$$LB1=m2-m1+b-a=m2-m1+L\times m2-L\times m1 \quad (3)$$

Likewise, as for the $\{-k(A+B)\}$ signal, when it is assumed that the under level of the land pre-pit signal in the low-power irradiation portion is "-km1", the under level of the land pre-pit signal in the high-power irradiation portion is "-km2", a peak level relative to the under level of the land pre-pit signal in the low-power irradiation portion is "ka" and the peak level relative to the under level of the land pre-pit signal in the high-power irradiation portion is "kb" while -kb/-km1=-kb/-km2=L, the amplitude LB2, which is an amplitude from the top of the land pre-pit signal waveform in the low-power irradiation portion to the top of the land pre-pit signal waveform in the high-power irradiation portion can be computed in the following equation (4).

$$LB2=k(m2-m1+a-b)=k(m2-m1+L\times m1-L\times m2) \quad (4)$$

A relation between the aforementioned equations (3) and (4) will be described later.

Figure 10:
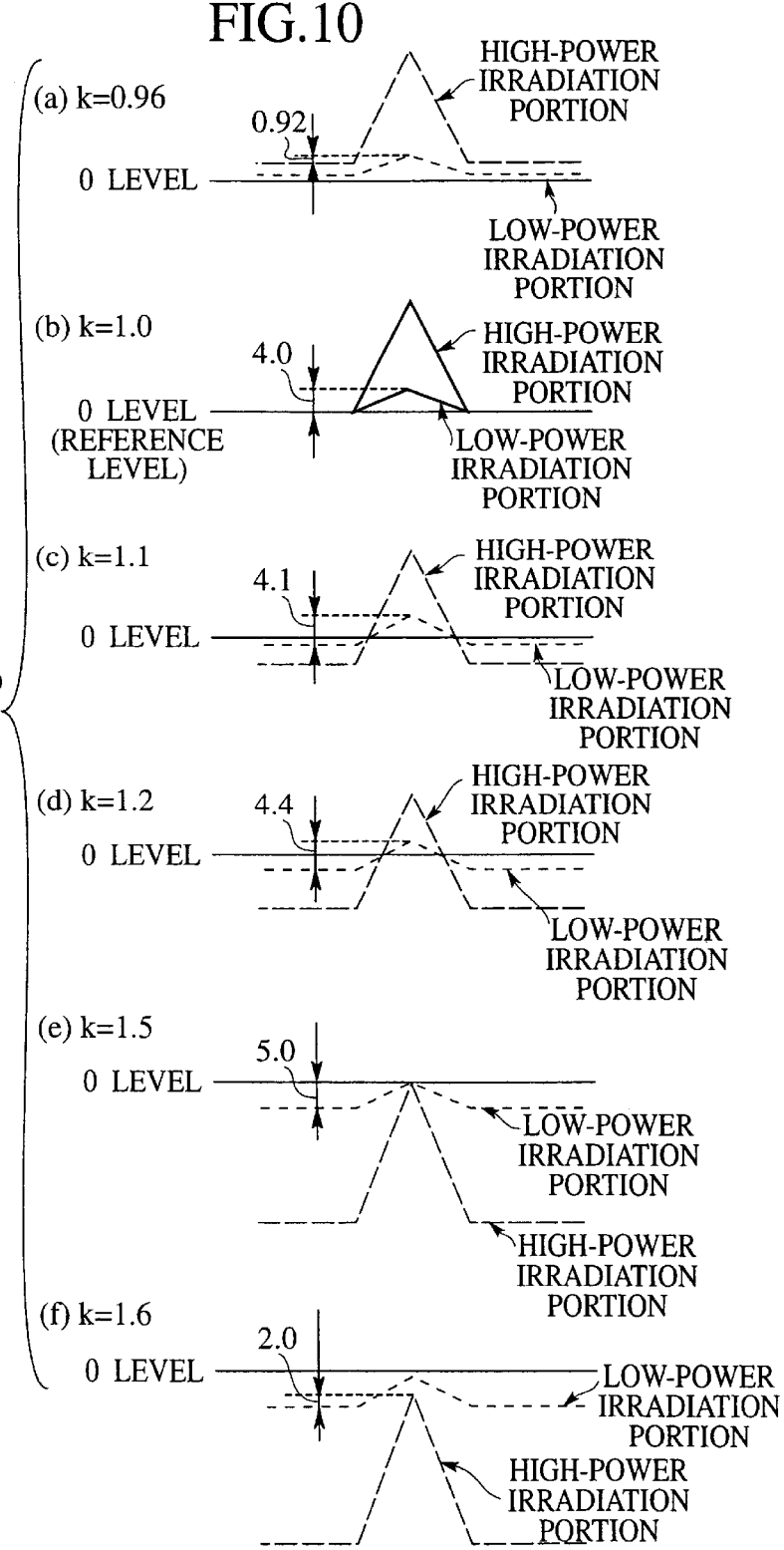
FIG. 10 is a diagram showing the waveforms of the high-power irradiation portion and the low-power irradiation portion of the $\{-k(A+B)\}$ signal which changes depending on the value of a predetermined coefficient k to be multiplied by paying attention to the land pre-pit signal, if the relation of a/m1=b/m2=L shown in FIG. 9 is established.
Figure 11:
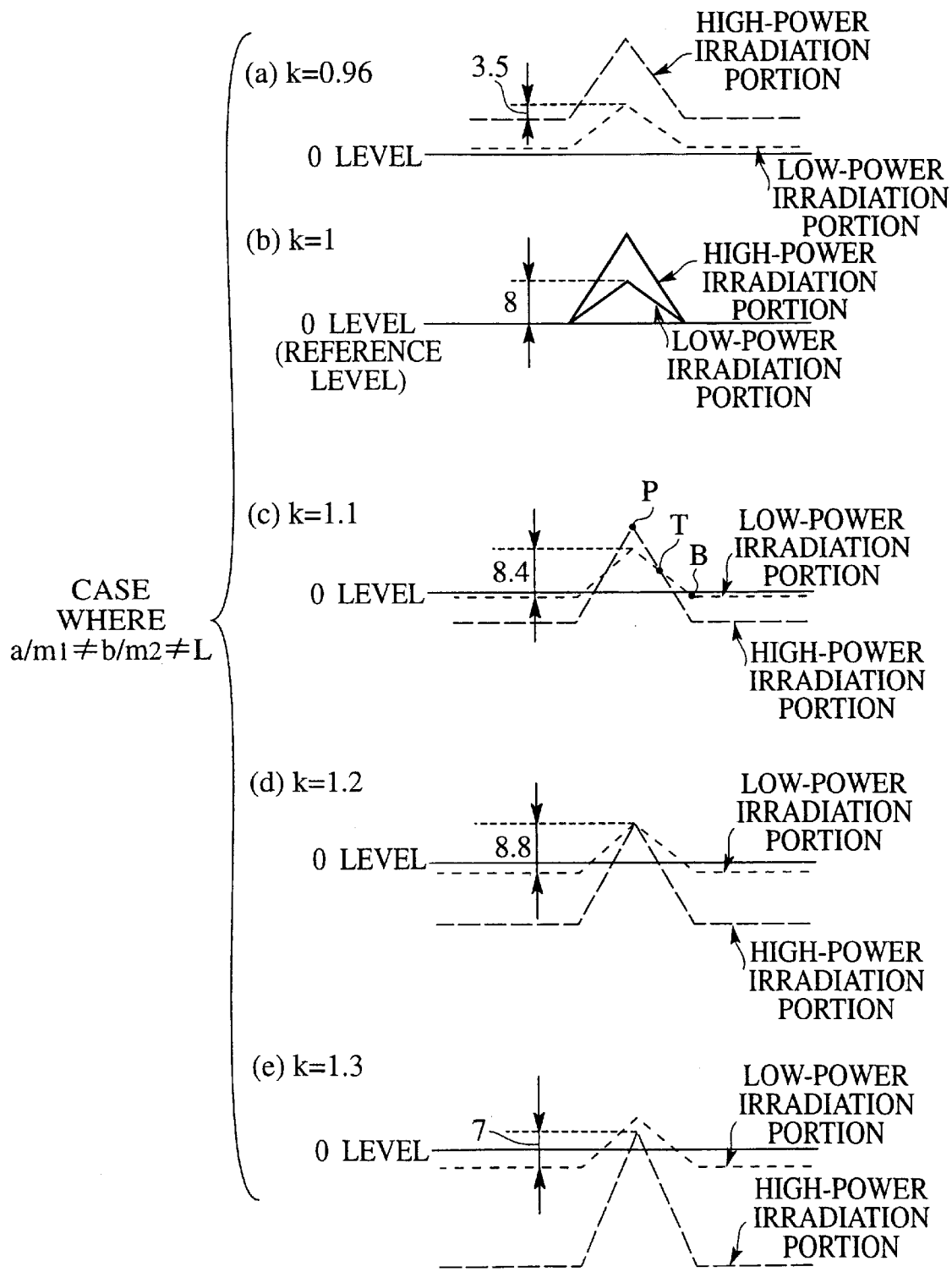
FIG. 11 is a diagram showing the waveforms of the high-power irradiation portion and the low-power irradiation portion of the $\{-k(A+B)\}$ signal which changes depending on the value of a predetermined coefficient k to be multiplied by paying attention to the land pre-pit signal, if the relation of a/m1≠b/m2≠L shown in FIG. 9 is established.

See FIGS. 10, 11. In order to binarize a land pre-pit signal in the radial push-pull signal $\{(C+D)-k(A+B)\}$ in the binarizing circuit 9 securely, how an allowable deflection width (slice window width) of this land pre-pit signal is changed depending on the predetermined coefficient k is simulated by paying attention to only the land pre-pit signals in the (C+D) signal and the $\{-k(A+B)\}$ signal. Consequently, a predetermined coefficient k corresponding to the slice window width capable of detecting both the land pre-pit signal in the high-power irradiation portion and the land pre-pit signal in the low-power irradiation portion securely is obtained. At this time, the slice window width corresponding to the land pre-pit signal is set up in the binarizing circuit 9.

Cases (a) to (f) shown in FIG. 10 are special cases where a/m1=b/m2=L explained in the above FIG. 9 is established and here, simulation is carried out by setting the value of L, for example, to 0.2.

Case (b) in FIG. 10 shows a case where the predetermined coefficient k is set up to "1.0", in which the radial push-pull signal $\{(C+D)-(A+B)\}$ is obtained like conventionally. In this example, the under level of the land pre-pit signal in the high-power irradiation portion and the under level of the land pre-pit signal in the low-power irradiation portion become the same reference level (hereinafter referred to as 0 level). Consequently, the wobbling signal, whose representation is omitted here, can be detected favorably, however the land pre-pit signal cannot be detected so favorably.

That is, the aforementioned slice window width for detecting the land pre-pit signal in the high-power irradiation portion and the land pre-pit signal in the low-power irradiation portion becomes 4.0, which is a difference of level between the peak level of the land pre-pit signal in the low-power irradiation portion and 0 level. Because this slice window width, which is 4.0, is quite small, both the land pre-pit signals cannot be detected securely.

If the predetermined coefficient k is set to "0.96", which is slightly smaller than "1.0" as shown in case (a) in FIG. 10 as compared to the above-explained case (b), the under level of the land pre-pit signal in the high-power irradiation portion and the under level of the land pre-pit signal in the low-power irradiation portion are raised above 0 level. At the same time, the aforementioned slice window width for detecting both the land pre-pit signals becomes 0.92, which is a difference of level between the peak level of the land pre-pit signal in the low-power irradiation portion and the under level of the land pre-pit signal in the high-power irradiation portion. This slice window width, which is 0.92, is extremely smaller than that of case (b) in FIG. 10, so that detection of the land pre-pit signal is disabled and further, the wobbling signal, whose representation is omitted, is worse than the case (b) in FIG. 10.

On the other hand, as shown in case (c) in FIG. 10 as compared to the above-explained case (b), if the predetermined coefficient k is set to "1.1", which is slightly larger than "1.0", the under level of the land pre-pit signal in the high-power irradiation portion and the under level of the land pre-pit signal in the low-power irradiation portion drop below 0 level. At the same time, the aforementioned slice window width for detecting both the land pre-pit signals becomes 4.1, which is a difference of level between the peak level of the land pre-pit signal in the low-power irradiation portion and the under level of the land pre-pit signal in the low-power irradiation portion. Because this slice window value, which is 4.1, is slightly larger than the value in case (b) in FIG. 10, detection of the land pre-pit signal is improved a little.

Although in this case, the wobbling signal, whose representation is omitted, is inferior to the case (b) in FIG. 10, it is a more important matter that the land pre-pit signal can be detected securely than that the detection of the wobbling signal is deteriorated. In cases (d) to (f) in FIG. 10, detection of the wobbling signal is deteriorated gradually.

If as shown in case (d) in FIG. 10, the predetermined coefficient k is set to "1.2" which is larger than that of case (c) in FIG. 10, the same tendency occurs, but the slice window width for detecting both the land pre-pit signals becomes 4.4, which is a difference of level between the peak level of the land pre-pit signal in the low-power irradiation portion and the under level of the land pre-pit signal in the low-power irradiation portion. This slice window width of 4.4 is a favorable value capable of detecting both the land pre-pit signals reliably and securely.

If, as shown in case (e) in FIG. 10, the predetermined coefficient k is set to "1.5", which is larger than that of case (d) in FIG. 10, the under level of the land pre-pit signal in the high-power irradiation portion and the under level of the land pre-pit signal in the low-power irradiation portion drop below 0 level. At the same time, the peak level of the land pre-pit signal in the high-power irradiation portion and the peak level of the land pre-pit signal in the low-power irradiation portion coincide with each other at 0 level.

Further, the aforementioned slice window width for detecting both the land pre-pit signals becomes 5.0, which is a difference of level between 0 level (=peak level of the land pre-pit signal in the high-power irradiation portion and the low-power irradiation portion) and the under level of the land pre-pit signal in the low-power irradiation portion. For a reason which will be described later, this slice window width, which is 5.0, becomes the maximum value capable of detecting both the land pre-pit signals securely. Thus, under the condition of a/m1=b/m2=L, the predetermined coefficient k=1.5 is theoretically an upper limit value. Meanwhile, how to obtain a theoretical lower limit value of the predetermined coefficient k will be described later.

Further, if as shown in case (f) in FIG. 10, the predetermined coefficient k is set to "1.6" which is larger than the value of case (d) in FIG. 10, both the peak level of the land pre-pit signal in the high-power irradiation portion and the peak level of the land pre-pit signal in the low-power irradiation portion drop below 0 level and at the same time, the peak level of the land pre-pit signal in the high-power irradiation portion becomes lower than the peak level of the land pre-pit signal in the low-power irradiation portion. At the same time, the slice window width for detecting both the land pre-pit signals becomes 2.0, which is a difference of level between the peak level of the land pre-pit signal in the high-power irradiation portion and the under-level of the land pre-pit signal in the low-power irradiation portion. This slice window width of 2.0 is extremely low although the predetermined coefficient k is increased slightly by 0.1 from the case (e) in FIG. 10, so that detection of both the land pre-pit signals is worsened extremely.

Therefore, the case where the predetermined coefficient k is "1.5" is a theoretical upper limit value as shown in case (e) in FIG. 10. If this theoretical upper limit value is set up, the predetermined coefficient k has no allowance in a direction in which it is increased more than 1.5. As a result, the predetermined coefficient k of "1.2" to "1.4" (representation of part thereof is omitted) is an actual value under the condition of a/m1=b/m2=L in terms of reliability and safety, as shown in case (d) in FIG. 10.

The condition in which the theoretical upper limit value is applied under a/m1=b/m2=L as shown in case (e) in FIG. 10 is that the amplitude LB1 of the land pre-pit signal in the (C+D) signal based on the equation (3) and the amplitude LB2 of the land pre-pit signal in the {−k(A+B)} signal based on the equation (4) become the same value. As a result, the equation (3) is equal to the equation (4), so that the predetermined coefficient k is calculated in a following equation (5).

$$k = \{m2 - m1 + L(m2 - m1)\}/\{m2 - m1 + L(m1 - m2)\} \quad (5)$$
$$= \{(m2 - m1)(1 + L)\}/\{(m2 - m1)(1 - L)\}$$
$$= (1 + L)/(1 - L)$$

Further, because according to FIG. 7, L in the above equation (5) is obviously equivalent to LPPb signal (=L1/R1=kL2 kR2=L2/R2) normalized by computation according to the aforementioned equation (1), the L can be replaced with the normalized LPPb signal value, so that the equation (5) can be replaced with the equation (6). Consequently, by supplying an output result from the LPPb generation circuit 14 to the coefficient setting circuit 16, the predetermined coefficient k, which is a theoretical upper limit value, is obtained according to the equation (6).

$$k=(1+LPPb)/(1-LPPb) \quad (6)$$

Next, in cases of (a)–(e) in FIG. 11, a/m1=b/m2=L described with the above FIG. 9 is not established. This is a general case where a/m1≠b/m2≠L arises. Here, simulation is carried out by setting the value of L to, for example, about 0.2.

As for cases (a)–(e) in FIG. 11 also, the slice window width for detecting both the land pre-pit signal in the high-power irradiation portion and the land pre-pit signal in the low-power irradiation portion with respect to the predetermined coefficient k is obtained according to substantially the same concept as described in FIG. 10. The reason why the absolute value of the obtained slice window width is different from an absolute value obtained in FIG. 10 is that other factors than the predetermined coefficient k are different.

That is, case (a) in FIG. 11 shows a case where the predetermined coefficient k is set to "0.9". In this case, the under level of the land pre-pit signal in the high-power irradiation portion and the under level of the land pre-pit signal in the low-power irradiation portion rise over 0 level and at the same time, the aforementioned slice window width for detecting the land pre-pit signal in the high-power irradiation portion and the land pre-pit signal in the low-power irradiation portion becomes 3.5, which is a difference of level between the peak level of the land pre-pit signal in the low-power irradiation portion and the under level of the land pre-pit signal in the high-power irradiation portion. This value of 3.5 is so small that detection of the land pre-pit signal is disabled.

Further, case (b) in FIG. 11 shows a case where the predetermined coefficient k is set to "1.0" and in this case, the radial push-pull signal {(C+D)−(A+B)} is obtained like conventionally.

In this case, both the under level of the land pre-pit signal in the high-power irradiation portion and the under level of the land pre-pit signal in the low-power irradiation portion become 0 level (reference level), so that although the wobbling signal, whose representation is omitted, can be detected favorably, detection of the land pre-pit signal is not carried out so favorably. That is, the slice window width for detecting both the land pre-pit signals becomes 8.0, which is a difference of level between the peak level of the land pre-pit signal in the low-power irradiation portion and 0 level. This slice window width of 8.0 is smaller than required, so that both the land pre-pit signals cannot be detected securely.

Case (c) in FIG. 11 shows a case where the predetermined coefficient k is set to "1.1". In this case, both the under level of the land pre-pit signal in the high power irradiation portion and the under level of the land pre-pit signal in the low power irradiation portion drop below 0 level. At the same time, the aforementioned slice window width for detecting both the land pre-pit signals becomes 8.4, which is a difference of level between a peak level of the land pre-pit signal in the low-power irradiation portion and the under level of the land pre-pit signal in the low-power irradiation portion. This slice window width of 8.4 is a favorable value capable of detecting both the land pre-pit signals reliably and securely.

Case (d) in FIG. 11 shows a case where the predetermined coefficient k is set to "1.2". In this case, both the under level of he land pre-pit signal in the high-power irradiation portion and the under level of the land pre-pit signal in the low-power irradiation portion drop below 0 level, so that the peak level of the land pre-pit signal in the high-power irradiation portion coincides with the peak level of the land pre-pit signal in the low-power irradiation portion above 0 level.

Then, the aforementioned slice window width for detecting both the land pre-pit signals becomes 8.8, which is a difference of level between the peak level of the land pre-pit signal in the high-power irradiation portion and low-power irradiation portion and the under level of the land pre-pit signal in the low-power irradiation portion. This slice window width of 8.8 is a maximum value capable of detecting both the land pre-pit signals securely. Therefore, the predetermined coefficient k=1.2 under a/m1≠b/m2≠L is a theoretical upper limit value.

Case (e) in FIG. 11 shows a case where the predetermined coefficient k is set to "1.3". In this case, both the peak level of the land pre-pit signal in the high-power irradiation portion and the peak level of the land pre-pit signal in the low-power irradiation portion drop below 0 level and at the same time, the peak level of the land pre-pit signal in the high-power irradiation portion is lower than the peak level of the land pre-pit signal in the low-power irradiation portion. The slice window width for detecting both the land pre-pit signals becomes 7.0, which is a difference of level between the peak level of the land pre-pit signal in the high-power irradiation portion and the under level of the land pre-pit signal in the low-power irradiation portion. This slice window width of 7.0 is smaller than those of cases (c) and (d) in FIG. 11, so that detection of both the land pre-pit signals is worsened.

Therefore, as shown in case (d) in FIG. 11, the case where the predetermined coefficient k is "1.2" indicates a theoretical upper limit. If this theoretical upper limit is set up, the predetermined coefficient k has no allowance in a direction in which it is increased over 1.2. Thus, from the viewpoint of the reliability and safety, as shown in case (c) in FIG. 11, the case where the predetermined coefficient k is near "1.1" indicates an actual value under a/m1≠b/m2≠L.

The condition in which the predetermined coefficient k reaches its theoretical upper limit under a/m1≠b/m2≠L as shown in case (d) in FIG. 11 can be estimated from the aforementioned equations (5), (6) and then, the following equations (7), (8) are established.

$$1.0<k<\alpha\times\{(1+L)/(1-L)\} \quad (7)$$

$$1.0<k<\alpha\times\{(1+LPPb)/(1-LPPb)\} \quad (8)$$

A coefficient $\alpha$ in the equations (7), (8) is affected by performance of the optical pickup 2, recording power in the optical pickup 2 and reproduction power in reproduction mode and may be smaller than 1.0. This coefficient a may be stored in a memory preliminarily.

Next, FIG. 12 is a diagram in which attention is paid to only the wobbling signal in the radial push-pull signal by removing the land pre-pit signal component by zeroing the land pre-pit signal component in the radial push-pull signal. The side of positive polarity relative to 0 level indicates the wobbling signal in the high-power irradiation portion of the (C+D) signal and the wobbling signal in the low-power irradiation portion thereof. On the other hand, the side of negative polarity relative to 0 level indicates the wobbling signal in the high-power irradiation portion of the {-k(A+B)} signal and the wobbling signal in the low-power irradiation portion thereof.

A simulation for the {-k(A+B)} signal is carried out by changing the predetermined coefficient k to be multiplied in the same manner as described in FIG. 9. For convenience of representation, only cases where the predetermined coefficient k is 1.0, 1.1, 1.2 are indicated here.

Further, as for the (C+D) signal, when it is assumed that the center level of the wobbling signal in the low-power irradiation portion is "m1", the center level of the wobbling signal in the high-power irradiation portion is "m2", the amplitude of an upper piece relative to the center level of the wobbling signal in the low-power irradiation portion is "c", and the amplitude of the upper piece relative to the center level of the wobbling signal in the high-power irradiation portion is "d" while c/m1=d/m2=W, the amplitude WB1, which is an amplitude from a top of a wobbling signal waveform in the high-power irradiation portion to a top of the wobbling signal waveform in the low-power irradiation portion can be computed in a following equation (9).

$$WB1=m2-m1+d-c=m2-m1+W\times m2-W\times m1 \quad (9)$$

Likewise, as for the {-k(A+B)} signal, when it is assumed that the center level of the wobbling signal in the low-power irradiation portion is "-km1", the center level of the wobbling signal in the high-power irradiation portion is "-km2", the amplitude of an upper piece relative to the center level of the wobbling signal in the low-power irradiation portion is "kc" and the amplitude of an upper piece relative to the center level of the wobbling signal in the high-power irradiation portion is "kd" while -kc/-km1=-kd/-km2=W, the amplitude WB2, which is an amplitude from the top of the wobbling signal waveform in the low-power irradiation portion to the top of the wobbling signal waveform in the high-power irradiation portion can be computed in a following equation (10).

$$WB2=k(m2-m1+c-d)=k(m2-m1+W\times m1-W\times m2) \quad (10)$$

A relation between the aforementioned equations (9) and (10) will be described.

See FIG. 13. In order to binarize a land pre-pit signal in the radial push-pull signal {(C+D)-k(A+B)} in the binarizing circuit 9 securely, how this wobbling signal is changed depending on the predetermined coefficient k is simulated by paying attention to only the wobbling signals in the (C+D) signal and the {-k(A+B)} signal. Consequently, a theoretical lower limit of the predetermined coefficient k is determined from a relation between the amplitude of the wobbling signal in the high-power irradiation portion and the amplitude of the wobbling signal in the low-power irradiation portion. The same Figure indicates cases where the predetermined coefficient k is "1.0", "1.1", "1.2" corresponding to FIG. 12.

Cases (a)–(c) shown in FIG. 13 are special cases where c/m1=d/m2=W explained in the above FIG. 12 is established and here, simulation is carried out by setting the value of W, for example, to 0.05.

Case (a) in FIG. 13 is a case where the predetermined coefficient k is set up to "1.0", in which the radial push-pull signal {(C+D)-(A+B)} is obtained like conventionally. In this example, the wobbling signal in the high-power irradiation portion and the wobbling signal in the low-power irradiation portion are both in the same cycle and further, the amplitude of the wobbling signal in the high-power irradiation portion is larger than the amplitude of the wobbling signal in the low-power irradiation portion. This state corresponds to case (b) in FIG. 10 described previously, in which although the wobbling signal can be detected favorably, detection of the land pre-pit signal is not carried out so favorably.

Case (b) in FIG. 13 shows a case where the predetermined coefficient k is set to "1.1". In this example, the wobbling signal in the high-power irradiation portion and the wobbling signal in the low-power irradiation portion have respective cycles different from each other. However, the top of the wobbling signal waveform in the low-power irradiation portion coincides with the top of the wobbling signal waveform in the high-power irradiation portion above the center level and in this state, the predetermined coefficient k=1.1 is a theoretical lower limit under c/m1=d/m2=W. Further, this state corresponds to case (c) in FIG. 10 described previously, in which although detection of the wobbling signal is slightly inferior to case (a) in FIG. 13, the predetermined coefficient k=1.1 is a theoretical lower limit because the land pre-pit signal can be detected in any way.

Case (c) in FIG. 13 shows a case where the predetermined coefficient k is set to "1.2". In this example, the top of the wobbling signal in the high-power irradiation portion is located below the top of the waveform of the wobbling signal in the low-power irradiation portion such that it does not intersect therewith. This state corresponds to case (d) in FIG. 10 described previously, in which although the detection of the wobbling signal is worsened further, detection of the land pre-pit signal is improved (this has been already described).

The condition in which the theoretical lower limit value is applied under c/m1=d/m2=W as shown in case (b) in FIG. 13 is that the amplitude WB1 of the wobbling signal in the (C+D) signal based on the equation (9) and the amplitude WB2 of the wobbling signal in the {−k(A+B)} signal based on the equation (10) become the same value. As a result, the equation (9) is equal to the equation (10), so that the predetermined coefficient k is calculated in the following equation (11).

$$k = \{m2 - m1 + W(m2 - m1)\}/\{m2 - m1 + W(m1 - m2)\} \quad (11)$$
$$= \{(m2 - m1)(1 + W)\}/\{(m2 - m1)(1 - W)\}$$
$$= (1 + W)/(1 - W)$$

Further, because W in the above equation (11) is obviously equivalent to WBLb signal (=W1/R1=kW2/kR2=W2/R2) normalized by computation according to the aforementioned equation (2), according to FIG. 7, the W can be replaced with the normalized WBLb signal value, so that the equation (11) can be replaced with the equation (12). Consequently, by supplying an output result from the WBLb generation circuit 15 to the coefficient setting circuit 16, the predetermined coefficient k, which is a theoretical lower limit value, is obtained according to the equation (12).

$$k=(1+WBLb)/(1-WBLb) \quad (12)$$

In a general case where c/m1=d/m2=W is not established as described in FIG. 12 while c/m1≠d/m2≠W, although representation thereof is omitted, when the top of the waveform of the wobbling signal in the low-power irradiation portion coincides with the top of the waveform of the wobbling signal in the high-power irradiation portion substantially as shown in case (b) in FIG. 13, the predetermined coefficient k becomes its theoretical lower limit value.

In this case, the equations (13), (14) corresponding to the equations (7), (8) are established.

$$1.0<k<\beta\times\{(1+W)/(1-W)\} \quad (13)$$
$$1.0<k<\beta\times\{(1+WBLb)/(1-WBLb)\} \quad (14)$$

A coefficient β in the equations (13), (14) is affected by performance of the optical pickup 2, recording power in the optical pickup 2 and reproduction power in reproduction mode and may be smaller than 1.0. This coefficient β may be stored in a memory preliminarily.

If summarizing the above-described matters, as regards the predetermined coefficient k, the equations (5), (6), (7), (8) described about the land pre-pit signal are established individually and further, the equations (11), (12), (13), (14) described about the wobbling signal are established individually. The equations about the land pre-pit signal and the equations about the wobbling signal only should be combined for each purpose.

Thus, if the predetermined coefficient k exists within a range from its theoretical upper limit value and its theoretical lower limit value, the land pre-pit signal can be detected at a high precision securely. Then, following equations (15) to (18) are established.

$$(1+W)/(1-W)\leq k\leq(1+L)/(1-L) \quad (15)$$
$$(1+WBLb)/(1-WBLb)\leq k\leq(1+LPPb)/(1-LPPb) \quad (16)$$

under the condition of a/m1=b/m2=L and c/m1==d/m2=W, $$\beta\times\{(1+W)/(1-W)\}<k<\alpha\alpha\{(1+L)/(1-L)\} \quad (17)$$
$$\beta\times\{(1+WBLb)/(1-WBLb)\}<k<\alpha\times\{(1+LPPb)/(1-LPPb)\} \quad (18)$$

under the condition of a/m1≠b/m2≠L and c/m1 ≠d/m2≠W.

More specifically, although the predetermined coefficient k is conventionally set to "1.0", according to this embodiment, the predetermined coefficient k is set larger than 1.0 and in a range capable of detecting the land pre-pit signal through feedback process, based on i) the amplitude of the land pre-pit signal or the amplitude of the land pre-pit signal and the amplitude of the wobbling signal; or the predetermined coefficient k is set larger than 1.0 and in a range capable of detecting the land pre-pit signal based on the ii) the amplitude of the normalized land pre-pit signal or the amplitude of the normalized land pre-pit signal and the amplitude of the normalized wobbling signal. Consequently, the land pre-pit signal can be detected at a high precision securely, so that upon recording or reproducing into/from a disc-like recording medium, the land pre-pit signal corresponding to a land pre-pit formed in the land 33 can be detected at a high precision.

Further, in the disc recording and/or reproducing apparatus of the first embodiment, the coefficient setting circuit 16 sets the predetermined coefficient k to be set in the coefficient multiplying circuit 6 in a range from the aforementioned theoretical upper limit value and the theoretical lower limit value, based on the LPP signal, WBL signal, LPPb signal, WBLb signal, an error rate upon detecting of the land pre-pit signal and a shift amount of an objective lens of the optical pickup 2. More specifically, the predetermined coefficient k is set larger than 1.0and in a range capable of detecting the land pre-pit signal.

Consequently, upon recording, the land pre-pit signal can be detected securely at a high precision irrespective of the high-power irradiation portion and the low-power irradiation portion on the DVD 31. Further, the land pre-pit signal can be detected securely at a high precision irrespective of a recording pit formation position and space portion (non-recording portion) on the DVD 31.

Figure 14:
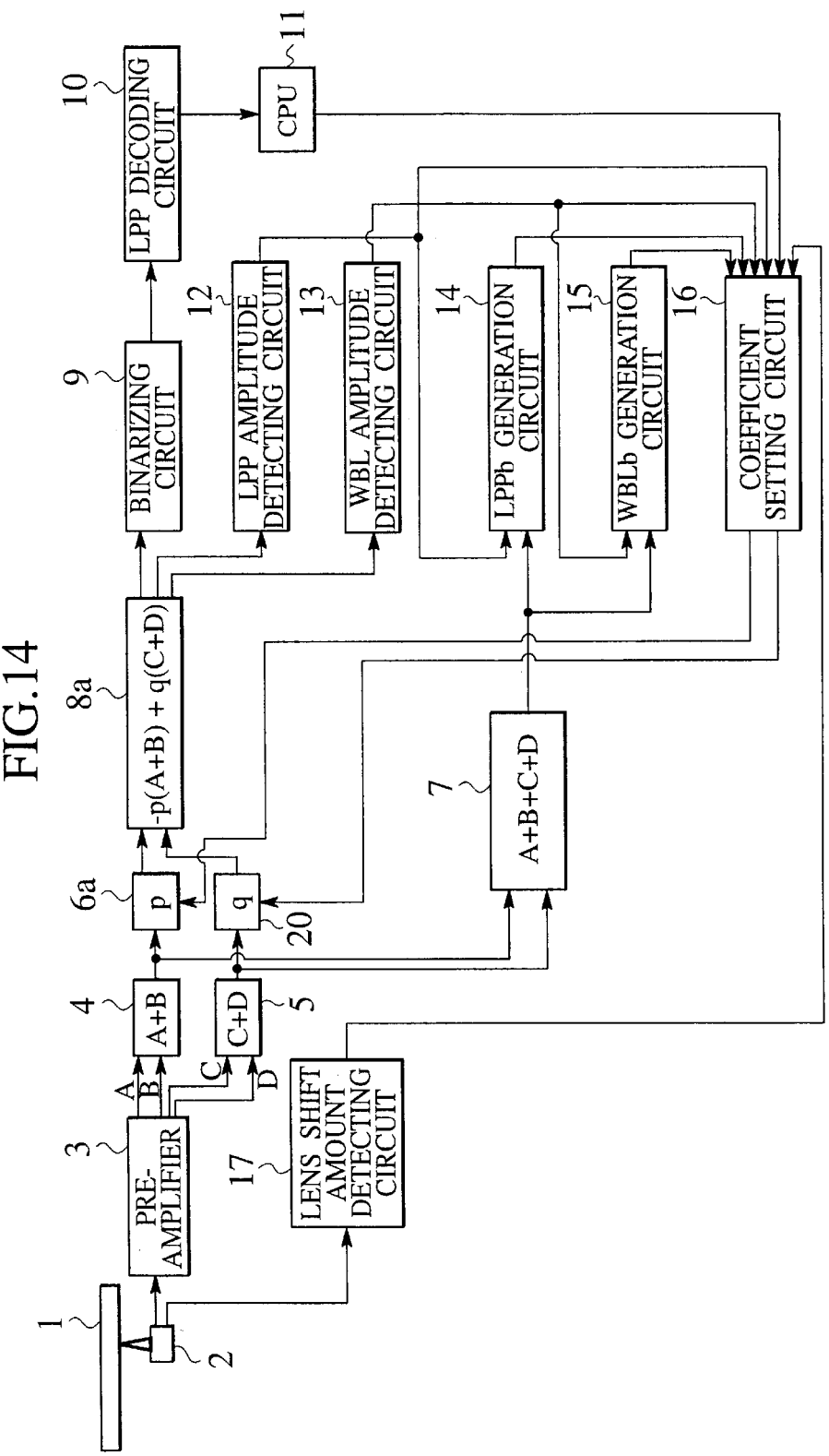
FIG. 14 is a block diagram showing a disc recording and/or reproducing apparatus according to a second embodiment.

<Second Embodiment>
[Construction]
FIG. 14 is a block diagram of a disc recording and/or reproducing apparatus of a second embodiment. As evident from the same Figure, the disc recording and/or reproducing apparatus of the second embodiment comprises an optical pickup 2 for carrying out recording/reproduction of data by irradiating the DVD 31 with light beam from a semiconductor laser (not shown) through an objective lens (not shown) and a preamplifier 3 for amplifying an output of the optical pickup 2 at a predetermined gain and outputting its result.

Figure 15A:
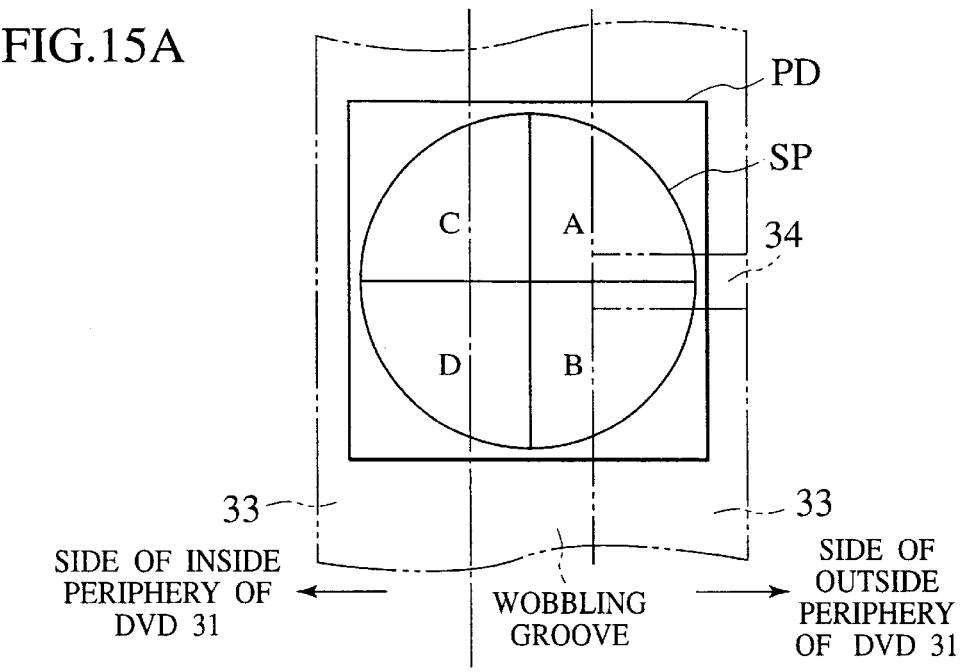
FIGS. 15A to 15C are diagrams for explaining a divided light-receiving region of a photo detector provided on an optical pickup of the disc recording and/or reproducing apparatus of the second embodiment and for showing an output waveform of the photo detector.

FIG. 15A is a schematic diagram showing a condition in which the photo detector PD in the optical pickup is located in the center of a wobbling groove 32 and a land pre-pit 34 on a land 33 on the right of the same Figure is being detected with this photo detector PD.

The aforementioned photo detector PD is formed in a substantially rectangular form and its entire light-receiving region is divided equally to four sections with a straight line along the diameter direction of the DVD 31 and a line along the track direction. The light spot SP focused on this photo detector PD is comprised of two pairs, which are a combination of a light receiving region A and a light receiving region B located on the outer side with respect to the DVD 31 and a combination of a light receiving region C and a light receiving region D located on the inner side, so that it is divided to two sections with respect to a straight line along the direction of the recording track of the DVD 31.

Figure 15B:
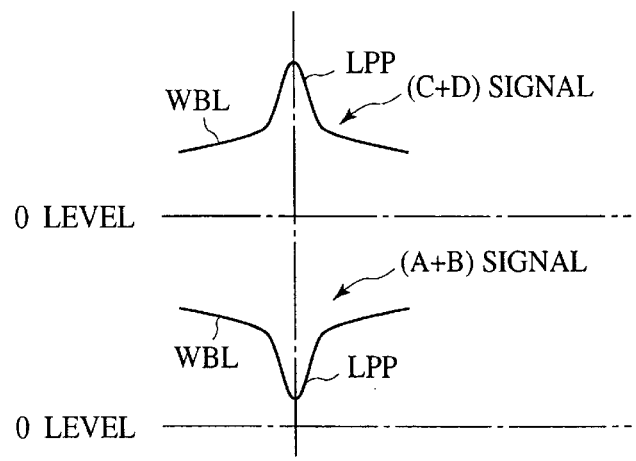

When light reception output is outputted from the photo detector PD, as shown in FIG. 15B, (A+B) signal obtained by summing up light reception signals from the two light receiving regions A and B on the outer side of the DVD 31 and (C+D) signal obtained by summing up light reception signals from the two light receiving regions C and D on the inner side of the DVD 31 are outputted. At this time, brightnesses on the outer side and inner side of the DVD 31 are unbalanced due to an influence by refraction of the light beam BM to the land pre-pit 34 on the photo detector PD. Thus, the (A+B) signal and the (C+D) signal are outputted as one is a turned-over type of the other on the side above 0 level.

At this time, it is absolutely necessary that the output amplitude of the (A+B) signal and the output amplitude of the (C+D) signal be substantially of the same level. If both the signals are not substantially the same level due to adjustment condition of the optical pickup or the like, the (A+B) adding circuit and the (C+D) adding circuit only have to be adjusted with an appropriate adjusting circuit, so that output amplitudes of both are substantially of the same level, before a differential signal is produced with a RPP generation circuit 8, which will be described later.

Figure 15C:
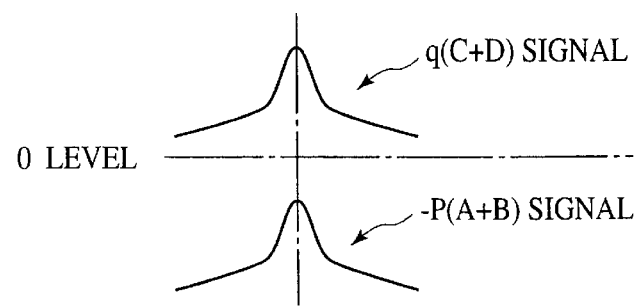

After that, if a radial push-pull signal is generated from the (A+B) signal and the (C+D) signal outputted from the photo detector PD, q(C+D) obtained by multiplying the (C+D) signal with a predetermined coefficient q and {−p(A+B)} signal obtained by multiplying a predetermined coefficient p with minus sign in order to invert the polarity of the (A+B) signal are obtained above and below the 0 level as shown in FIG. 15C. Therefore, a differential signal {q(C+D)−p(A+B)}, which is a differential between these respective signals, is generated as the radial push-pull signal.

In this case, in FIG. 15B, a multiplication processing of multiplying a predetermined coefficient p with minus sign has to be carried out only on the signal (A+B) including the land pre-pit signal (LPP signal) directed to 0 level (directed downward) with respect to the wobbling signal (WBL signal). If the (C+D) includes the land pre-pit signal (LPP signal) directed downward, different from shown here, the (C+D) may be subjected to multiplication processing of being multiplied with the coefficient p while the other is multiplied with a coefficient q. However, this determination is not carried out in the apparatus and further, which should be subjected to the multiplication processing can be set up preliminarily. Thus, it is permissible to connect a coefficient p multiplying circuit 6 to the (A+B) adding circuit 4 side and a coefficient q multiplying circuit 20 to the (C+D) adding circuit 5 side as indicated in this embodiment.

For the reason, the disc recording and/or reproducing apparatus comprises the (A+B) adding circuit 4 for detecting the (A+B) signal obtained by summing the light reception signals from the two light receiving regions A and B on the outer side of the DVD 31 and a (C+D) adding circuit 5 for detecting the (C+D) signal obtained by summing the reception signals from the two light receiving regions C and D on the inner side of the DVD 31.

Further, the disc recording and/or reproducing apparatus contains a coefficient p multiplying circuit 6a, which inverts the polarity of the (A+B) signal from the (A+B) adding circuit 4 and multiplies with a predetermined coefficient p so as to output {−p(A+B)}.

Further, the disc recording and/or reproducing apparatus comprises a coefficient q multiplying circuit 20, which multiplies the (C+D) signal from the (C+D) adding circuit 5 with a predetermined coefficient q so as to output {q(C+D)}.

In the disc recording and/or reproducing apparatus, by changing the predetermined coefficients p, q depending on a detection output of the radial push-pull signal, an error rate upon detection of the land pre-pit signal and a shift amount of an objective lens of the optical pickup 2, the detection accuracy of the land pre-pit (LPP) on the optical disc is improved.

The disc recording and/or reproducing apparatus comprises a RPP generation circuit 8a for generating the radial push-pull signal {q(C+D)−p(A+B)}, a binarizing circuit 9 for binarizing the land pre-pit signal (LPP signal) contained in the radial push-pull signal from the RPP generation circuit 8a, a LPP decoding circuit 10 for decoding address information and the like of the land pre-pit signal (LPP signal) binarized by the binarizing circuit 9 and a CPU 11 which computes an error rate of the land pre-pit signal decoded by the LPP decoding circuit 10 and outputting this error rate.

The disc recording and/or reproducing apparatus comprises an RF circuit 7 for generating a sum signal {RF signal: (A+B+C+D)} by summing up the (A+B) signal from the (A+B) adding circuit 4 and the (C+D) signal from the (C+D) adding circuit 5, an LPP amplitude detecting circuit (land pre-pit signal amplitude detecting circuit) 12, which extracts a land pre-pit signal (LPP signal) from the radial push-pull signal sent from the RPP generation circuit 8a, detects the amplitude of this land pre-pit signal and outputs its result to an LPPb generation circuit 14 and the coefficient setting circuit 12, and a WBL amplitude detecting circuit (wobbling signal amplitude detecting circuit) 13, which extracts a wobbling signal (WBL signal) of the recording track from the radial push-pull signals sent from the RPP generation circuit 8a, detects the amplitude of this wobbling signal and outputs its result to a WBLb generation circuit 15 and the coefficient setting circuit 16.

Further, this disc recording and/or reproducing apparatus comprises the LPPb generation circuit (normalization land pre-pit signal amplitude detecting circuit) 14, which outputs the level of a land pre-pit signal (LPP signal) extracted by the LPP amplitude detecting circuit 12 as a land pre-pit signal (hereinafter referred to as LPPb signal) normalized with respect to the level of a sum signal (A+B+C+D) generated by the RF circuit 7, the WBLb generation circuit (normalized wobbling signal amplitude detecting circuit) 15, which outputs the level of a wobbling signal extracted by the WBL amplitude detecting circuit 13 as a wobbling signal (hereinafter referred to as WBLb signal) normalized with respect to the level of the sum signal (A+B+C+D) generated by the RF circuit 7 and a lens shift amount detecting circuit 17, which detects a lens shift amount in the radial direction from the center of optical axis of an objective lens in the optical pickup 2 and outputs this lens shift amount.

Further, the disc recording and/or reproducing apparatus comprises the coefficient setting circuit 16 for setting the predetermined coefficient p of the coefficient p multiplying circuit 6a and the predetermined coefficient q of the coefficient q multiplying circuit 20 depending on the error rate from the CPU 11 upon detecting the land pre-pit signal, the amplitude of a land pre-pit signal from the LPP amplitude detecting circuit 12, the amplitude of a wobbling signal from the WBL amplitude detecting circuit 13, the normalized LPPb signal from the WBLb generation circuit 15 and the lens shift amount detected by the lens shift amount detecting circuit 17. Further, it is also permissible to connect only one of a combination of the amplitude of the land pre-pit signal from the LPP amplitude detecting circuit 12 and the amplitude of a wobbling signal from the WBL amplitude detecting circuit 13 and a combination of the normalized LPPb signal from the LPPb generation circuit 14 and the normalized WBLb signal from the WBLb generation circuit 15 to the coefficient setting circuit 16.

[Operation]

Next, the operation for detecting the land pre-pit (LPP), which is a major portion of the present invention in the disc recording and/or reproducing apparatus of the second embodiment having such a structure, will be described.

Figure 22:
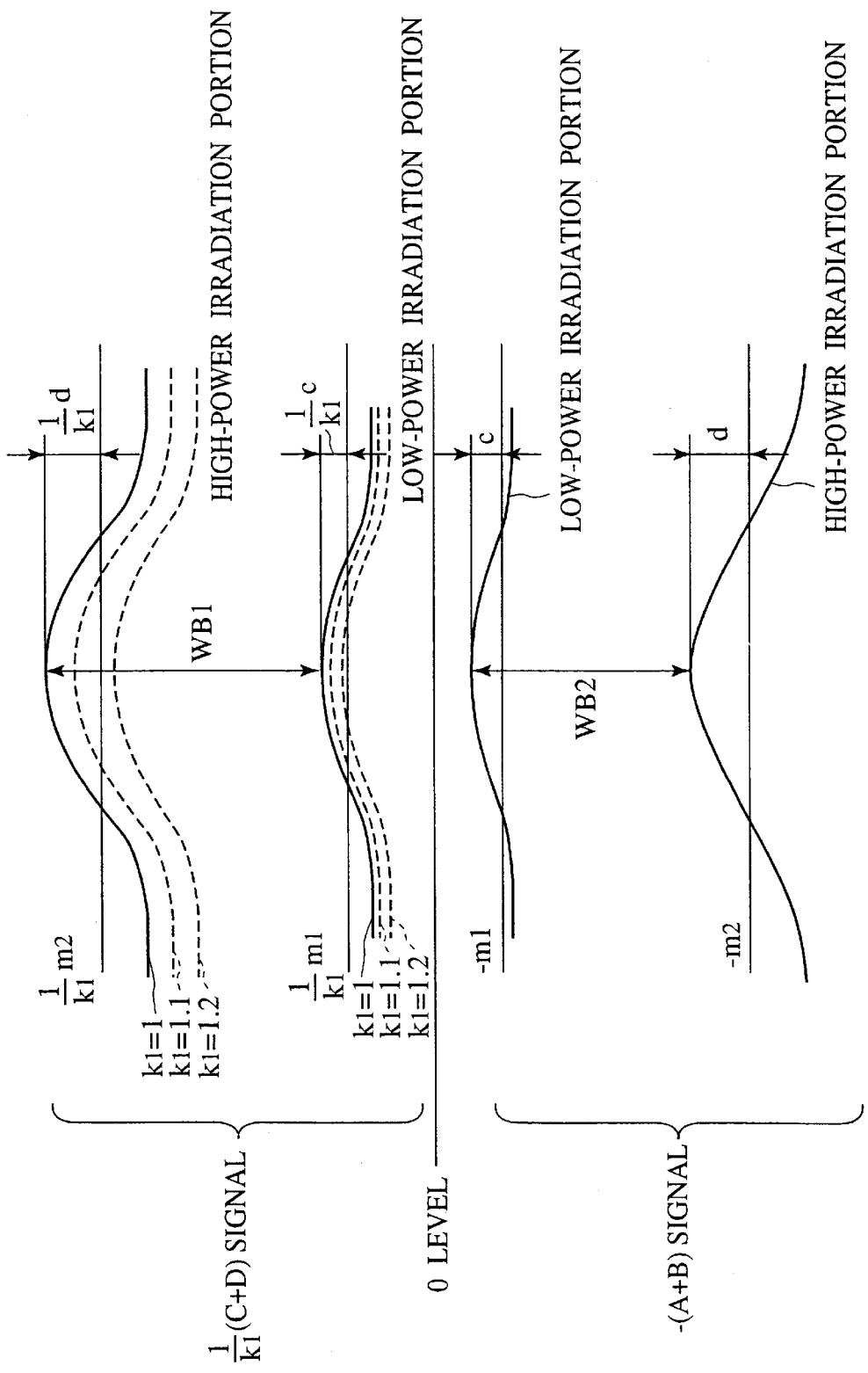
FIG. 22 is a diagram showing the waveforms of the high-power irradiation portion and the low-power irradiation portion of the radial push-pull signal which changes depending on the value of a predetermined coefficient k1 to be multiplied by paying attention to the wobbling signal.

In FIGS. 16, 17, 18 and the like, the wobbling signal and LPP signal are expressed with a straight line approximately and different from FIGS. 22, 23 because they are expressed only in a simplified way.

The present invention includes reproducing a non-recording portion and thus measuring a related basic parameter about that disc. Because in an actual recording and/or reproducing apparatus, the non-recording region on the disc can be recognized, it is possible to seek that region so as to obtain the aforementioned parameter. A read-in region on the most inside periphery of the disc and a read-out region on the most outer periphery of the disc are portions to be recorded after all user data are recorded into this disc and after this region is recorded, anymore recording is not carried out in this disc. Measurement of the related basic parameter about the disc of the present invention can be carried out from the lead-in region or the lead-out region.

FIG. 16 shows the relation between the sum signal output (A+B+C+D) from the RF circuit 7 when reproducing the non-recording portion of the DVD 31 and the radial push-pull signal {q(C+D)−p(A+B)} from the RPP generation circuit 8a. As evident from FIG. 16, the level of the RF signal obtained by adding each of the signals A–D is higher than the level of the radial push-pull signal, which is a differential signal obtained by subtracting p(A+B) from the q(C+D) signal.

Further, it is evident that the land pre-pit signal (LPP signal) which appears at a timing of 90° in the phase of the wobbling signal is overlaid on the wobbling signal (WBL signal) which vibrates up and down with respect to 0 level. In this case, the amplitude R1 of the sum signal (A+B+C+D), the amplitude W1 of the wobbling signal (WBL) and the amplitude L1 of the land pre-pit signal (LPP signal) are assumed to be values from 0 level to the highest points of respective signals shown in the same Figure. As for the aforementioned land pre-pit signal (LPP signal), its signal on the normal side with respect to its track is shown here, while representation of the land pre-pit signal (LPP signal) on an opposite side to the normal side is omitted.

Next, FIG. 17 is a diagram showing the radial push-pull signal {q(C+D)−p(A+B)} when the non-recording portion described in FIG. 16 is reproduced, with the q(C+D) signal and the {−p(A+B)} signal having inverted polarity shown separately. As evident from this FIG. 17, the p(C+D) signal appears on the side of the positive polarity with respect to 0 level, while the {−q(A+B)} signal appears on the side of the negative polarity with respect to 0 level. Further it is also evident that each of the q(C+D) signal and {−p(A+B)} signal is composed of a wobbling signal and the land pre-pit signal (LPP signal) overlaid on the wobbling signal at a timing of 90° in the phase of the wobbling signal.

At this time, the amplitude qR2 up to the center level of the q(C+D) signal on the side of the positive polarity and the amplitude pR2 up to the center level of the {−p(A+B)} signal on the side of the negative polarity are expressed with reference to the 0 level as shown in the same Figure. Further, the amplitude qW2 of the wobbling signal (WBL signal) corresponding to the q(C+D) signal and the amplitude qL2 of the land pre-pit signal (LPP signal) correspond thereto are values extending from the center level of the q(C+D) signal up to tops of the respective signals shown in the same Figure. Further, the amplitude pW2 of the wobbling signal (WBL) corresponding to the {−p(A+B)} signal and the amplitude pL2 of the land pre-pit signal (LPP signal) corresponding thereto are values extending from the center level of the {−p(A+B)} signal up to tops of the respective signals shown in the same Figure.

FIG. 18 shows the state when information signal is recorded in the wobbling groove 32 in the DVD 31. Assuming that when information signal is recorded with pulse-like light beam BM, a portion having a large irradiation amount of the light beam BM (portion corresponding to "information signal 1") is high-power irradiation portion and that a portion having a small irradiation amount of the light beam BM (portion corresponding to "information signal 0") is a low-power irradiation portion, envelopes of the high-power irradiation portion and the low-power irradiation portion with respect to the q(C+D) signal on the side of the positive polarity and the {−p(A+B)} signal on the side of the negative polarity are indicated separately. As evident from FIG. 18, if the high-power irradiation portion and the low-power irradiation portion exist for both the q(C+D) signal and the {−p(A+B)} signal, the respective levels of the q(C+D) signal and the {−p(A+B)} signal are different from each other. Because such a level difference occurs between the high-power irradiation portion and the low-power irradiation portion, a detection error of the land pre-pit signal is generated at a subsequent stage.

A case for recording will be described below. A description of the case for reproduction is omitted because the portion in which the recording pit is formed in the optical disc corresponds to the low-power irradiation portion while the non-recording portion in which the recording pit is not formed corresponds to the high-power irradiation portion at the time of reproduction and under this condition, the land pre-pit signal may be detected.

Thus, in the disc recording and/or reproducing apparatus of the second embodiment, by controlling the predetermined coefficients p, q in the radial push-pull signal {q(C+D)−p(A+B)}, the detection accuracy of the land pre-pit signal in the radial push-pull signal {q(C+D)−p(A+B)} is improved in the subsequent stage.

First, upon recording (or reproduction), light beam for recording (or reproduction) is irradiated from the optical pickup 2 and this optical pickup 2 receives reflected light with the four-division photo detector PD described with reference to FIG. 15A. Light reception signals in the light receiving regions A and B are supplied to the (A+B) adding circuit 4 through a pre-amplifier 3 and light reception signals in the light receiving regions C and D are supplied to the (C+D) adding circuit 5 through the pre-amplifier 3.

The (A+B) adding circuit 4 sums up respective light reception signals from the light receiving regions A and B so as to generate the (A+B) signal and supplies this to the coefficient p multiplying circuit 6 and the RF circuit 7. Further, the (C+D) adding circuit 5 sums up respective light reception signals from the light receiving regions C and D so as to generate the (C+D) signal and supplies this to the RPP generation circuit 8a and the RF circuit 7.

The RF circuit 7 sums up the (A+B) signal and the (C+D) signal so as to generate a sum signal which is the (A+B+C+D) signal, and then supplies this to the LPPb generation circuit 14 and the WBLb generation circuit 15.

Initial values of the coefficients of the coefficient p multiplying circuit 6a and the coefficient q multiplying circuit 20 are set up to "1" so as to output inputted (A+B) signal and (C+D) signal just as they are, without changing the levels thereof. Although they are supplied to the RPP generation circuit 8a as they are in the initial state, the predetermined coefficients p, q are changed according to feedback from the coefficient setting circuit 16 in the succeeding stage as described later. Therefore, the RPP generation circuit 8a will be described with the predetermined coefficients p, q.

The RPP generation circuit 8a computes a differential signal by subtracting the {p(A+B) signal} from the aforementioned q(C+D) signal so as to generate the radial push-pull signal {q(C+D)−p(A+B)} and then supplies this radial push-pull signal to the binarizing circuit 9, the LPP amplitude detecting circuit 12 and the WBL amplitude detecting circuit 13.

The binarizing circuit 9 binarizes a land pre-pit signal (LPP signal) contained in the radial push-pull signal.

The LPP amplitude detecting circuit 12 extracts a land pre-pit (LPP) component contained in the radial push-pull signal so as to detect the amplitude of the land pre-pit signal (LPP signal) and supplies this detection output to the LPPb generation circuit 14 and the coefficient setting circuit 16.

The WBL amplitude detecting circuit 13 extracts a wobble (WBL) component contained in the radial push-pull signal so as to detect the amplitude of the wobbling signal (WBL signal) and then supplies this detection output to the WBLb generation circuit 15 and the coefficient setting circuit 16.

Further, the LPPb generation circuit 14 computes a LPPb signal indicating the rate of the amplitude of the land pre-pit signal to a sum signal based on the sum signal from the RF circuit 7 and the amplitude of the LPP component contained in the radial push-pull signal detected by the LPP amplitude detecting circuit 12 and then supplies this to the coefficient setting circuit 16.

More specifically, assuming that the amplitude of the sum signal (A+B+C+D) shown in FIG. 16 is "R1", the amplitude of the land pre-pit signal when the predetermined coefficients p, q are set to "1" is "L1", the amplitude of the q(C+D) signal shown in FIG. 17 is "qR2", the amplitude of the land pre-pit signal contained in the q(C+D) signal is "qL2", the amplitude of {−p(A+B)} signal shown in FIG. 17 is "pR2" and the amplitude of the land pre-pit signal contained in the {−p(A+B)} signal is "pL2", the LPPb generation circuit 15 generates a LPPb signal normalized according to arithmetic operation based on the following equation (19) and then supplies this to the coefficient setting circuit 16.

$$LPPb\ \text{signal} = L1/R1 = pL2/pR2 = qL2/qR2 = L2/R2 \tag{19}$$

Likewise, the WBLb generation circuit 15 computes a WBLb signal indicating the rate of the amplitude of the wobbling signal with respect to the sum signal from the RF circuit 7 based on the sum signal and a wobbling signal detected by the WBL amplitude detection circuit 13 and supplies its result to the coefficient setting circuit 16.

More specifically, assuming that the amplitude of the sum signal (A+B+C+D) shown in FIG. 16 is "R1", the amplitude of the wobbling signal when the predetermined coefficients p, q are set to 1 is "W1", the amplitude of the wobbling signal in the q(C+D) signal is "qW2", the amplitude of the {−p(A+B)} signal shown in FIG. 17 is "pR2" and the amplitude of the wobbling signal in the {−p(A+B)} signal is "pW2", the WBLb generation circuit 15 generates a WBLb signal normalized by computation based on the equation (20) and then supplies its result to the coefficient setting circuit 16.

$$WBLb\ \text{signal} = W1/W1 = pW2/pR2 = qW2/qR2 = W2/R2 \tag{20}$$

On the other hand, the binarizing circuit 9 binarizes a land pre-pit signal (LPP signal) contained in the radial push-pull signal from the RPP generation circuit 8 and supplies the binarized land pre-pit signal (LPP signal) to the LPP decoding circuit 10. The LPP decoding circuit 10 decodes address information and the like contained in this binarized land pre-pit signal (LPP signal) according to this land pre-pit signal (LPP signal).

Then, upon decoding, an error rate upon detection of the land pre-pit signal (LPP signal) is supplied to the CPU 11. The CPU 11 supplies this error rate to the coefficient setting circuit 16 and thus corrects the predetermined coefficients p, q by an amount taking into account the error rate when the predetermined coefficients p, q are set up, described later, so as to reduce the error rate in this coefficient setting circuit 16.

The lens shift amount detecting circuit 17 determines whether the center of the optical axis of the objective lens in the optical pickup 2 is shifted to the outer side in the radial direction of the DVD 31 or the inner side of the DVD 31 so as to detect a lens shift amount according to ± depending on the outer side or the inner side. A lens shift amount signal indicating this lens shift amount is supplied to the coefficient setting circuit 16, so that the predetermined coefficients p, q are corrected by an amount taking into account the lens shift amount to the outer side or the inner side of the DVD 31 upon setting that predetermined coefficients p, q.

That is, because if the lens shift occurs in FIG. 15A described previously, the position of the beam spot SP focused on the photo detector PD is shifted in the radius direction of the optical disc with respect to the center of the photo detector PD, the output levels of the (A+B) and (C+D) change. Then, this output level can be corrected by correcting the lens shift amount.

More specifically, the lens shift amount detecting circuit 17, although representation thereof is omitted, comprises a slit plate provided on a bobbin for driving the objective lens, a light source for irradiating this slit plate, and a photo detector for receiving light equally through two divided light receiving regions (light receiving regions E, F), irradiated from the light source through a slit in the slit plate. A differential (E−F) of light reception amounts received by these light receiving regions E, F of this photo detector is detected as a lens shift amount.

In addition to such mechanical detection method for the lens shift amount, for example, it is also possible to detect an offset of the objective lens based on the radial push-pull signal and employs this as the lens shift amount.

Because in a system for detecting a tracking error according to the so-called differential push-pull method (DPP method), the DPP method itself cancels an influence of the lens shift, detection of objective lens offset based on the differential push-pull signal is disabled.

Thus, in this case, it is permissible to provide a radial push-pull signal detecting system separately from the tracking error detection system based on the DPP method and detect an offset of the objective lens based on the radial push-pull signal detected with this radial push-pull signal detecting system while applying tracking servo according to the DPP method.

Next, the predetermined coefficients p, q set in the coefficient p multiplying circuit 6a and the coefficient q multiplying circuit 20 respectively are set up to "p=q=1" in the initial state of the apparatus. After that, the coefficient setting circuit 16 controls optimally the predetermined coefficient p of the coefficient p multiplying circuit 6a and the predetermined coefficient q of the coefficient q multiplying circuit 20 as described below, according to the LPPb signal, the WBLb signal, the error rate and the lens shift amount signal, which are fed back when the predetermined coefficients p, q are adjusted to "1".

Conventionally, as a recording medium whose recording track is wobbled, a mini disc (MD), CD-R and the like have been well known. A recording and/or reproducing apparatus for this MD or CD-R adjusts a recording noise to be minimum at a cross point (zero cross point) between the wobbling signal shown in FIG. 16 and the 0 level. According to long term research of an applicant of this patent application, it has been found that the detection accuracy of the land pre-pit signal is improved by adjusting the recording noise to be minimum at a point slightly apart from the zero cross point.

This will be described in detail below. First, cases about multiplying (C+D) with q=1/k1 (k1 is a coefficient to be set up as described below) and multiplying (A+B) with p=−1 will be described.

FIG. 19 is a diagram paying attention to only the land pre-pit signal in the radial push-pull signal by removing the wobbling signal component on an assumption that the wobbling signal component in the radial push-pull signal is zero. The positive polarity side relative to 0 level indicates the land pre-pit signal in the high-power irradiation portion and the land pre-pit signal in the low-power irradiation portion of the (1/k1)(C+D) signal. On the other hand, the negative polarity side relative to 0 level indicates the land pre-pit signal in the high-power irradiation portion and the land pre-pit signal in the low-power irradiation portion of the (A+B) signal.

Further, as for the (1/k1) (C+D) signal, the land pre-pit signal in the low-power irradiation portion and the land pre-pit signal in the high-power irradiation portion are indicated about a case where the predetermined coefficient 1/k1 for multiplication processing is changed from, for example, near 0.6 to near 1.1 (changing k1 for example, from 0.96 to 1.5) for simulation.

Further, as for the (1/k1)(C+D) signal, when it is assumed that the under level of the land pre-pit signal in the low-power irradiation portion is "(1/k1)m1", the under level of the land pre-pit signal in the high-power irradiation portion is "(1/k1)m2", the peak level relative to the under level of the land pre-pit signal in the low-power irradiation portion is "(1/k1)a", and the peak level relative to the under level of the land pre-pit signal in the high-power irradiation portion is "(1/k1)b" while a/m1=b/m2=L, the amplitude LB1, which is an amplitude from a top of a land pre-pit signal waveform in the high-power irradiation portion to a top of the land pre-pit signal waveform in the low-power irradiation portion can be computed in a following equation (21).

$$LB1 = (1/k1)m2 - (1/k1)m1 + (1/k1)b - (1/k1)a \qquad (21)$$
$$= (1/k1)m2 - (1/k1)m1 + (1/k1)L \times m2 -$$
$$(1/k1)L \times m1$$

Likewise, as for the (A+B) signal, when it is assumed that the under level of the land pre-pit signal in the low-power irradiation portion is "−m1", the under level of the land pre-pit signal in the high-power irradiation portion is "−m2", a peak level relative to the under level of the land pre-pit signal in the low-power irradiation portion is "a" and the peak level relative to the under level of the land pre-pit signal in the high-power irradiation portion is "b" while −a/−m1=−b/−m2=L, the amplitude LB2, which is an amplitude from the top of the land pre-pit signal waveform in the low-power irradiation portion to the top of the land pre-pit signal waveform in the high-power irradiation portion can be computed in a following equation (22).

$$LB2m2-m1+a-b=m2-m1+L \times m1-L \times m2 \qquad (22)$$

A relation between the aforementioned equations (21) and (22) will be described later.

Figure 21:
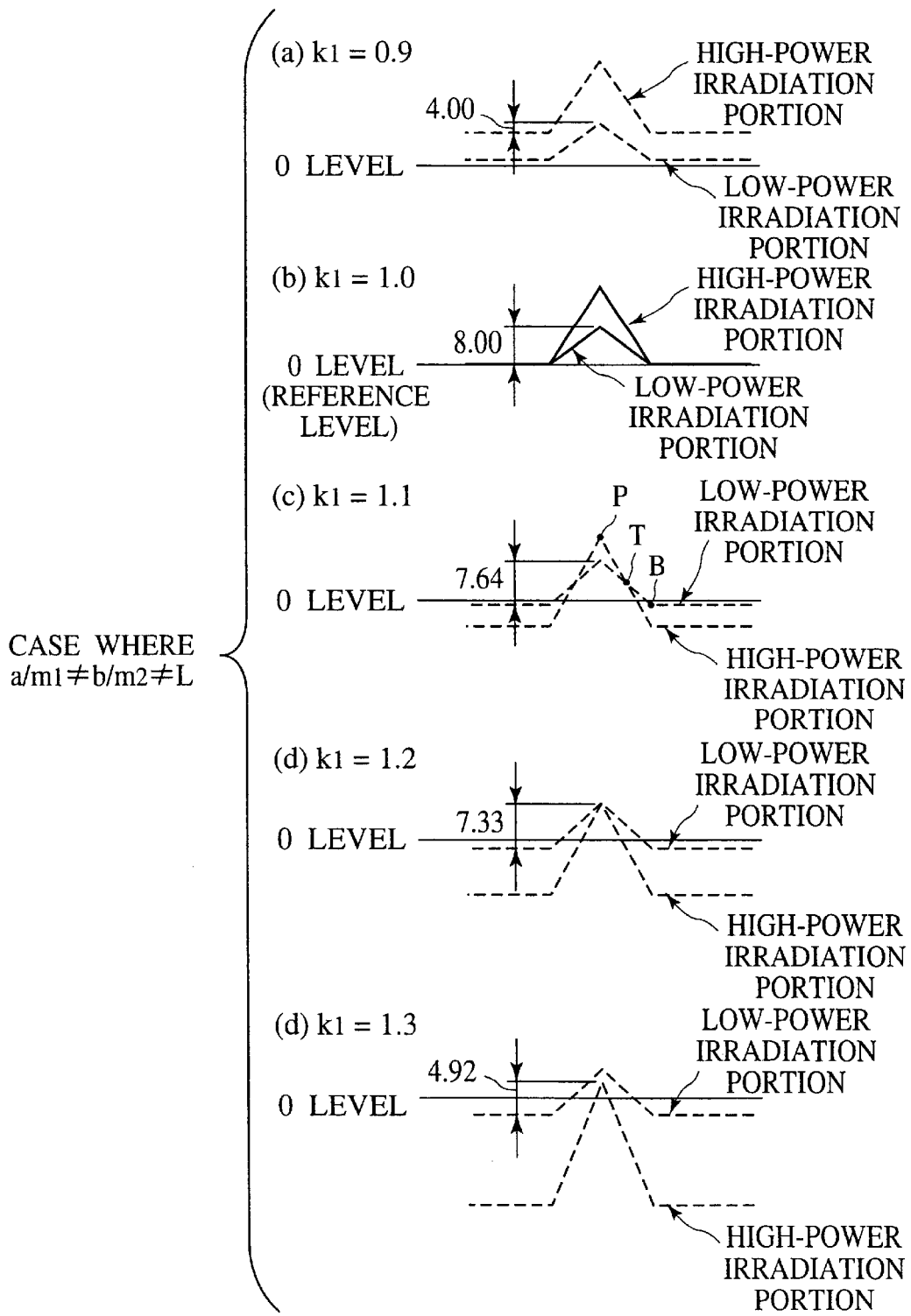
FIG. 21 is a diagram showing the waveforms of the high-power irradiation portion and the low-power irradiation portion of the radial push-pull signal which changes depending on the value of a predetermined coefficient k1 to be multiplied by paying attention to the land pre-pit signal, if the relation of a/m1≠b/m2≠L shown in FIG. 9 is established.

See FIGS. 20, 21. In order to binarize a land pre-pit signal in the radial push-pull signal {(1/k1)(C+D)−(A+B)} in the binarizing circuit 9 securely, how an allowable deflection width (slice window width) of this land pre-pit signal is changed depending on the predetermined coefficient k1 is simulated by paying attention to only the land pre-pit signals in the (1/k1)(C+D) signal and the (A+B) signal. Consequently, a predetermined coefficient k1 corresponding to the slice window width capable of detecting both the land pre-pit signal in the high-power irradiation portion and the land pre-pit signal in the low-power irradiation portion securely is obtained. At this time, a slice level for binarizing the land pre-pit signal is set up in the binarizing circuit 9.

Cases (a) to (f) shown in FIG. 20 are special cases where a/m1=b/m2=L explained in the above FIG. 19 is established and here, simulation is carried out by setting the value of L, for example, to 0.2.

Case (b) in FIG. 20 shows a case where the predetermined coefficient 1/k1 is set up to "1.0" (k1=1.0), in which the radial push-pull signal {(C+D)−(A+B)} is obtained like conventionally. In this example, the under level of the land pre-pit signal in the high-power irradiation portion and the under level of the land pre-pit signal in the low-power irradiation portion become the same reference level (hereinafter referred to as 0 level). Consequently, the wobbling signal, whose representation is omitted here, can be detected favorably, however the land pre-pit signal cannot be detected so favorably.

That is, the aforementioned slice window width for detecting the land pre-pit signal in the high-power irradiation portion and the land pre-pit signal in the low-power irradiation portion becomes 4.00, which is a difference of level between the peak level of the land pre-pit signal in the low-power irradiation portion and 0 level. Because this slice window width, which is 4.00, is quite large, this slice window width is decreased quickly if the value k1 is decreased, which is a problem to be solved.

If the predetermined coefficient (1/k1) is set to "1.04" (k1=0.96), which is slightly larger than "1.0" as shown in case (a) in FIG. 20 as compared to the above-explained case (b), the under level of the land pre-pit signal in the high-power irradiation portion and the under level of the land pre-pit signal in the low-power irradiation portion are raised above 0 level. At the same time, the aforementioned slice window width for detecting both the land pre-pit signals becomes 2.41, which is a difference of level between the peak level of the land pre-pit signal in the low-power irradiation portion and the under level of the land pre-pit signal in the high-power irradiation portion. This slice window width, which is 2.41, is extremely smaller than that of case (b) in FIG. 20, so that detection of the land pre-pit signal is disabled and further, the wobbling signal, whose representation is omitted, is slightly worse than the case (b) in FIG. 20.

On the other hand, as shown in case (C) in FIG. 20 as compared to the above-explained (b), if the predetermined coefficient (1/k1) is set to "0.9" (k1=1.1), which is slightly smaller than "1.0", the under level of the land pre-pit signal in the high-power irradiation portion and the under level of the land pre-pit signal in the low-power irradiation portion drop below 0 level. At the same time, the aforementioned slice window width for detecting both the land pre-pit signals becomes 3.82, which is a difference of level between the peak level of the land pre-pit signal in the low-power irradiation portion and the under level of the land pre-pit signal in the low-power irradiation portion. Because this slice window value, which is 3.82, is slightly smaller than the value in case (b) in FIG. 20, both the land pre-pit signal scan be detected reliably and securely.

Although in this case, the wobbling signal, whose representation is omitted, is slightly inferior to the case (b) in FIG. 20, it is a more important matter that the land pre-pit signal can be detected securely than that the detection of the wobbling signal is deteriorated. In cases (d) to (f) in FIG. 20, detection of the wobbling signal is deteriorated gradually.

If as shown in case (d) in FIG. 20, the predetermined coefficient (1/k1) is set up to "0.83" (k1=1.2), which is smaller than that of case (c) in FIG. 20, the same tendency as case (c) occurs. However, the slice window width for detecting both the land pre-pit signals becomes 3.67, which is a difference of level between the peak level of the land pre-pit signal in the low-power irradiation portion and the under level of the land pre-pit signal in the low-power irradiation portion. This slice window width of 3.67 is an excellent value capable of detecting both the land pre-pit signals reliably and securely.

If as shown in case (e) in FIG. 20, the predetermined coefficient 1/k1 is set to "0.67" (k1=1.5), which is smaller than that of case (d) in FIG. 20, both the under level of the land pre-pit signal in the low-power irradiation portion and the under level of the land pre-pit signal in the low-power irradiation portion drop below 0 level. The peak level of the land pre-pit signal in the high-power irradiation portion and the peak level of the land pre-pit signal in the low-power irradiation portion coincide with each other at 0 level.

Further, the aforementioned slice window width for detecting both the land pre-pit signals becomes 3.33, which is a difference of level between 0 level (=peak level of the land pre-pit signal in the high-power irradiation portion and the low-power irradiation portion) and the under level of the land pre-pit signal in the low-power irradiation portion. For a reason which will be described later, the value of k1 (k1=1.5) in which this slice window width is 3.33 becomes a maximum value capable of detecting both the land pre-pit signals securely. Thus, under the condition of a/m1=b/m2=L, the predetermined coefficient k1=1.5 is theoretically an upper limit value. Meanwhile, how to obtain a theoretical upper limit value of the predetermined coefficient k1 will be described later.

Further, if as shown in case (f) in FIG. 20, the predetermined coefficient 1/k1 is set to "0.625" (k=1.6) which is smaller than the value of case (d) in FIG. 20, both the peak level of the land pre-pit signal in the high-power irradiation portion and the peak level of the land pre-pit signal in the low-power irradiation portion drop below 0 level and at the same time, the peak level of the land pre-pit signal in the high-power irradiation portion becomes lower than the peak level of the land pre-pit signal in the low-power irradiation portion. At the same time, the slice window width for detecting both the land pre-pit signals becomes 1.25, which is a difference of level between the peak level of the land pre-pit signal in the high-power irradiation portion and the peak level of the land pre-pit signal in the low-power irradiation portion. This slice window width of 1.25 is a extremely decreased value although the predetermined coefficient k1 is increased slightly by 0.1 from the case (e) in FIG. 20, so that detection of both the land pre-pit signals is worsened extremely.

Therefore, the case where the predetermined coefficient (1/k1) is "0.67" (k1=1.5) is a theoretical upper limit value as shown in case (e) in FIG. 20. If this theoretical upper limit value is set up, the predetermined coefficient k1 has no allowance in a direction in which it is increased more than 1.5. As a result, the predetermined coefficient k1 of "1.1" to "1.4" (representation of part thereof is omitted) is an actual value under the condition of a/m1=b/m2=L in terms of reliability and safety, as shown in case (d) in FIG. 20.

The condition in which the theoretical upper limit value is applied under a/m1=b/m2=L as shown in case (e) in FIG. 20 is that the amplitude LB1 of the land pre-pit signal in the (1/k1) (C+D) signal based on the equation (21) and the amplitude LB2 of the land pre-pit signal in the (A+B) signal based on the equation (22) become the same value. As a result, the equation (21) is equal to the equation (22), so that the predetermined coefficient k1 is calculated in a following equation (23).

$$k1 = \{m2 - m1 + L(m2 - m1)\}/\{m2 - m1 + L(m1 - m2)\} \quad (23)$$

$$= \{(m2 - m1)(1 + L)\}/\{(m2 - m1)(1 - L)\}$$

$$= (1 + L)/(1 - L)$$

Further, because according to FIG. 17, L in the above equation (23) is obviously equivalent to LPPb signal (=L1/R1=pL2/pR2=qL2/qR2=L2/R2) normalized by computation according to the aforementioned equation (19), the L can be replaced with the normalized LPPb signal value, so that the equation (23) can be replaced with the equation (24). Consequently, by supplying an output result from the LPPb generation circuit 14 to the coefficient setting circuit 16, the predetermined coefficient k1, which is a theoretical upper limit value, is obtained according to the equation (24).

$$k1=(1+LPPb)/(1-LPPb) \quad (24)$$

Next, in cases of (a)–(e) in FIG. 21, a/m1=b/m2=L described with the above FIG. 19 is not established. This is a general case where a/m1≠b/m2≠L arises.

As for cases (a)–(e) in FIG. 21 also, the slice window width for detecting both the land pre-pit signal in the high-power irradiation portion and the land pre-pit signal in the low-power irradiation portion with respect to the predetermined coefficient k1 is obtained according to substantially the same concept as described in FIG. 20. The reason why the absolute value of the obtained slice window width is different from an absolute value obtained in FIG. 20 is that other factors than the predetermined coefficient k1 are different.

That is, case (a) in FIG. 21 shows a case where the predetermined coefficient (1/k1) is set to "1.11" (k1=0.9). In this case, both the under level of the land pre-pit signal in the high-power irradiation portion and the under level of the land pre-pit signal in the low-power irradiation portion rises over 0 level and at the same time, the aforementioned slice window width for detecting the land pre-pit signal in the high-power irradiation portion and the land pre-pit signal in the low-power irradiation portion becomes 4.00, which is a difference of level between the peak level of the land pre-pit signal in the low-power irradiation portion and the under level of the land pre-pit signal in the high-power irradiation portion. This value of 4.00 is so small that detection of the land pre-pit signal is disabled.

Further, case (b) in FIG. 21 shows a case where the predetermined coefficient k1 is set to "1.0" and in this case, the radial push-pull signal {(C+D)−(A+B)} is obtained like conventionally.

In this case, both the under level of the land pre-pit signal in the high-power irradiation portion and the under level of the land pre-pit signal in the low-power irradiation portion become 0 level (reference level), so that although the wobbling signal, whose representation is omitted, can be detected favorably, detection of the land pre-pit signal is not carried out so favorably. That is, the slice window width for detecting both the land pre-pit signals becomes 8.00, which is a difference of level between the peak level of the land pre-pit signal in the low-power irradiation portion and 0 level. Although this slice window width of 8.00 is larger than required, if the value of k1 is decreased, the slice window width is decreased quickly.

Case (c) in FIG. 21 shows a case where the predetermined coefficient (1/k1) is set to "0.91" (k1=1.1). In this case, both the under level of the land pre-pit signal in the high power irradiation portion and the under level of the land pre-pit signal in the low power irradiation portion drop below 0 level. At the same time, the aforementioned slice window width for detecting both the land pre-pit signals becomes 7.64, which is a difference of level between a peak level of the land pre-pit signal in the low-power irradiation portion and the under level of the land pre-pit signal in the low-power irradiation portion. This slice window width of 7.64 is a favorable value capable of detecting both the land pre-pit signals reliably and securely.

Case (d) in FIG. 21 shows a case where the predetermined coefficient (1/k1) is set to "0.83" (k=1.2). In this case, both the under level of he land pre-pit signal in the high-power irradiation portion and the under level of the land pre-pit signal in the low-power irradiation portion drop below 0 level, so that the peak level of the land pre-pit signal in the high-power irradiation portion coincides with the peak level of the land pre-pit signal in the low-power irradiation portion above 0 level.

Then, the aforementioned slice window width for detecting both the land pre-pit signals becomes 7.33, which is a difference of level between the peak level of the land pre-pit signal in the high-power irradiation portion and low-power irradiation portion and the under level of the land pre-pit signal in the low-power irradiation portion. If as described below, the value of k1 exceeds 1.2, the slice window width is decreased quickly, so that the value of k1=1.2, in which the slice window width is 7.33, ensures a maximum value capable of detecting both the land pre-pit signals securely. Therefore, the predetermined coefficient k=1.2 under a/m1≠b/m2≠L is a theoretical upper limit value.

Case (e) in FIG. 21 shows a case where the predetermined coefficient k1 is set to "1.3". In this case, both the peak level of the land pre-pit signal in the high-power irradiation portion and the peak level of the land pre-pit signal in the low-power irradiation portion drop below 0 level and at the same time, the peak level of the land pre-pit signal in the high-power irradiation portion is lower than the peak level of the land pre-pit signal in the low-power irradiation portion. The slice window width for detecting both the land pre-pit signals becomes 4.92, which is a difference of level between the peak level of the land pre-pit signal in the high-power irradiation portion and the under level of the land pre-pit signal in the low-power irradiation portion. This slice window width of 4.92 is smaller than those of cases (c) and (d) in FIG. 21, so that detection of both the land pre-pit signals is worsened.

Therefore, as shown in case (d) in FIG. 21, the case where the predetermined coefficient (1/k1) is "0.83" (k=1.2) indicates a theoretical upper limit. If this theoretical upper limit is set up, the predetermined coefficient k1 has no allowance in a direction in which it is increased over 1.2. Thus, from the viewpoint of the reliability and safety, as shown in case (c) in FIG. 21, the case where the predetermined coefficient k1 is near "1.1" indicates an actual value under a/m1≠b/m2≠L.

The condition in which the predetermined coefficient k1 reaches its theoretical upper limit under a/m1 ≠b/m2≠L as shown in case (d) in FIG. 21 can be estimated from the aforementioned equations (23), (24) and then, the following equations (25), (26) are established.

$$1.0 < k1 < \alpha \times \{(1+L)/(1-L)\} \quad (25)$$

$$1.0 < k1 < \alpha \times \{(1+LPPb)/(1-LPPb)\} \quad (26)$$

A coefficient α in the equations (25), (26) is affected by performance of the optical pickup 2, recording power in the optical pickup 2 and reproduction power in reproduction mode and may be smaller than 10. This coefficient α may be stored in a memory preliminarily.

Next, FIG. 22 is a diagram in which attention is paid to only the wobbling signal in the radial push-pull signal by removing the land pre-pit signal component by zeroing the land pre-pit signal component in the radial push-pull signal. The side of positive polarity relative to 0 level indicates the wobbling signal in the high-power irradiation portion of the (1/k1) (C+D) signal and the wobbling signal in the low-power irradiation portion thereof. On the other hand, the side of negative polarity relative to 0 level indicates the wobbling signal in the high-power irradiation portion of the (A+B) signal and the wobbling signal in the low-power irradiation portion thereof.

A simulation for the (1/k1)(C+D) signal is carried out by changing the predetermined coefficient (1/k1) to be multiplied in the same manner as described in FIG. 19. For convenience of representation, only cases where the predetermined coefficient k1 is 1.0, 1.1, 1.2 are indicated here.

Further, as for the (1/k1)(C+D) signal, when it is assumed that the center level of the wobbling signal in the low-power irradiation portion is "(1/k1)m1", the center level of the wobbling signal in the high-power irradiation portion is "(1/k1)m2", the amplitude of an upper piece relative to the center level of the wobbling signal in the low-power irradiation portion is "(1/k1)c", and the amplitude of the upper piece relative to the center level of the wobbling signal in the high-power irradiation portion is "(1/k1)d" while c/m1=d/m2=W, the amplitude WB1, which is an amplitude from a top of a wobbling signal waveform in the high-power irradiation portion to a top of the wobbling signal waveform in the low-power irradiation portion can be computed in a following equation (27).

$$WB1 = (1/k1)m2 - (1/k1)m1 + (1/k1)d - (1/k1)c \quad (27)$$
$$= (1/k1)(m2 - m1 + W \times m2 - W \times m1)$$

Likewise, as for the −(A+B) signal, when it is assumed that the center level of the wobbling signal in the low-power irradiation portion is "−m1", the center level of the wobbling signal in the high-power irradiation portion is "−m2", the amplitude of an upper piece relative to the center level of the wobbling signal in the low-power irradiation portion is "c" and the amplitude of an upper piece relative to the center level of the wobbling signal in the high-power irradiation portion is "d" while −c/−m1=−d/−m2=W, the amplitude WB2, which is an amplitude from the top of the wobbling signal waveform in the low-power irradiation portion to the top of the wobbling signal waveform in the high-power irradiation portion can be computed in a following equation (28).

$$WB2 = m2 - m1 + c - d = m2 - m1 + W \times m1 - W \times m2 \quad (28)$$

A relation between the aforementioned equations (27) and (28) will be described.

See FIG. 23. In order to binarize a land pre-pit signal in the radial push-pull signal {(1/k1)(C+D)−(A+B)} in the binarizing circuit 9 securely, how this wobbling signal is changed depending on the predetermined coefficient k1 is simulated by paying attention to only the wobbling signals in the (1/k1) (C+D) signal and the −(A+B) signal. Consequently, a theoretical lower limit of the predetermined coefficient k1 is determined from a relation between the amplitude of the wobbling signal in the high-power irradiation portion and the amplitude of the wobbling signal in the low-power irradiation portion. The same Figure indicates cases where the predetermined coefficient k1 is "1.0", "1.1", "1.2" corresponding to FIG. 22.

Cases (a) to (c) shown in FIG. 23 are special cases where c/m1=d/m2=W explained in the above FIG. 22 is established and here, simulation is carried out by setting the value of W, for example, to 0.05.

Case (a) in FIG. 23 is a case where the predetermined coefficient k1 is set up to "1.0", in which the radial push-pull signal {(C+D)−(A+B)} is obtained like conventionally. In this example, the wobbling signal in the high-power irradiation portion and the wobbling signal in the low-power irradiation portion intersect with the center level of the WBL signal at the same point and the amplitude of the wobbling signal in the high-power irradiation portion is larger than the amplitude of the wobbling signal in the low-power irradiation portion. This state corresponds to case (b) in FIG. 20 described previously, in which although the wobbling signal can be detected favorably, detection of the land pre-pit signal is not carried out so favorably.

Case (b) in FIG. 23 shows a case where the predetermined coefficient k1 is set to "1.1" (1/k1=0.91). In this example, the wobbling signal in the high-power irradiation portion and the wobbling signal in the low-power irradiation portion have respective cycles different from each other. However, the top of the wobbling signal waveform in the low-power irradiation portion coincides with the top of the wobbling signal waveform in the high-power irradiation portion above the center level and in this state, the predetermined coefficient k=1.1 is a theoretical lower limit under c/m1=d/m2=W. Further, this state corresponds to case (c) in FIG. 20 described previously, in which although detection of the wobbling signal is slightly inferior to case (a) in FIG. 23, the predetermined coefficient k1=1.1 is a theoretical lower limit because the land pre-pit signal can be detected in any way.

Case (c) in FIG. 23 shows a case where the predetermined coefficient k1 is set to "1.2" (1/k1=0.83). In this example, the top of the wobbling signal in the high-power irradiation portion is located below the top of the waveform of the wobbling signal in the low-power irradiation portion such that it does not intersect therewith. This state corresponds to case (d) in FIG. 20 described previously, in which although the detection of the wobbling signal is worsened further, detection of the land pre-pit signal is improved (this has been already described).

The condition in which the theoretical lower limit value is applied under c/m1=d/m2=W as shown in case (b) in FIG. 23 is that the amplitude WB1 of the wobbling signal in the (1/k1)(C+D) signal based on the equation (27) and the amplitude WB2 of the wobbling signal in the −(A+B) signal based on the equation (28) become the same value. At this time, the theoretical lower limit of the coefficient k1 is obtained. As a result, the equation (27) is equal to the equation (28), so that the predetermined coefficient k1 is calculated in the following equation (29).

$$k1 = \{m2 - m1 + W(m2 - m1)\} / \{m2 - m1 + W(m1 - m2)\} \quad (29)$$
$$= \{(m2 - m1)(1 + W)\} / \{(m2 - m1)(1 - L)\}$$
$$= (1 + W)/(1 - W)$$

Further, because W in the above equation (29) is obviously equivalent to WBLb signal (=W1/R1=pW2/pR2=qW2/qR2=W2/R2) normalized by computation according to the aforementioned equation (20), according to FIG. 17, the aforementioned W can be replaced with the normalized WBLb signal value, so that the equation (29) can be replaced with the equation (30). Consequently, by supplying an output result from the WBLb generation circuit 15 to the coefficient setting circuit 16, the predetermined coefficient k1, which is a theoretical lower limit value, is obtained according to the equation (30).

$$k1 = (1+WBLb)/(1-WBLb) \quad (30)$$

In a general case where c/m1=d/m2=W is not established as described in FIG. 22 while c/m1≠d/m2≠W, although representation thereof is omitted, when the top of the waveform of the wobbling signal in the low-power irradiation portion coincides with the top of the waveform of the wobbling signal in the high-power irradiation portion substantially as shown in case (b) in FIG. 23, the predetermined coefficient k1 becomes its theoretical lower limit value.

In this case, the equations (31), (32) corresponding to the equations (25), (26) are established.

$$1.0 < k1 < \beta \times \{(1+W)/(1-W)\} \quad (31)$$
$$1.0 < k1 < \beta \times \{(1+WBLb)/(1-WBLb)\} \quad (32)$$

A coefficient β in the equations (31), (32) is affected by performance of the optical pickup 2, recording power in the optical pickup 2 and reproduction power in reproduction mode and may be smaller than 1.0. This coefficient β may be stored in a memory preliminarily.

If summarizing the above-described matters, as regards the predetermined coefficient k1, the equations (23), (24), (25), (26) described about the land pre-pit signal are established individually and further, the equations (29), (30), (31), (32) described about the wobbling signal are established individually. The equations about the land pre-pit signal and the equations about the wobbling signal only should be combined for each purpose.

Thus, if the predetermined coefficient k1 exists within a range from its theoretical upper limit value and its theoretical lower limit value, the land pre-pit signal can be detected at a high precision securely. Then, following equations (33) to (36) are established.

$$(1+W)/(1-W) \leq k1 \leq (1+L)/(1-L) \quad (33)$$

$$(1+WBLb)/(1-WBLb) \leq k1 < (1+LPPb)/(1-LPPb) \quad (34)$$

under the condition of a/m1=b/m2=L and c/m1=d/m2=W, $$\beta \times \{(1+W)/(1-W)\} < k1 < \alpha \times \{(1+L)/(1-L)\} \quad (35)$$

$$\beta \times \{(1+WBLb)/(1-WBLb)\} < k1 < \alpha \times \{(1+LPPb)/(1-LPPb)\} \quad (36)$$

under the condition of a/m1≠b/m2≠L and c/m1 ≠d/m2≠W.

More specifically, although the predetermined coefficient k1 is conventionally set to "1.0", according to this embodiment, the predetermined coefficient k1 is set larger than 1.0 and in a range capable of detecting the land pre-pit signal through feedback process, based on i) the amplitude of the land pre-pit signal or the amplitude of the land pre-pit signal and the amplitude of the wobbling signal, or the predetermined coefficient k1 is set larger than 1.0 and in a range capable of detecting the land pre-pit signal based on the ii) the amplitude of the normalized land pre-pit signal or the amplitude of the normalized land pre-pit signal and the amplitude of the normalized wobbling signal. Consequently, the land pre-pit signal can be detected at a high precision securely, so that upon recording or reproducing into/from a disc-like recording medium, the land pre-pit signal corresponding to a land pre-pit formed in the land 33 can be detected at a high precision.

Further, in the disc recording and/or reproducing apparatus of the second embodiment, the coefficient setting circuit 16 sets the predetermined coefficient (1/K1) to be set in the coefficient q multiplying circuit 20 in a range from the aforementioned theoretical upper limit value and the theoretical lower limit value, based on the LPP signal, WBL signal, LPPb signal, WBLb signal, an error rate upon detecting of the land pre-pit signal and a shift amount of an objective lens of the optical pickup 2. More specifically, the predetermined coefficient k1 is set larger than 1.0 and in a range capable of detecting the land pre-pit signal.

Consequently, upon recording, the land pre-pit signal can be detected securely at a high precision irrespective of the high-power irradiation portion and the low-power irradiation portion on the DVD 31. Further, the land pre-pit signal can be detected securely at a high precision irrespective of a recording pit formation position and space portion (non-recording portion) on the DVD 31.

<Third Embodiment>

Next, the third embodiment of the present invention will be described. According to the third embodiment, a multiplier q to (C+D) is q=1/SQRT(k2) (k2 is a coefficient set up below) and a multiplier p to (A+B) is p=−SQRT(k2) (SQRT (X) is a square root of X). Because the second embodiment is different from the third embodiment only in this point, only this difference will be described while a description of the same components is omitted.

If SQRT(k2)=k3 ( . . . (37)) is placed in order to reduce the number of characters, the radial push-pull signal is turned to {(1/k3)(C+D)−k3 (A+B)} ( . . . (38))

Hereinafter, the third embodiment will be described using the notations of k2, k3.

Figure 24:
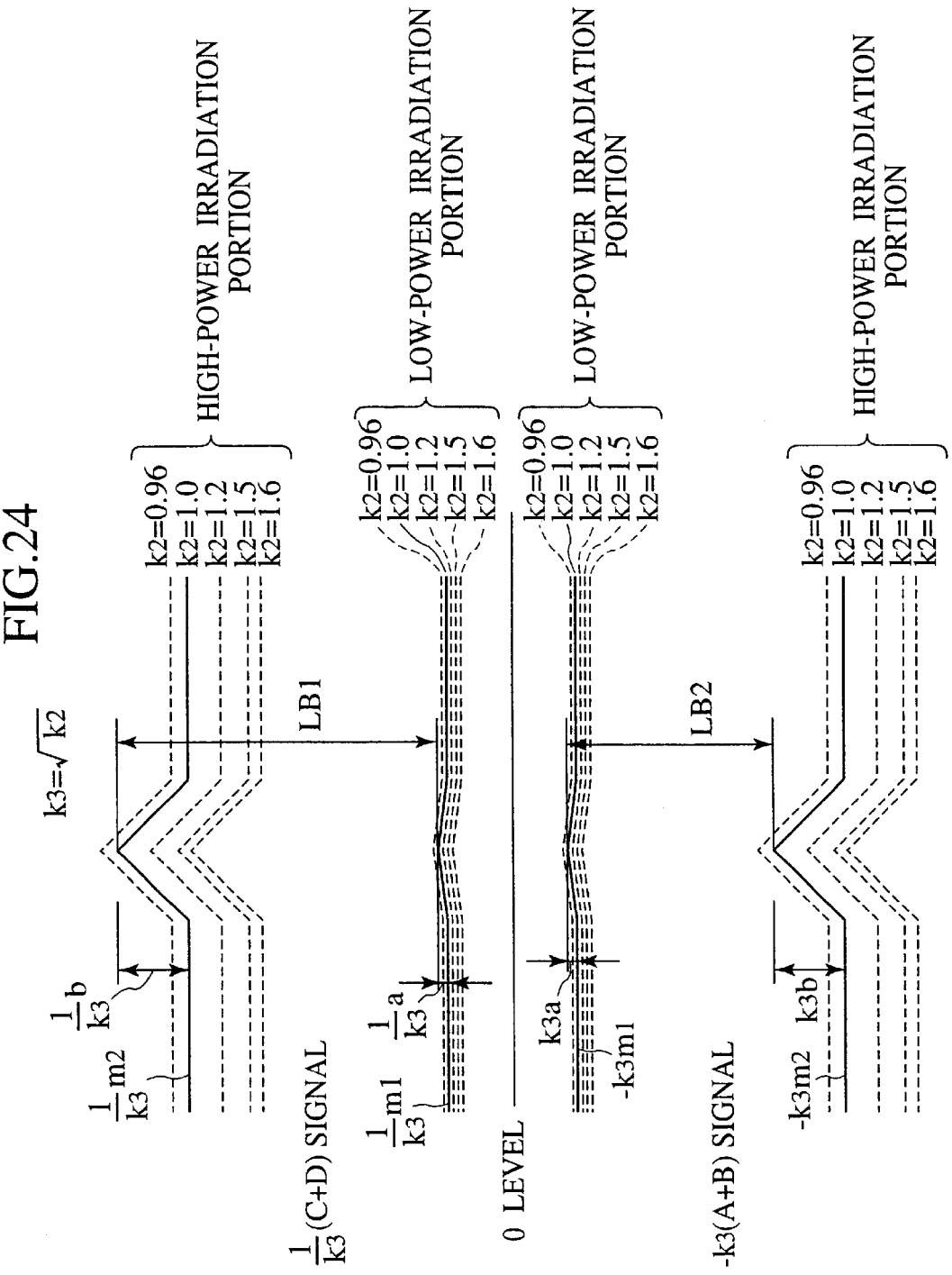
FIG. 24 is a diagram showing the waveforms of the high power irradiation portion and the lowpower irradiation portion of the {(1/k3)(C+D)} signal and −k3(A+B), which change depending on the value of a predetermined coefficient k3 (k3=SQRT(k2)) to be multiplied by paying attention to the land pre-pit signal.

Next, FIG. 24 is a diagram in which attention is paid to only the wobbling signal in the radial push-pull signal by removing the land pre-pit signal component by zeroing the land pre-pit signal component in the radial push-pull signal. The side of positive polarity relative to 0 level indicates the wobbling signal in the high-power irradiation portion of the (1/k3)(C+D) signal and the wobbling signal in the low-power irradiation portion thereof. On the other hand, the side of negative polarity relative to 0 level indicates a land pre-pit signal in the high-power irradiation portion of −k3(A+B) signal and a land pre-pit signal in the low-power irradiation portion thereof.

Further, as for the (1/k3)(C+D) signal and k3(A+B) signal, the land pre-pit signal in the low-power irradiation portion and the land pre-pit signal in the high-power irradiation portion are indicated by changing the predetermined coefficient k2 in the equation (37) from near 0.96 to near 1.6 appropriately.

Further, as for the (1/k3)(C+D) signal, when it is assumed that the under level of the land pre-pit signal in the low-power irradiation portion is "(1/k3)m1", the under level of the land pre-pit signal in the high-power irradiation portion is "(1/k3)m2", the peak level relative to the under level of the land pre-pit signal in the low-power irradiation portion is "(1/k3)a", and the peak level relative to the under level of the land pre-pit signal in the high-power irradiation portion is "(1/k3)b" while a/m1=b/m2=L, the amplitude LB1 of the (1/k3)(C+D) signal, which is an amplitude from a top of a land pre-pit signal waveform in the high-power irradiation portion to a top of the land pre-pit signal waveform in the low-power irradiation portion can be computed in a following equation (39).

$$LB1 = (1/k3)m2 - (1/k3)m1 + (1/k3)b - (1/k3)a \quad (39)$$

$$= (1/k3)m2 - (1/k3)m1 + (1/k3)L \times m2 -$$

$$(1/k3)L \times m1$$

Likewise, as for the −k3(A+B) signal, when it is assumed that the under level of the land pre-pit signal in the low-power irradiation portion is "−k3m1", the under level of the land pre-pit signal in the high-power irradiation portion is "−k3m2", the peak level relative to the under level of the land pre-pit signal in the low-power irradiation portion is "k3a" and the peak level relative to the under level of the land pre-pit signal in the high-power irradiation portion is "k3b" while −a/−m1=−b/−m2=L, the amplitude LB2, which is an amplitude from the top of the land pre-pit signal waveform in the low-power irradiation portion to the top of the land pre-pit signal waveform in the high-power irradiation portion can be computed in a following equation (40).

$$LB2 = k3m2 - k3m1 + k3a - k3b \quad (40)$$

-continued $$= k3m2 - k3L \times m1 - k3L \times m2$$

A relation between the aforementioned equations (39) and (40) will be described later.

Figure 25:
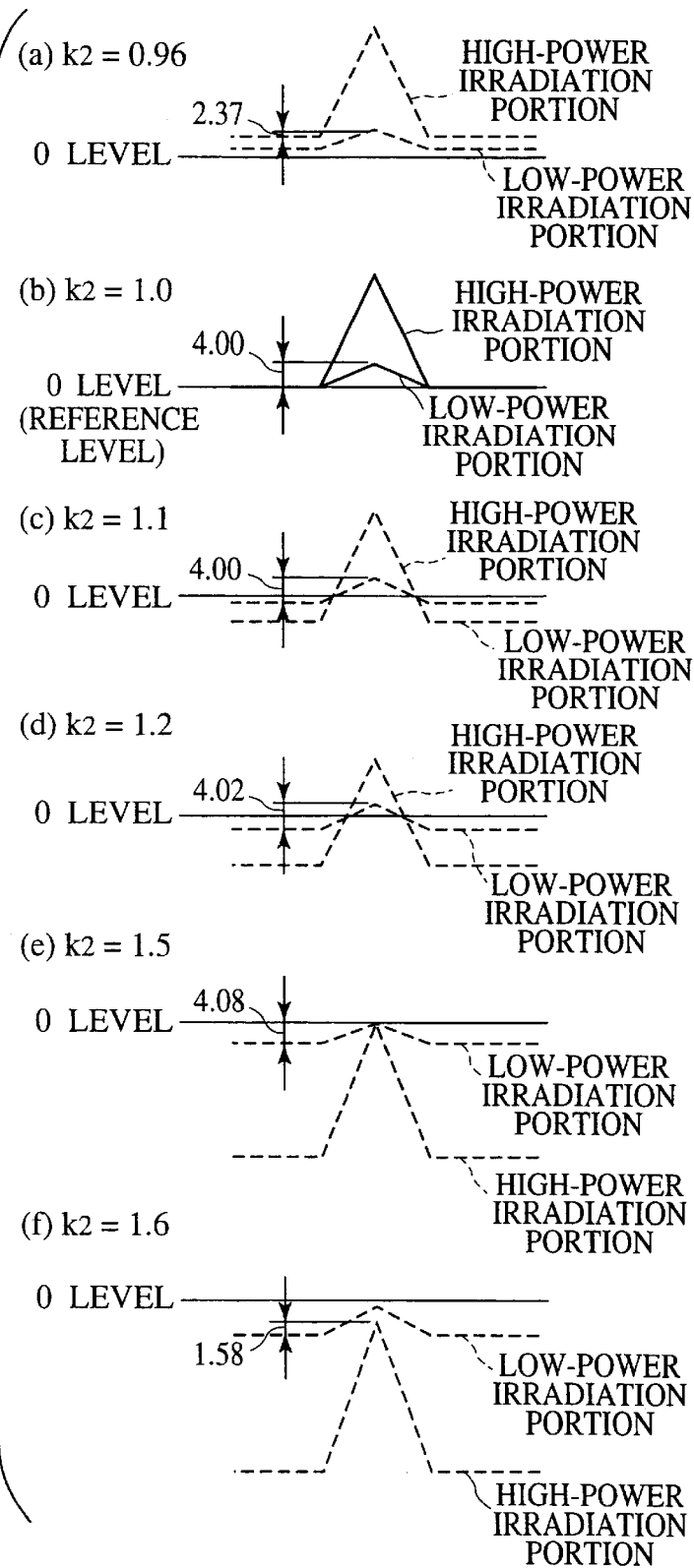
FIG. 25 is a diagram showing the waveforms of the high-power irradiation portion and the low-power irradiation portion of the radial push-pull signal which changes depending on the value of a predetermined coefficient k3 to be multiplied by paying attention to the land pre-pit signal, if the relation of a/m1=b/m2=L shown in FIG. 19 is established.
Figure 26:
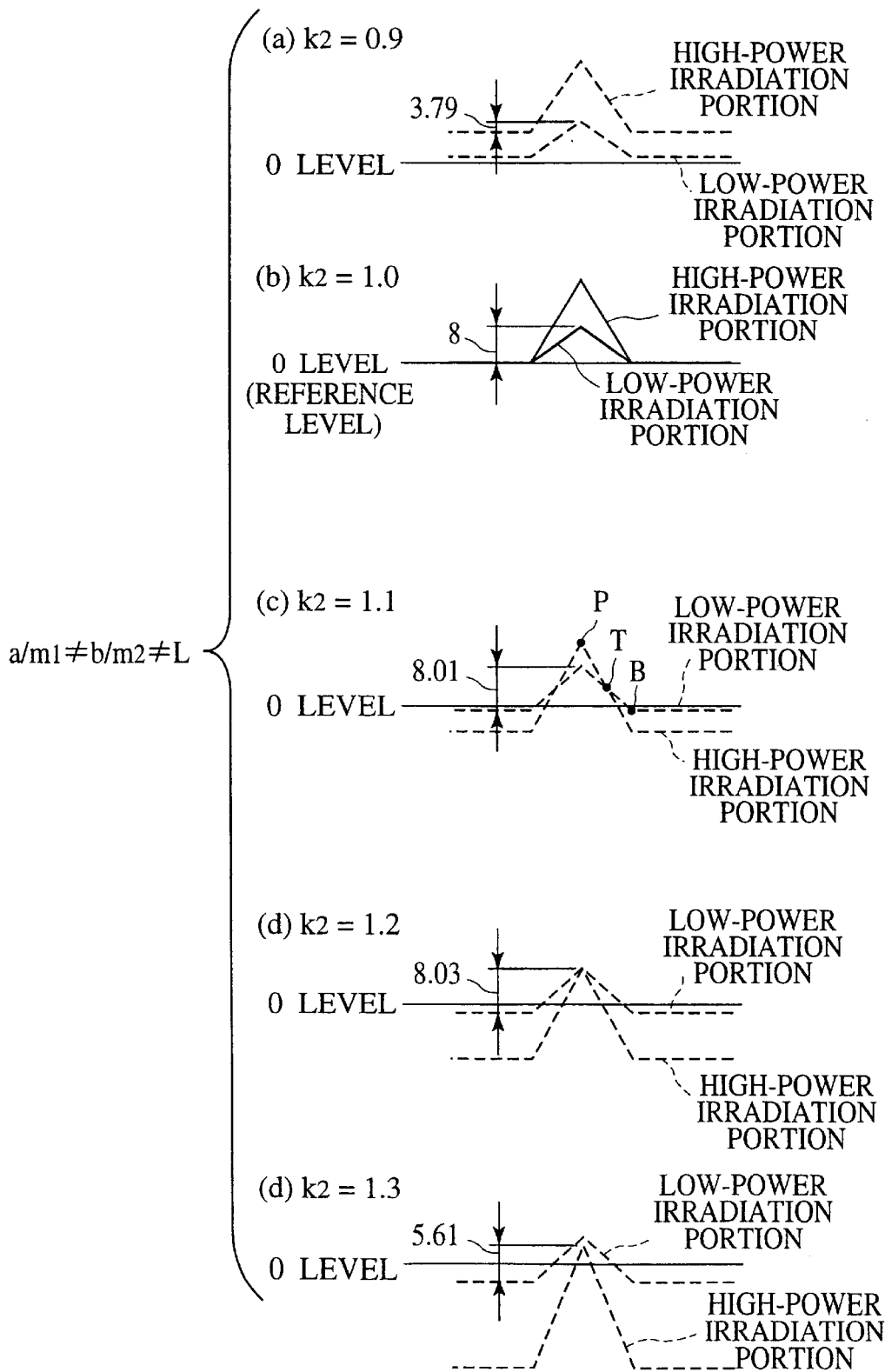
FIG. 26 is a diagram showing the waveforms of the high-power irradiation portion and the low-power irradiation portion of the radial push-pull signal which changes depending on the value of a predetermined coefficient k3 (k3=SQRT(k2)) to be multiplied by paying attention to the land pre-pit signal, if the relation of a/m1≠b/m2≠L is established.

See FIGS. 25, 26. In order to binarize a land pre-pit signal in the radial push-pull signal $\{(1/k3)(C+D)-k3(A+B)\}$ in the binarizing circuit 9 securely, how a binarization slice level allowable deflection width (slice window width) of this land pre-pit signal is changed depending on the predetermined coefficient k3 is simulated by paying attention to only the land pre-pit signals in the $(1/k3)(C+D)$ signal and the $k3(A+B)$ signal. Consequently, a predetermined coefficient k2 corresponding to the slice window width capable of detecting both the land pre-pit signal in the high-power irradiation portion and the land pre-pit signal in the low-power irradiation portion securely is obtained. At this time, the binarization slice level to the land pre-pit signal is set up in the binarizing circuit 9.

Cases (a) to (f) shown in FIG. 25 are special cases where $a/m1=b/m2=L$ explained in the above FIG. 24 is established and here, simulation is carried out by setting the value of L, for example, to 0.2.

Case (b) in FIG. 25 shows a case where the predetermined coefficient k2 is set up to "1.0", in which the radial push-pull signal $\{(C+D)-(A+B)\}$ is obtained like conventionally. In this example, the under level of the land pre-pit signal in the high-power irradiation portion and the under level of the land pre-pit signal in the low-power irradiation portion become the same reference level (hereinafter referred to as 0 level). The aforementioned slice window width for detecting the land pre-pit signal in the high-power irradiation portion and the land pre-pit signal in the low-power irradiation portion becomes 4.0, which is a difference of level between the peak level of the land pre-pit signal in the low-power irradiation portion and 0 level. Although the wobbling signal, whose representation is omitted, can be detected favorably, even if the value of k2 is changed a little, as shown below, the slice window width is decreased quickly.

If the predetermined coefficient k2 is set to "0.96" (k3=1.02), which is slightly smaller than "1.0" as shown in case (a) in FIG. 25 as compared to the above-explained case (b), the under level of the land pre-pit signal in the high-power irradiation portion and the under level of the land pre-pit signal in the low-power irradiation portion are raised above 0 level. At the same time, the aforementioned slice window width for detecting both the land pre-pit signals becomes 2.37, which is a difference of level between the peak level of the land pre-pit signal in the low-power irradiation portion and the under level of the land pre-pit signal in the high-power irradiation portion. This slice window width, which is 2.37, is extremely smaller than that of case (b) in FIG. 25, so that detection of the land pre-pit signal is disabled and further, the wobbling signal, whose representation is omitted, is worse than the case (b) in FIG. 25.

On the other hand, as shown in case (c) in FIG. 25 as compared to the above-explained (b), if the predetermined coefficient k2 is set to "1.1" (k3=1.05), which is slightly larger than "1.0", the under level of the land pre-pit signal in the high-power irradiation portion and the under level of the land pre-pit signal in the low-power irradiation portion drop below 0 level. At the same time, the aforementioned slice window width for detecting both the land pre-pit signals becomes 4.00, which is a difference of level between the peak level of the land pre-pit signal in the low-power irradiation portion and the under level of the land pre-pit signal in the low-power irradiation portion. This slice window width of 4.00 is the same as that of case (b) in FIG. 25. Although in this case, the wobbling signal, whose representation is omitted, is inferior to the case of case (b) in FIG. 25, it is a more important matter that the land pre-pit signal can be detected securely than that the detection of the wobbling signal is deteriorated. In cases of (d) to (f) in FIG. 25, detection of the wobbling signal is deteriorated gradually.

If as shown in case (d) in FIG. 25, the predetermined coefficient k2 is set to "1.2" (k3=1.1) which is larger than that of case (c) in FIG. 25, the same tendency occurs, but the slice window width for detecting both the land pre-pit signals becomes 4.02, which is a difference of level between the peak level of the land pre-pit signal in the low-power irradiation portion and the under level of the land pre-pit signal in the low-power irradiation portion. This slice window width of 4.02 is a favorable value capable of detecting both the land pre-pit signals reliably and securely.

If as shown in case (e) in FIG. 25, the predetermined coefficient k2 is set to "1.5" (k3=1.22) which is larger than that of case (d) in FIG. 25, the under level of the land pre-pit signal in the high-power irradiation portion and the under level of the land pre-pit signal in the low-power irradiation portion drop below 0 level. At the same time, both the peak level of the land pre-pit signal in the high-power irradiation portion and the peak level of the land pre-pit signal in the low-power irradiation portion coincide with each other at 0 level.

Further, the aforementioned slice window width for detecting both the land pre-pit signals becomes 4.08, which is a difference of level between 0 level (=peak level of the land pre-pit signal in the high-power irradiation portion and the low-power irradiation portion) and the under level of the land pre-pit signal in the low-power irradiation portion. For a reason which will be described later, this slice window width, which is 4.08, becomes the maximum value capable of detecting both the land pre-pit signals securely. Thus, under the condition of $a/m1=b/m2=L$, the predetermined coefficient k2=1.5 is theoretically a upper limit value. Meanwhile, how to obtain a theoretical lower limit value of the predetermined coefficient k2 will be described later.

Further, if as shown in case (f) in FIG. 25, the predetermined coefficient k2 is set to "1.6" (k3=1.26), which is larger than the value of case (d) in FIG. 25, both the peak level of the land pre-pit signal in the high-power irradiation portion and the peak level of the land pre-pit signal in the low-power irradiation portion drop below 0 level and at the same time, the peak level of the land pre-pit signal in the high-power irradiation portion becomes lower than the peak level of the land pre-pit signal in the low-power irradiation portion. At the same time, the slice window width for detecting both the land pre-pit signals becomes 1.58, which is a difference of level between the peak level of the land pre-pit signal in the high-power irradiation portion and the under level of the land pre-pit signal in the low-power irradiation portion. This slice window width of 1.58 is extremely low although the predetermined coefficient k2 is increased slightly by 0.1 from the case (e) in FIG. 25, so that detection of both the land pre-pit signals is worsened extremely.

Therefore, the case where the predetermined coefficient k2 is "1.5" is a theoretical upper limit value as shown in case (e) in FIG. 25. If this theoretical upper limit value is set up, the predetermined coefficient k2 has no allowance in a direction in which it is increased more than 1.5. As a result, the predetermined coefficient k2 of "1.1" to "11.4" (representation of part thereof is omitted) is an actual value under the condition of $a/m1=b/m2=L$ in terms of reliability and safety, as shown in case (d) in FIG. 25.

The condition in which the predetermined coefficient k3 or the predetermined coefficient k2 applies its theoretical upper limit value under a/m1=b/m2=L as shown in case (e) in FIG. 25 is that the amplitude LB1 of the land pre-pit signal in the (1/k3)(C+D) signal based on the equation (39) and the amplitude LB2 of the land pre-pit signal in the k3(A+B) signal based on the equation (40) become the same value. As a result, the equation (39) is equal to the equation (40), so that the predetermined coefficient k3 is computed in a following equation (41) (hereinafter, a symbol $\wedge$ indicates a computation of square).

$$(k3) \wedge 2 = \{m2 - m1 + L(m2 - m1)\}/\{m2 - m1 + L(m1 - m2)\} \quad (41)$$
$$= \{(m2 - m1)(1 + L)\}/\{(m2 - m1)(1 - L)\}$$
$$= (1 + L)/(1 - L)$$

As $(k3) \wedge 2 = k2$, (42)
$$k2 = (1 + L)/(1 - L)$$

Further, because according to FIG. 17, L in the above equation (42) is obviously equivalent to LPPb signal (=L1/R1=pL2/pR2=qL2/qR2=L2/R2) normalized by computation according to the aforementioned equation (19), the L can be replaced with the normalized LPPb signal value, so that the equation (42) can be replaced with the equation (43). Consequently, by supplying an output result from the LPPb generation circuit 14 to the coefficient setting circuit 16, the predetermined coefficient k, which is a theoretical upper limit value, is obtained according to the equation (43).

$$k2=(1+LPPb)/(1-LPPb) \quad (43)$$

Next, in cases of (a) to (e) in FIG. 21, a/m1=b/m2=L described with the above FIG. 19 is not established. This is a general case where a/m1≠b/m2≠L arises.

As for cases (a)–(e) in FIG. 21 also, the slice window width for detecting both the land pre-pit signal in the high-power irradiation portion and the land pre-pit signal in the low-power irradiation portion with respect to the predetermined coefficient k2 is obtained according to substantially the same concept as described in FIG. 25. The reason why the absolute value of the obtained slice window width is different from an absolute value obtained in FIG. 25 is that other factors than the predetermined coefficient k2 are different.

That is, case (a) in FIG. 26 shows a case where the predetermined coefficient k2 is set to "0.9" (k3=0.95). In this case, the under level of the land pre-pit signal in the high-power irradiation portion and the under level of the land pre-pit signal in the low-power irradiation portion rises over 0 level and at the same time, the aforementioned slice window width for detecting the land pre-pit signal in the high-power irradiation portion and the land pre-pit signal in the low-power irradiation portion becomes 3.79, which is a difference of level between the peak level of the land pre-pit signal in the low-power irradiation portion and the under level of the land pre-pit signal in the high-power irradiation portion. This value of 3.79 is so small that detection of the land pre-pit signal is disabled.

Further, case (b) in FIG. 26 shows a case where the predetermined coefficient k2 is set to "1.0" and in this case, the radial push-pull signal {(C+D)−(A+B)} is obtained like conventionally.

In this case, both the under level of the land pre-pit signal in the high-power irradiation portion and the under level of the land pre-pit signal in the low-power irradiation portion become 0 level (reference level), so that although the wobbling signal, whose representation is omitted, can be detected favorably, detection of the land pre-pit signal is not carried out so favorably. That is, the slice window width for detecting both the land pre-pit signals becomes 8.0, which is a difference of level between the peak level of the land pre-pit signal in the low-power irradiation portion and 0 level. If k2 becomes smaller than 1, the slice window width is reduced quickly as described below.

Case (c) in FIG. 26 shows a case where the predetermined coefficient k2 is set to "1.1" (k3=1.05). In this case, both the under level of the land pre-pit signal in the high power irradiation portion and the under level of the land pre-pit signal in the low power irradiation portion drop below 0 level. At the same time, the aforementioned slice window width for detecting both the land pre-pit signals becomes 8.01, which is a difference of level between a peak level of the land pre-pit signal in the low-power irradiation portion and the under level of the land pre-pit signal in the low-power irradiation portion. This slice window width of 8.01 is a favorable value capable of detecting both the land pre-pit signals reliably and securely.

Case (d) in FIG. 26 shows a case where the predetermined coefficient k2 is set to "1.2" (k3=1.1). In this case, both the under level of he land pre-pit signal in the high-power irradiation portion and the under level of the land pre-pit signal in the low-power irradiation portion drop below 0 level, so that the peak level of the land pre-pit signal in the high-power irradiation portion coincides with the peak level of the land pre-pit signal in the low-power irradiation portion above 0 level.

Then, the aforementioned slice window width for detecting both the land pre-pit signals becomes 8.03, which is a difference of level between the peak level of the land pre-pit signal in the high-power irradiation portion and low-power irradiation portion and the under level of the land pre-pit signal in the low-power irradiation portion. If the k2 exceeds 1.2, the slice window width is reduced quickly, so that the value of k2=1.2, in which the slice window width is 8.03, is the maximum value capable of detecting both the land pre-pit signals securely. Therefore, the predetermined coefficient k2=1.2 under a/m1≠b/m2≠L is its theoretical upper limit value.

Case (e) in FIG. 26 shows a case where the predetermined coefficient k2 is set to "1.3". In this case, the peak level of the land pre-pit signal in the high-power irradiation portion is lower than the peak level of the land pre-pit signal in the low-power irradiation portion and the slice window width for detecting both the land pre-pit signals becomes 5.61, which is a difference of level between the peak level of the land pre-pit signal in the high-power irradiation portion and the under level of the land pre-pit signal in the low-power irradiation portion. This slice window width of 5.61 is smaller than those of cases (c) and (d) in FIG. 26, so that detection of both the land pre-pit signals is worsened.

Therefore, as shown in case (d) in FIG. 26, the case where the predetermined coefficient k2 is "1.2" (k3=1.1) indicates a theoretical upper limit. If this theoretical upper limit is set up, the predetermined coefficient k2 has no allowance in a direction in which it is increased over 1.2. Thus, from the viewpoint of the reliability and safety, as shown in case (c) in FIG. 26, the case where the predetermined coefficient k2 is near "1.1" indicates an actual value under a/m1≠b/m2 ≠L.

The condition in which the predetermined coefficient k2 reaches its theoretical upper limit under a/m1≠b/m2≠L as shown in case (d) in FIG. 26 can be estimated from the aforementioned equations (42), (43) and then, the following equations (44), (45) are established.

$$1.0 < k2 < \alpha \times \{(1+L)/(1-L)\} \quad (44)$$

$$1.0 < k2 < \alpha \times \{(1+LPPb)/(1-LPPb)\} \quad (45)$$

A coefficient α in the equations (43), (44) is affected by performance of the optical pickup 2, recording power in the optical pickup 2 and reproduction power in reproduction mode and may be smaller than 1.0. This coefficient a may be stored in a memory preliminarily.

Figure 27:
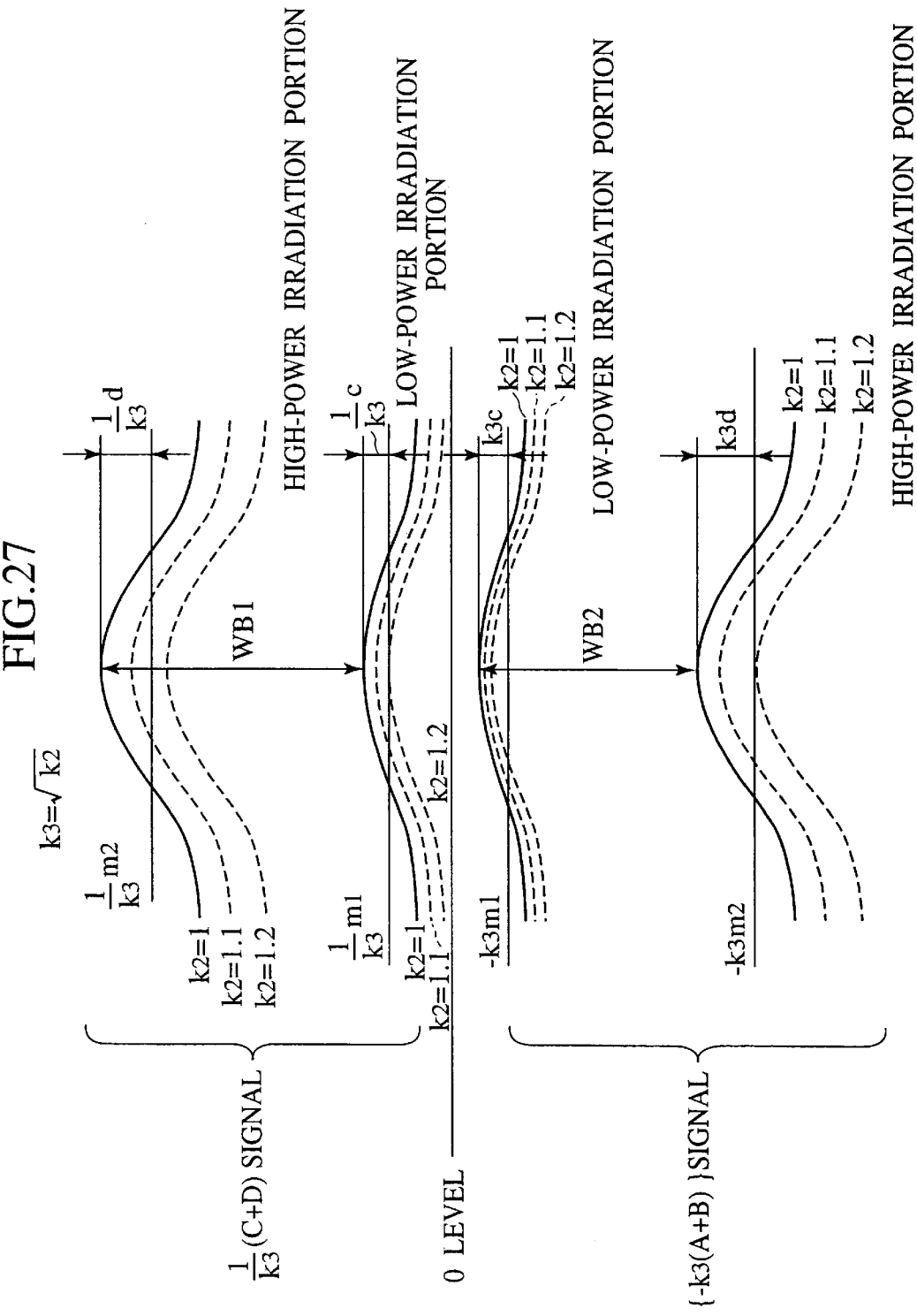
FIG. 27 is a diagram showing the waveforms of the high-power irradiation portion and the low-power irradiation portion of the radial push-pull signal which changes depending on the value of a predetermined coefficient k3 (k3=SQRT(k2)) to be multiplied by paying attention to the wobbling signal.

Next, FIG. 27 is a diagram in which attention is paid to only the wobbling signal in the radial push-pull signal by removing the land pre-pit signal component by zeroing the land pre-pit signal component in the radial push-pull signal. The side of positive polarity relative to 0 level indicates the wobbling signal in the high-power irradiation portion of the (1/k3)(C+D) signal and the wobbling signal in the low-power irradiation portion thereof. On the other hand, the side of negative polarity relative to 0 level indicates the wobbling signal in the high-power irradiation portion of the k3(A+B) signal and the wobbling signal in the low-power irradiation portion thereof.

A simulation for the (1/k3)(C+D) signal is carried out by changing the predetermined coefficient (1/k3) to be multiplied in the same manner as described in FIG. 19. Only the cases where the predetermined coefficient k2=1.0(k3=1.0), k2=1.1(k3=1.05), k2=1.2(k3=1.1) are indicated for convenience for representation.

Further, as for the (1/k3)(C+D) signal, when it is assumed that the center level of the wobbling signal in the low-power irradiation portion is "(1/k3)m1", the center level of the wobbling signal in the high-power irradiation portion is "(1/k3)m2", the amplitude of an upper piece relative to the center level of the wobbling signal in the low-power irradiation portion is "(1/k3)c", and the amplitude of the upper piece relative to the center level of the wobbling signal in the high-power irradiation portion is "(1/k3)d" while c/m1=d/m2=W, the amplitude WB1, which is an amplitude from a top of a wobbling signal waveform in the high-power irradiation portion to a top of the wobbling signal waveform in the low-power irradiation portion can be computed in a following equation (46).

$$WB1 = (1/k3)m2 - (1/k3)m1 + (1/k3)d - (1/k3)c \quad (46)$$
$$= (1/k3)(m2 - m1 + W \times m2 - W \times m1)$$

Likewise, as for the −k3(A+B) signal, when it is assumed that the center level of the wobbling signal in the low-power irradiation portion is "−k3m1", the center level of the wobbling signal in the high-power irradiation portion is "−k3m2", the amplitude of an upper piece relative to the center level of the wobbling signal in the low-power irradiation portion is "k3c" and the amplitude of an upper piece relative to the center level of the wobbling signal in the high-power irradiation portion is "k3d" while −c/−m1=−d/−m2=W, the amplitude WB2, which is an amplitude from the top of the wobbling signal waveform in the low-power irradiation portion to the top of the wobbling signal waveform in the high-power irradiation portion can be computed in a following equation (47).

$$WB2 = k3m2 - k3m1 + k3c - k3d \quad (47)$$
$$= k3(m2 - m1 + W \times m1 - W \times m2)$$

A relation between the aforementioned equations (46) and (47) will be described.

See FIG. 28. In order to binarize a land pre-pit signal in the radial push-pull signal $\{(1/k3)(C+D)-k3(A+B)\}$ in the binarizing circuit 9 securely, how the wobbling signal in this radial push-pull signal is changed depending on the predetermined coefficient k2 is simulated by paying attention to only the wobbling signals in the (1/k3)(C+D) signal and the −k3 (A+B) signal. Consequently, a theoretical lower limit of the predetermined coefficient k3, namely k2, is determined from a relation between the amplitude of the wobbling signal in the high-power irradiation portion and the amplitude of the wobbling signal in the low-power irradiation portion. In the same Figure, along with FIG. 27, the cases where predetermined coefficient k2 are "1.0", "1.1" and "1.2" are shown.

Cases (a)–(c) shown in FIG. 28 are special cases where c/m1=d/m2=W explained in the above FIG. 27 is established and here, simulation is carried out by setting the value of W, for example, to 0.05.

Case (a) in FIG. 28 is a case where the predetermined coefficient k2 is set up to "1.0", in which the radial push-pull signal $\{(C+D)-(A+B)\}$ is obtained like conventionally. In this example, the wobbling signal in the high-power irradiation portion and the wobbling signal in the low-power irradiation portion intersect with the center level of the WBL signal at the same point and further, the amplitude of the wobbling signal in the high-power irradiation portion is larger than the amplitude of the wobbling signal in the low-power irradiation portion. This state corresponds to case (b) in FIG. 25 described previously, in which although the wobbling signal can be detected favorably, detection of the land pre-pit signal is not carried out so favorably.

Case (b) in FIG. 28 shows a case where the predetermined coefficient k2 is set to "1.1" (k3=1.05). In this example, the wobbling signal in the high-power irradiation portion and the wobbling signal in the low-power irradiation portion have respective cycles different from each other. However, the top of the wobbling signal waveform in the low-power irradiation portion coincides with the top of the wobbling signal waveform in the high-power irradiation portion above the center level and in this state, the predetermined coefficient k2=1.1 is a theoretical lower limit under c/m1=d/m2=W. Further, this state corresponds to case (c) in FIG. 25 described previously, in which although detection of the wobbling signal is slightly inferior to case (a) in FIG. 28, the predetermined coefficient k2=1.1 is a theoretical lower limit because the land pre-pit signal can be detected in any way.

Case (c) in FIG. 28 shows a case where the predetermined coefficient k2 is set to "1.2" (k3=1.1). In this example, the top of the wobbling signal in the high-power irradiation portion is located below the top of the waveform of the wobbling signal in the low-power irradiation portion such that it does not intersect therewith. This state corresponds to case (d) in FIG. 25 described previously, in which although the detection of the wobbling signal is worsened further, detection of the land pre-pit signal is improved (this has been already described).

The condition in which the theoretical lower limit value is applied under c/m1=d/m2=W as shown in case (b) in FIG. 28 is that the amplitude WB1 of the wobbling signal in the (1/k3)(C+D) signal based on the equation (46) and the amplitude WB2 of the wobbling signal in the $\{k3(A+B)\}$ signal based on the equation (47) become the same value. At this time, the theoretical lower limit of the coefficient k2 is obtained. As a result, the equation (46) is equal to the equation (10), so that the predetermined coefficient k3 or k2 is calculated in a following equation (48).

$$(k3) \wedge 2 = \{m2 - m1 + W(m2 - m1)\}/\{m2 - m1 + W(m1 - m2)\} \quad (48)$$
$$= \{(m2 - m1)(1 + W)\}/\{(m2 - m1)(1 - W)\}$$
$$= (1 + W)/(1 - W)$$

$$\text{From } (k3) \wedge 2 = k2, \quad k2 = (1 + W)/(1 - W) \quad (49)$$

Further, because W in the above equations (48), (49) is obviously equivalent to WBLb signal (=W1/R1=pW2/pR2= qW2/qR2=W2/R2) normalized by computation according to the aforementioned equation (20), according to FIG. 17, the aforementioned W can be replaced with the normalized WBLb signal value, so that the equation (49) can be replaced with the equation (50). Consequently, by supplying an output result from the WBLb generation circuit 15 to the coefficient setting circuit 16, the predetermined coefficient k2, which aforementioned the equation (50).

$$k2=(1+WBLp)/(1-WBLp) \quad (50)$$

In a general case where c/m1=d/m2=W is not established as described in FIG. 27 while c/m1≠d/m2≠W, although representation thereof is omitted, when the top of the waveform of the wobbling signal in the low-power irradiation portion coincides with the top of the waveform of the wobbling signal in the high-power irradiation portion substantially as shown in case (b) in FIG. 28, the predetermined coefficient k2 becomes its theoretical lower limit value.

In this case, the equations (51), (52) corresponding to the equations (44), (45) are established.

$$1.0<k2<\alpha\times\{(1+W)/(1-W)\} \quad (51)$$

$$1.0<k2<\beta\times\{(1+WBLb)/(1-WBLb)\} \quad (52)$$

A coefficient β in the equations (51), (52) is affected by performance of the optical pickup 2, recording power in the optical pickup 2 and reproduction power in reproduction mode and may be smaller than 1.0. This coefficient β may be stored in a memory preliminarily.

If summarizing the above-described matters, as regards the predetermined coefficient k2, the equations (42), (43), (44), (45) described about the land pre-pit signal are established individually and further, the equations (49), (50), (51), (52) described about the wobbling signal are established individually. The equations about the land pre-pit signal and the equations about the wobbling signal only should be combined for each purpose.

Thus, if the predetermined coefficient k2 exists within a range from its theoretical upper limit value and its theoretical lower limit value, the land pre-pit signal can be detected at a high precision securely. Then, following equations (53)–(56) are established.

$$(1+W)/(1-W) \leq k2 \leq (1+L)/(1-L) \quad (53)$$

$$(1+WBLb)/(1-WBLb) \leq k2 \leq (1+LPPb)/(1-LPPb) \quad (54)$$

under the condition of a/m1=b/m2=L and c/m1=d/m2=W, $$\beta\times\{(1+W)/(1-W)\}<k2<\alpha\times\{(1+L)/(1-L)\} \quad (55)$$

$$\beta\times\{(1+WBLb)/(1-WBLb)\}<k2<\alpha\times\{(1+LPPb)/(1-LPPb)\} \quad (56)$$

under the condition of a/m1≠b/m2≠L and c/m1 ≠d/m2≠W.

More specifically, although the predetermined coefficient k2 is conventionally set to 1.0, according to this embodiment, the predetermined coefficient k2 is set larger than 1.0 and in a range capable of detecting the land pre-pit signal through feedback process, based on i) the amplitude of the land pre-pit signal or the amplitude of the land pre-pit signal and the amplitude of the wobbling signal, or the predetermined coefficient k2 is set larger than 1.0 and in a range capable of detecting the land pre-pit signal based on the ii) the amplitude of the normalized land pre-pit signal or the amplitude of the normalized land pre-pit signal and the amplitude of the normalized wobbling signal. Consequently, the land pre-pit signal can be detected at a high precision securely, so that upon recording or reproducing into/from a disc-like recording medium, the land pre-pit signal corresponding to a land pre-pit formed in the land 33 can be detected at a high precision.

Further, in the disc recording and/or reproducing apparatus of the first embodiment, the coefficient setting circuit 16 sets the predetermined coefficient −k3=−SQRT(k2) to be set in the coefficient p multiplying circuit 6a and the predetermined coefficient 1/k3=1/SQRT(k2) to be set in the coefficient q multiplying circuit 20 in a range from the aforementioned theoretical upper limit value and the theoretical lower limit value, based on the LPP signal, WBL signal, LPPb signal, WBLb signal, an error rate upon detecting of the land pre-pit signal and a shift amount of an objective lens of the optical pickup 2. More specifically, the predetermined coefficient k2 is set larger than 1.0 and in a range capable of detecting the land pre-pit signal.

Consequently, upon recording, the land pre-pit signal can be detected securely at a high precision irrespective of the high-power irradiation portion and the low-power irradiation portion on the DVD 31. Further, the land pre-pit signal can be detected securely at a high precision irrespective of a recording pit formation position and space portion (non-recording portion) on the DVD 31.

As described above, according to the recording and/or reproducing apparatus and the recording and/or reproducing method, when information signal is recorded or reproduced into/from a disc-like recording medium including wobbling grooves each wobbled according to a predetermined frequency and serving as a recording track for the information signal and lands in which at least address information is preliminarily recorded in the form of a land pre-pit at a predetermined wobbling cycle interval, the wobbling grooves and the lands being formed alternately spirally or coaxially, a reflection light from light beam irradiated to the disk-like recording medium is received by first and second light receiving regions, divided equally to at least two sections along the recording track of the disk-like recording medium and a light reception output(s) of either or both of light reception outputs of the first and second light receiving regions is multiplied with a predetermined coefficient.

A differential produced by subtracting one light reception output from the other light reception output, either or both of the light reception outputs being multiplied with a predetermined coefficient as above, is extracted as a radial push-pull signal. When detecting a land pre-pit signal corresponding to the land pre-pit from this radial push-pull signal, the value of the predetermined coefficient is set to be larger than 1.0 and in a range capable of detecting the land pre-pit signal based on:

i) amplitude of the land pre-pit signal, or the amplitude of the land pre-pit signal and the amplitude of the wobbling signal, ii) amplitude of normalized land pre-pit signal, or amplitude of normalized land pre-pit signal and amplitude of normalized wobbling signal, iii) error rate obtained by a land pre-pit decoding circuit, iv) amount of lens shift in a radial direction from optical axis of an objective lens in an optical pickup.

Consequently, upon recording, the land pre-pit signal can be detected securely at a high precision irrespective of the high-power irradiation portion and the low-power irradiation portion with the light beam on the disc-like recording medium.

Further, upon reproduction, the land pre-pit signal can be detected securely at a high precision irrespective of a recording pit formation portion and a space portion (non-recording portion) on the disc-like recording medium.

It should be understood that many modifications and adaptations of the invention will become apparent to those skilled in the art and it is intended to encompass such obvious modifications and changes in the scope of the claims appended hereto.

What is claimed is:

1. A recording and/or reproducing apparatus for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing apparatus comprising:

coefficient multiplying means for when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient k;

push-pull signal generation means for outputting a differential as a radial push-pull signal, the differential being produced by subtracting the multiplication processing result outputted from said coefficient multiplying means from the other of the respective light reception outputs of said first and second light receiving regions;

land pre-pit signal amplitude detecting means for extracting a land pre-pit signal corresponding to a land pre-pit on said lands from said radial push-pull signal so as to detect and output an amplitude of the land pre-pit signal;

wobbling signal amplitude detecting means for extracting a wobbling signal in said wobbling grooves from said radial push-pull signal so as to detect and output an amplitude of the wobbling signal; and coefficient setting means for setting a value of said predetermined coefficient k to be larger than 1.0 and in a range capable of detecting said land pre-pit signal based on the amplitude of said land pre-pit signal, or the amplitude of said land pre-pit signal and the amplitude of said wobbling signal.

2. A recording and/or reproducing apparatus for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing apparatus comprising:

coefficient multiplying means for when a light beam is irradiated to said disk-like recording medium, receiving a reflection light from said disk-like recording medium with first and second light receiving regions, divided equally along said recording track of said disk-like recording medium and multiplying one of respective light reception outputs of said first and second light receiving regions with a predetermined coefficient k;

push-pull signal generation means for outputting a differential as a radial push-pull signal, the differential being produced by subtracting the multiplication processing result outputted from said coefficient multiplying means from the other of the respective light reception outputs of said first and second light receiving regions;

land pre-pit signal amplitude detecting means for extracting a land pre-pit signal corresponding to a land pre-pit on said lands from said radial push-pull signal so as to detect and output an amplitude of the land pre-pit signal;

wobbling signal amplitude detecting means for extracting a wobbling signal in said wobbling grooves from said radial push-pull signal so as to detect and output an amplitude of the wobbling signal;

sum signal generation means for summing up the respective light reception outputs of said first and second light receiving regions and outputting a sum signal;

normalized land pre-pit signal amplitude generation means for outputting an amplitude of a normalized land pre-pit signal by dividing the amplitude of said land pre-pit signal by said sum signal;

normalized wobbling signal amplitude generation means for outputting an amplitude of a normalized wobbling signal by dividing the amplitude of said wobbling signal with said sum signal; and coefficient setting means for setting a value of said predetermined coefficient k to be larger than 1.0 and in a range capable of detecting said land pre-pit signal based on the amplitude of said normalized land pre-pit signal, or the amplitude of said normalized land pre-pit signal and the amplitude of said normalized wobbling signal.

3. A recording and/or reproducing apparatus for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing apparatus comprising:

coefficient multiplying means for when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient k;

push-pull signal generation means for outputting a differential as a radial push-pull signal, the differential being produced by subtracting the multiplication processing result outputted from said coefficient multiplying means from the other of the respective light reception outputs of said first and second light receiving regions;

error rate computing means for computing and outputting an error rate at the time of detecting a land pre-pit signal contained in said radial push-pull signal; and coefficient setting means for setting a value of said predetermined coefficient k to be larger than 1.0 and in a range capable of detecting said land pre-pit signal according to said error rate.

4. A recording and/or reproducing apparatus for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing apparatus comprising:

coefficient multiplying means for when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient k;

push-pull signal generation means for outputting a differential as a radial push-pull signal, the differential being produced by subtracting the multiplication processing result outputted from said coefficient multiplying means from the other of the respective light reception outputs of said first and second light receiving regions;

lens shift amount detecting means for detecting the amount of lens shift in a radial direction from a center of an optical axis of an objective lens of an optical pickup which irradiates said disk-like recording medium with said light beam and outputting said lens shift amount; and coefficient setting means for setting a value of said predetermined coefficient k to be larger than 1.0 and in a range capable of detecting said land pre-pit signal according to said lens shift amount.

5. A recording and/or reproducing apparatus for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing apparatus comprising:

coefficient multiplying means for when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient $1/k1$;

push-pull signal generation means for outputting a differential as a radial push-pull signal, the differential being produced by subtracting the other of the respective light reception outputs of said first and second light receiving regions from the multiplication processing result outputted from said coefficient multiplying means;

land pre-pit signal amplitude detecting means for extracting a land pre-pit signal corresponding to a land pre-pit on said lands from said radial push-pull signal so as to detect and output an amplitude of the land pre-pit signal;

wobbling signal amplitude detecting means for extracting a wobbling signal in said wobbling grooves from said radial push-pull signal so as to detect and output an amplitude of the wobbling signal;

coefficient setting means for setting a value of said predetermined coefficient k1 to be larger than 1.0 and in a range capable of detecting said land pre-pit signal based on the amplitude of said land pre-pit signal, or the amplitude of said land pre-pit signal and the amplitude of said wobbling signal.

6. A recording and/or reproducing apparatus for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing apparatus comprising:

coefficient multiplying means for when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient $1/k1$;

push-pull signal generation means for outputting a differential as a radial push-pull signal, the differential being produced by subtracting the other of the respective light reception outputs of said first and second light receiving regions from the multiplication processing result outputted from said coefficient multiplying means;

land pre-pit signal amplitude detecting means for extracting a land pre-pit signal corresponding to a land pre-pit on said lands from said radial push-pull signal so as to detect and output an amplitude of the land pre-pit signal;

wobbling signal amplitude detecting means for extracting a wobbling signal in said wobbling grooves from said radial push-pull signal so as to detect and output an amplitude of the wobbling signal;

sum signal generation means for summing up the respective light reception outputs of said first and second light receiving regions and outputting a sum signal;

normalized land pre-pit signal amplitude generation means for outputting an amplitude of a normalized land pre-pit signal by dividing the amplitude of said land pre-pit signal by said sum signal;

normalized wobbling signal amplitude generation means for outputting an amplitude of a normalized wobbling signal by dividing the amplitude of said wobbling signal with said sum signal; and coefficient setting means for setting a value of said predetermined coefficient k1 to be larger than 1.0 and in a range capable of detecting said land pre-pit signal based on the amplitude of said normalized land pre-pit signal, or the amplitude of said normalized land pre-pit signal and the amplitude of said normalized wobbling signal.

7. A recording and/or reproducing apparatus for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing apparatus comprising:

first coefficient multiplying means for when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient 1/k3;

second coefficient multiplying means for multiplying the other of the respective light reception outputs of said first and second light receiving regions with a predetermined coefficient k3;

push-pull signal generation means for outputting a differential as a radial push-pull signal, the differential being obtained by subtracting the multiplication processing result outputted from said second coefficient multiplying means from the multiplication processing result outputted from said first coefficient multiplying means;

land pre-pit signal amplitude detecting means for extracting a land pre-pit signal corresponding to a land pre-pit on said lands from said radial push-pull signal so as to detect and output an amplitude of the land pre-pit signal;

wobbling signal amplitude detecting means for extracting a wobbling signal in said wobbling grooves from said radial push-pull signal so as to detect and output an amplitude of the wobbling signal; and coefficient setting means for setting a value of said predetermined coefficient k3 to be larger than 1.0 and in a range capable of detecting said land pre-pit signal based on the amplitude of said land pre-pit signal, or the amplitude of said land pre-pit signal and the amplitude of said wobbling signal.

8. A recording and/or reproducing apparatus for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing apparatus comprising:

first coefficient multiplying means for when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient 1/k3;

second coefficient multiplying means for multiplying the other of the respective light reception outputs of said first and second light receiving regions with a predetermined coefficient k3;

push-pull signal generation means for outputting a differential as a radial push-pull signal, the differential being obtained by subtracting the multiplication processing result outputted from said second coefficient multiplying means from the multiplication processing result outputted from said first coefficient multiplying means;

land pre-pit signal amplitude detecting means for extracting a land pre-pit signal corresponding to a land pre-pit on said lands from said radial push-pull signal so as to detect and output an amplitude of the land pre-pit signal;

wobbling signal amplitude detecting means for extracting a wobbling signal in said wobbling grooves from said radial push-pull signal so as to detect and output an amplitude of the wobbling signal;

sum signal generation means for summing up the respective light reception outputs of said first and second light receiving regions and outputting a sum signal;

normalized land pre-pit signal amplitude generation means for outputting an amplitude of a normalized land pre-pit signal by dividing the amplitude of said land pre-pit signal by said sum signal;

normalized wobbling signal amplitude generation means for outputting an amplitude of a normalized wobbling signal by dividing the amplitude of said wobbling signal with said sum signal; and coefficient setting means for setting a value of said predetermined coefficient k3 to be larger than 1.0 and in a range capable of detecting said land pre-pit signal based on the amplitude of said normalized land pre-pit signal, or the amplitude of said normalized land pre-pit signal and the amplitude of said normalized wobbling signal.

9. A recording and/or reproducing method for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing method comprising the steps of:

when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient k;

outputting a differential as a radial push-pull signal, the differential being produced by subtracting the multiplication processing result outputted at said coefficient multiplying step from the other of the respective light reception outputs of said first and second light receiving regions;

extracting a land pre-pit signal corresponding to a land pre-pit on said lands from said radial push-pull signal so as to detect and output an amplitude of the land pre-pit signal;

extracting a wobbling signal in said wobbling grooves from said radial push-pull signal so as to detect and output an amplitude of the wobbling signal; and setting a value of said predetermined coefficient k to be larger than 1.0 and in a range capable of detecting said land pre-pit signal based on the amplitude of said land pre-pit signal, or the amplitude of said land pre-pit signal and the amplitude of said wobbling signal.

10. A recording and/or reproducing method for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing method comprising the steps of:

when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient k;

outputting a differential as a radial push-pull signal, the differential being produced by subtracting the multiplication processing result outputted at said coefficient multiplying step from the other of the respective light reception outputs of said first and second light receiving regions;

extracting a land pre-pit signal corresponding to a land pre-pit on said lands from said radial push-pull signal so as to detect and output an amplitude of the land pre-pit signal;

extracting a wobbling signal in said wobbling grooves from said radial push-pull signal so as to detect and output an amplitude of the wobbling signal;

summing up the respective light reception outputs of said first and second light receiving regions and outputting a sum signal;

outputting an amplitude of a normalized land pre-pit signal by dividing the amplitude of said land pre-pit signal by said sum signal;

outputting an amplitude of a normalized wobbling signal by dividing the amplitude of said wobbling signal with said sum signal; and setting a value of said predetermined coefficient k to be larger than 1.0 and in a range capable of detecting said land pre-pit signal based on the amplitude of said normalized land pre-pit signal, or the amplitude of said normalized land pre-pit signal and the amplitude of said normalized wobbling signal.

11. A recording and/or reproducing method for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing method comprising the steps of:

when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient k;

outputting a differential as a radial push-pull signal, the differential being produced by subtracting the multiplication processing result outputted at said coefficient multiplying step from the other of the respective light reception outputs of said first and second light receiving regions;

computing and outputting an error rate at the time of detecting a land pre-pit signal contained in said radial push-pull signal; and setting a value of said predetermined coefficient k to be larger than 1.0 and in a range capable of detecting said land pre-pit signal according to said error rate.

12. A recording and/or reproducing method for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing method comprising the steps of:

when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient k;

outputting a differential as a radial push-pull signal, the differential being produced by subtracting the multiplication processing result outputted at said coefficient multiplying step from the other of the respective light reception outputs of said first and second light receiving regions;

detecting the amount of lens shift in a radial direction from a center of an optical axis of an objective lens of an optical pickup which irradiates said disk-like recording medium with said light beam and outputting said lens shift amount; and setting a value of said predetermined coefficient k to be larger than 1.0 and in a range capable of detecting said land pre-pit signal according to said lens shift amount.

13. A recording and/or reproducing method for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing method comprising the steps of:

when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient 1/k1;

outputting a differential as a radial push-pull signal, the differential being produced by subtracting the other of the respective light reception outputs of said first and second light receiving regions from the multiplication processing result outputted at said coefficient multiplying step;

extracting a land pre-pit signal corresponding to a land pre-pit on said lands from said radial push-pull signal so as to detect and output an amplitude of the land pre-pit signal;

extracting a wobbling signal in said wobbling grooves from said radial push-pull signal so as to detect and output an amplitude of the wobbling signal; and setting a value of said predetermined coefficient k1 to be larger than 1.0 and in a range capable of detecting said land pre-pit signal based on the amplitude of said land pre-pit signal, or the amplitude of said land pre-pit signal and the amplitude of said wobbling signal.

14. A recording and/or reproducing method for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing method comprising the steps of:

when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient 1/k1;

outputting a differential as a radial push-pull signal, the differential being produced by subtracting the other of the respective light reception outputs of said first and second light receiving regions from the multiplication processing result outputted at said coefficient multiplying step;

extracting a land pre-pit signal corresponding to a land pre-pit on said lands from said radial push-pull signal so as to detect and output an amplitude of the land pre-pit signal;

extracting a wobbling signal in said wobbling grooves from said radial push-pull signal so as to detect and output an amplitude of the wobbling signal;

summing up the respective light reception outputs of said first and second light receiving regions and outputting a sum signal;

outputting an amplitude of a normalized land pre-pit signal by dividing the amplitude of said land pre-pit signal by said sum signal;

outputting an amplitude of a normalized wobbling signal by dividing the amplitude of said wobbling signal with said sum signal; and setting a value of said predetermined coefficient k1 to be larger than 1.0 and in a range capable of detecting said land pre-pit signal based on the amplitude of said normalized land pre-pit signal, or the amplitude of said normalized land pre-pit signal and the amplitude of said normalized wobbling signal.

15. A recording and/or reproducing method for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing method comprising:

when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient 1/k3;

multiplying the other of the respective light reception outputs of said first and second light receiving regions with a predetermined coefficient k3;

outputting a differential as a radial push-pull signal, the differential being obtained by subtracting a result of the multiplication processing with the predetermined coefficient k3 from a result of the multiplication processing with the predetermined coefficient 1/k3;

extracting a land pre-pit signal corresponding to a land pre-pit on said lands from said radial push-pull signal so as to detect and output an amplitude of the land pre-pit signal;

extracting a wobbling signal in said wobbling grooves from said radial push-pull signal so as to detect and output an amplitude of the wobbling signal; and setting a value of said predetermined coefficient k3 to be larger than 1.0 and in a range capable of detecting said land pre-pit signal based on the amplitude of said land pre-pit signal, or the amplitude of said land pre-pit signal and the amplitude of said wobbling signal.

16. A recording and/or reproducing method for recording and/or reproducing information signal into/from a disc-like recording medium including wobbling grooves each wobbled according to a predetermined frequency and serving as a recording track for said information signal and lands in which at least address information is preliminarily recorded in the form of a land pre-pit at a predetermined wobbling cycle interval, said wobbling grooves and said lands being formed alternately spirally or coaxially, said recording and/or reproducing method comprising the steps of:

when a light beam is irradiated to said disk-like recording medium, receiving reflection light from said disk-like recording medium with first and second light receiving regions, divided equally along said recording track of said disk-like recording medium and multiplying one of respective light reception outputs of said first and second light receiving regions with a predetermined coefficient 1/k3;

multiplying the other of the respective light reception outputs of said first and second light receiving regions with a predetermined coefficient k3;

outputting a differential as a radial push-pull signal, the differential being obtained by subtracting a result of the multiplication processing with the predetermined coefficient k3 from a result of the multiplication processing with the predetermined coefficient 1/k3;

extracting a land pre-pit signal corresponding to a land pre-pit on said lands from said radial push-pull signal so as to detect and output an amplitude of the land pre-pit signal;

extracting a wobbling signal in said wobbling grooves from said radial push-pull signal so as to detect and output an amplitude of the wobbling signal;

summing up the respective light reception outputs of said first and second light receiving regions and outputting a sum signal;

outputting an amplitude of a normalized land pre-pit signal by dividing the amplitude of said land pre-pit signal by said sum signal;

outputting an amplitude of a normalized wobbling signal by dividing the amplitude of said wobbling signal with said sum signal; and setting a value of said predetermined coefficient k3 to be larger than 1.0 and in a range capable of detecting said land pre-pit signal based on the amplitude of said normalized land pre-pit signal, or the amplitude of said normalized land pre-pit signal and the amplitude of said normalized wobbling signal.

* * * * *